US009260622B2

(12) United States Patent
Yoshida et al.

(10) Patent No.: US 9,260,622 B2
(45) Date of Patent: Feb. 16, 2016

(54) COMPOSITE STRUCTURAL MATERIAL FORMED PRODUCT AND PACKAGING MATERIAL USING THE SAME, METHOD FOR PRODUCING THE COMPOSITE STRUCTURAL MATERIAL, AND COATING LIQUID

(75) Inventors: Kentaro Yoshida, Kurashiki (JP); Ryoichi Sasaki, Kurashiki (JP); Mamoru Omoda, Soja (JP); Wataru Hirose, Kurashiki (JP); Manabu Shibata, Kurashiki (JP); Tatsuya Oshita, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 13/638,715

(22) PCT Filed: Mar. 30, 2011

(86) PCT No.: PCT/JP2011/001936
§ 371 (c)(1),
(2), (4) Date: Oct. 1, 2012

(87) PCT Pub. No.: WO2011/122036
PCT Pub. Date: Oct. 6, 2011

(65) Prior Publication Data
US 2013/0034674 A1 Feb. 7, 2013

(30) Foreign Application Priority Data
Mar. 30, 2010 (JP) .................. 2010-077032

(51) Int. Cl.
B32B 1/02 (2006.01)
C09D 123/02 (2006.01)
C09D 123/08 (2006.01)
B32B 7/12 (2006.01)
B32B 27/08 (2006.01)
B32B 27/10 (2006.01)
B32B 27/32 (2006.01)
B32B 27/34 (2006.01)
B32B 27/36 (2006.01)
C09D 1/00 (2006.01)
C08J 7/06 (2006.01)
C23C 18/12 (2006.01)
C09D 133/02 (2006.01)
B32B 1/08 (2006.01)

(52) U.S. Cl.
CPC ............. *C09D 123/02* (2013.01); *B32B 7/12* (2013.01); *B32B 27/08* (2013.01); *B32B 27/10* (2013.01); *B32B 27/32* (2013.01); *B32B 27/34* (2013.01); *B32B 27/36* (2013.01); *C08J 7/06* (2013.01); *C09D 1/00* (2013.01); *C09D 123/0846* (2013.01); *C09D 133/02* (2013.01); *C23C 18/1216* (2013.01); *B32B 2250/02* (2013.01); *B32B 2250/03* (2013.01); *B32B 2250/04* (2013.01); *B32B 2250/05* (2013.01); *B32B 2250/24* (2013.01); *B32B 2255/10* (2013.01); *B32B 2255/20* (2013.01); *B32B 2255/28* (2013.01); *B32B 2307/31* (2013.01); *B32B 2307/41* (2013.01); *B32B 2307/412* (2013.01); *B32B 2307/414* (2013.01); *B32B 2307/514* (2013.01); *B32B 2307/714* (2013.01); *B32B 2307/7244* (2013.01); *B32B 2307/7246* (2013.01); *B32B 2439/46* (2013.01); *B32B 2439/70* (2013.01); *C08J 2367/02* (2013.01); *C08J 2377/00* (2013.01); *C08K 2201/008* (2013.01); *Y10T 428/1303* (2015.01); *Y10T 428/1334* (2015.01); *Y10T 428/1393* (2015.01); *Y10T 428/31993* (2015.04)

(58) Field of Classification Search
CPC .. B32B 1/02; B32B 2250/02; B32B 2250/03; B32B 2250/04; C01B 37/04; Y10T 428/13; Y10T 428/1334; Y10T 428/1393; Y10T 428/1303
USPC ............ 428/34.1, 34.2, 35.7, 35.9, 36.9, 35.2
See application file for complete search history.

(56) References Cited

U.S. PATENT DOCUMENTS

| | | | | |
|---|---|---|---|---|
| 3,019,080 A * | 1/1962 | Clarkson | ........................ | 423/111 |
| 3,821,014 A | 6/1974 | Haskell et al. | | |
| 4,871,711 A * | 10/1989 | Matin et al. | .................... | 502/415 |
| 4,904,634 A * | 2/1990 | Wieserman et al. | .......... | 502/401 |
| 5,132,181 A * | 7/1992 | Wefers et al. | ................. | 428/457 |
| 6,958,307 B2 * | 10/2005 | Forestiere et al. | ............ | 502/162 |
| 2001/0033903 A1* | 10/2001 | Luciano et al. | ............... | 428/34.1 |
| 2004/0091547 A1* | 5/2004 | Ben-Nissan et al. | .......... | 424/602 |
| 2006/0166511 A1* | 7/2006 | Reiba et al. | .................... | 438/780 |
| 2007/0049654 A1* | 3/2007 | Hara et al. | ..................... | 522/173 |

FOREIGN PATENT DOCUMENTS

JP    55 46969    4/1980
JP    9-1734 A    1/1997

(Continued)

OTHER PUBLICATIONS

International Search Report Issued Jul. 5, 2011 in PCT/JP11/01936 Filed Mar. 30, 2011.

(Continued)

Primary Examiner — Marc Patterson
(74) Attorney, Agent, or Firm — Oblon, McClelland, Maier & Neustadt, L.L.P.

(57) ABSTRACT

The composite structural material of the present invention includes a base (X) and a layer (Y) stacked on the base (X). The layer (Y) includes a reaction product (R) of a metal oxide (A) and a phosphorus compound (B). In the infrared absorption spectrum of the layer (Y) in the range of 800 to 1400 $cm^{-1}$, the wave number ($n^1$) at which the infrared absorption reaches maximum is in the range of 1080 to 1130 $cm^{-1}$.

22 Claims, No Drawings

(56) References Cited

FOREIGN PATENT DOCUMENTS

| JP | 2006 116737 | 5/2006 |
| JP | 2006 515535 | 6/2006 |
| JP | 2008 516015 | 5/2008 |

OTHER PUBLICATIONS

Extended European Search Report issued Aug. 19, 2013 in Patent Application No. 11762278.7.

* cited by examiner

COMPOSITE STRUCTURAL MATERIAL FORMED PRODUCT AND PACKAGING MATERIAL USING THE SAME, METHOD FOR PRODUCING THE COMPOSITE STRUCTURAL MATERIAL, AND COATING LIQUID

TECHNICAL FIELD

The present invention relates to a composite structural material, and to a formed product and packaging material using the composite structural material. The present invention relates also to a method for producing the composite structural material, and to a coating liquid usable for producing the composite structural material.

BACKGROUND ART

A coating film containing phosphorus atoms and metal atoms such as aluminum as constituents is conventionally known. For example, a formed product of an organic polymer coated with a gas permeation preventing film composed of metal orthophosphate mainly containing aluminum is known (Patent Literature 1: JP 55 (1980)-46969 A). JP 55-46969 A discloses a method for forming a gas permeation preventing film by applying a dispersion or solution of metal orthophosphate to a formed product of an organic polymer. JP 55-46969 A discloses, as a method for forming the dispersion or solution of metal orthophosphate, a method of separately dissolving an aluminum ion source and a phosphorus ion source each in a medium, followed by mixing these solutions.

Also known is a gas barrier layered film in which an inorganic oxide-deposited layer is provided on a base film composed of a plastic film, and a coating layer of metal phosphate is provided on this inorganic oxide-deposited layer (Patent Literature 2: JP 2006-116737 A). JP 2006-116737 A discloses, as a method for forming a coating layer of metal phosphate, a method of applying a specific coating liquid obtained by mixing a phosphate ion-containing solution and a metal ion-containing solution.

Meanwhile, a method of using aluminophosphate for reducing the surface roughness of a base such as iron and glass is known (Patent Literature 3: JP 2006-515535 T). JP 2006-515535 T discloses a method of forming an amorphous aluminophosphate compound on a base such as iron and glass by applying a precursor of the aluminophosphate compound containing aluminum ions and phosphoric acid ester in a liquid medium on the base. JP 2006-515535 T discloses that an absorption peak due to vibration of Al—O—P group appears in the range of 1180 to 1280 $cm^{-1}$ (specifically, at 1207 $cm^{-1}$) in the infrared absorption spectrum of a coating layer which has been formed on stainless steel and subjected to heat treatment at 500° C. for 5 minutes.

Further, a composite composed of a base such as metal, metal alloy and plastic, and a coating component containing a specific aluminum phosphate compound is also known (Patent Literature 4: JP 2008-516015 T). JP 2008-516015 T discloses a method of forming a coating using a solution containing aluminum salt and phosphoric acid ester in an organic solvent. JP 2008-516015 T discloses that the coating component includes a structural site that absorbs the radiation at about 1230 $cm^{-1}$ in the infrared absorption spectrum.

CITATION LIST

Patent Literature

Patent Literature 1: JP 55 (1980)-46969 A
Patent Literature 2: JP 2006-116737 A
Patent Literature 3: JP 2006-515535 T
Patent Literature 4: JP 2008-516015 T

SUMMARY OF INVENTION

Technical Problem

However, the above-mentioned conventional coating layers are insufficient in gas barrier properties and water vapor barrier properties. Further, the conventional coating layers are insufficient in hot-water resistance. Therefore, the gas barrier properties and water vapor barrier properties of the conventional coating layers tend to decrease due to hot water treatment such as retorting, and thus the applications thereof are considerably limited. For example, there has been a limitation in using the above-mentioned conventional coating layers as a food packaging material that is subjected to retorting.

Thus, it is one object of the present invention to provide a composite structural material that is excellent both in gas barrier properties and water vapor barrier properties and capable of maintaining both barrier properties at high levels even after retorting. It is another object of the present invention to provide a packaging material containing the composite structural material, and a formed product using the packaging material. It is still another object of the present invention to provide a method for producing the above-mentioned composite structural material and a coating liquid usable for the production method.

Solution to Problem

As a result of diligent studies for achieving the above-mentioned objects, the inventors found that it is possible to form, by using a specific coating liquid, a coating layer that is excellent both in gas barrier properties and water vapor barrier properties, and capable of maintaining both barrier properties at high levels even after retorting. This coating liquid is obtained by mixing fine particles of metal oxide with a phosphorus compound substantially free from metal atoms, where the particles of metal oxide have been obtained through hydrolysis condensation of a compound containing a metal atom to which a hydrolyzable characteristic group is bonded. On the basis of such new understanding, a further investigation has been made by the inventors, as a result of which the present invention has been accomplished.

That is, the present invention provides a composite structural material having a base (X) and a layer (Y) stacked on the base (X). The layer (Y) includes a reaction product (R). The reaction product (R) is a reaction product formed by a reaction at least between a metal oxide (A) and a phosphorus compound (B). In the infrared absorption spectrum of the layer (Y) in the range of 800 to 1400 $cm^{-1}$, the wave number ($n^1$) at which the infrared absorption reaches maximum is in the range of 1080 to 1130 $cm^{-1}$.

Meanwhile, another aspect of the present invention provides a composite structural material having a base (X) and a layer (Y) stacked on the base (X). The layer (Y) includes a reaction product (R). The reaction product (R) is a reaction product formed by a reaction at least between a metal oxide (A) and a phosphorus compound (B). In the infrared absorption spectrum of the layer (Y) in the range of 800 to 1400 $cm^{-1}$, the infrared absorption peak attributed to a bond expressed by M-O—P in which a metal atom (M) constituting the metal oxide (A) and a phosphorus atom (P) derived from the compound (B) are bonded via an oxygen atom (O) is the highest among all the infrared absorption peaks attributed to a bond constituting the metal oxide (A), a bond constituting the phosphorus compound (B), and a bond formed by a reaction of the metal oxide (A) and the phosphorus compound (B) individually and/or with each other. The wave number ($n^1$) at which the infrared absorption peak reaches maximum is in the range of 1080 to 1130 $cm^{-1}$.

In the composite structural material of the present invention, the phosphorus compound (B) may have a plurality of sites capable of reacting with the metal oxide (A).

In the composite structural material of the present invention, the absorbance ($A^1$) at the wave number ($n^1$) and the absorbance ($A^2$) at the wave number ($n^2$) may satisfy the relationship of Absorbance ($A^2$)/Absorbance ($A^1$)≤0.2 in the infrared absorption spectrum of the layer (Y). The wave number ($n^2$) is a wave number at which an infrared absorption due to stretching vibration of hydroxyl group reaches maximum in the infrared absorption spectrum of the layer (Y) in the range of 2500 to 4000 $cm^{-1}$.

In the composite structural material of the present invention, the half width of the absorption peak at the wave number ($n^1$) may be 200 $cm^{-1}$ or less.

Meanwhile, still another aspect of the present invention provides a composite structural material having a base (X) and a layer (Y) stacked on the base (X). The layer (Y) has a structure in which particles of a metal oxide (A) are bonded to each other via a phosphorus atom derived from a phosphorus compound (B).

In the composite structural material of the present invention, the number of moles of metal atom bonding the particles to each other may be in the range of 0 to 1 times the number of moles of phosphorus atom bonding the particles to each other.

In the composite structural material of the present invention, the metal oxide (A) may be a hydrolyzed condensate of a compound (L) containing a metal atom (M) to which a hydrolyzable characteristic group is bonded.

In the composite structural material of the present invention, the compound (L) may include at least one compound ($L^1$) represented by the formula (I) below.

$$M^1 X^1{}_m R^1{}_{(n-m)} \quad (I)$$

In the formula (I): $M^1$ is selected from the group consisting of Al, Ti, and Zr; $X^1$ is selected from the group consisting of F, Cl, Br, I, $R^2O-$, $R^3C(=O)O-$, $(R^4C(=O))_2CH-$, and $NO_3$; $R^1$, $R^2$, $R^3$, and $R^4$ each are selected from the group consisting of alkyl group, aralkyl group, aryl group, and alkenyl group; in the case where a plurality of $X^1$ are present in the formula (I), the plurality of $X^1$ may be the same as or different from each other; in the case where a plurality of $R^1$ are present in the formula (I), the plurality of $R^1$ may be the same as or different from each other; in the case where a plurality of $R^2$ are present in the formula (I), the plurality of $R^2$ may be the same as or different from each other; in the case where a plurality of $R^3$ are present in the formula (I), the plurality of $R^3$ may be the same as or different from each other; in the case where a plurality of $R^4$ are present in the formula (I), the plurality of $R^4$ may be the same as or different from each other; n is equal to the valence of $M^1$; and m denotes an integer of 1 to n.

In the composite structural material of the present invention, the phosphorus compound (B) may be at least one compound selected from the group consisting of phosphoric acid, polyphosphoric acid, phosphorous acid, phosphonic acid, and their derivatives.

In the composite structural material of the present invention, the number of moles ($N_M$) of the metal atom constituting the metal oxide (A) and the number of moles ($N_P$) of the phosphorus atom derived from the phosphorus compound (B) may satisfy the relationship of 0.8≤Number of moles ($N_M$)/Number of moles ($N_P$)≤4.5 in the layer (Y).

In the composite structural material of the present invention, the layer (Y) may further contain a polymer (C) having at least one functional group (f) selected from the group consisting of hydroxyl group, carboxyl group, carboxylic anhydride group, and a salt of carboxyl group.

In the composite structural material of the present invention, the polymer (C) may be at least one polymer selected from the group consisting of polyvinyl alcohol, ethylene-vinyl alcohol copolymer, polysaccharides, polyacrylic acid, a salt of polyacrylic acid, polymethacrylic acid, and a salt of polymethacrylic acid.

In the composite structural material of the present invention, the base (X) may be a layer-like base. In the composite structural material of the present invention, the base (X) may include at least one layer selected from the group consisting of a thermoplastic resin film layer, a paper layer, and an inorganic deposited layer.

In the composite structural material of the present invention, the moisture transmission rate under conditions of 40° C. and 90/0% RH may be 5 $g/(m^2 \cdot day)$ or less. In the composite structural material of the present invention, the oxygen transmission rate under conditions of 20° C. and 85% RH may be 1 $ml/(m^2 \cdot day \cdot atm)$ or less. In the composite structural material of the present invention, the moisture transmission rate under conditions of 40° C. and 90/0% RH after immersion in hot water of 120° C. for 30 minutes may be not more than twice the moisture transmission rate under conditions of 40° C. and 90/0% RH before the immersion. In the composite structural material of the present invention, the oxygen transmission rate under conditions of 20° C. and 85% RH after immersion in hot water of 120° C. for minutes may be not more than twice the oxygen transmission rate under conditions of 20° C. and 85% RH before the immersion.

The packaging material of the present invention includes the composite structural material of the present invention. The packaging material of the present invention may be a packaging material for retort foods.

The formed product of the present invention is formed using the packaging material of the present invention. The formed product of the present invention may be a vertical form fill seal pouch, a vacuum packaging pouch, a pouch with a spout, a laminated tube container, an infusion bag, a lidding film, a paper container, or a vacuum insulator.

The method for producing a composite structural material of the present invention is a method for producing a composite structural material that has a base (X) and a layer (Y) stacked on the base (X). The method includes the steps of (I) mixing a metal oxide (A), at least one compound having a site capable of reacting with the metal oxide (A), and a solvent, so as to prepare a coating liquid (U) containing the metal oxide (A), the at least one compound, and the solvent; (II) forming a precursor layer of the layer (Y) on the base (X) by applying the coating liquid (U) onto the base (X); and (III) forming the layer (Y) by treating the precursor layer. The number of moles of metal atom contained in the at least one compound is in the range of 0 to 1 times the number of moles of phosphorus atom contained in the phosphorus compound (B).

The composite structural material of the present invention can be obtained by employing the above-mentioned production method.

In the production method of the present invention, the step (III) may be a step of heat-treating the precursor layer at a temperature of 110° C. or more.

In the production method of the present invention, the absorbance (A) at the wave number ($n^1$) and the absorbance ($A^2$) at the wave number ($n^2$) may satisfy the relationship of Absorbance ($A^2$)/Absorbance ($A^1$)≤0.2 in the infrared absorption spectrum of the layer (Y). The wave number ($n^2$) is a wave number at which an infrared absorption due to stretching vibration of hydroxyl group reaches maximum in the infrared absorption spectrum of the layer (Y) in the range of 2500 to 4000 $cm^{-1}$.

In the production method of the present invention, the half width of the absorption peak at the wave number ($n^1$) may be 200 $cm^{-1}$ or less.

In the production method of the present invention, the step (I) may include the steps of: (a) preparing a liquid (S) that contains the metal oxide (A); (b) preparing a solution (T) that contains the phosphorus compound (B); and (c) mixing the liquid (S) and the solution (T).

In the production method of the present invention, the step (a) may include a step of subjecting, to condensation or hydrolysis condensation, at least one selected from the group consisting of a compound (L) containing a metal atom (M) to which a hydrolyzable characteristic group is bonded; a partial hydrolysate of the compound (L), a total hydrolysate of the compound (L); a partially hydrolyzed condensate of the compound (L); and a partial condensate of the total hydrolysate of the compound (L).

In the production method of the present invention, the compound (L) may include at least one compound ($L^1$) represented by the above-mentioned formula (I).

In the production method of the present invention, the coating liquid (U) may further contain a polymer (C). The polymer (C) is a polymer having at least one functional group (f) selected from the group consisting of hydroxyl group, carboxyl group, carboxylic anhydride group, and a salt of carboxyl group.

In the production method of the present invention, the coating liquid (U) may further contain an acid compound (D). The acid compound (D) is at least one compound selected from the group consisting of acetic acid, hydrochloric acid, nitric acid, trifluoroacetic acid, and trichloroacetic acid.

In the production method of the present invention, duration of the heat treatment may be in the range of 0.1 second to 1 hour.

The coating liquid of the present invention contains a metal oxide (A), a phosphorus compound (B), and a solvent. The phosphorus compound (B) has a site capable of reacting with the metal oxide (A).

The coating liquid of the present invention may further contain at least one selected from a polymer (C) and an acid compound (D). The polymer (C) has at least one functional group (f) selected from the group consisting of hydroxyl group, carboxyl group, carboxylic anhydride group, and a salt of carboxyl group. The acid compound (D) is at least one compound selected from acetic acid, hydrochloric acid, nitric acid, trifluoroacetic acid, and trichloroacetic acid.

Advantageous Effects of Invention

The composite structural material of the present invention is excellent both in gas barrier properties and water vapor barrier properties, and can maintain both barrier properties at high levels even after retorting. Further, according to the present invention, a composite structural material with excellent appearance can be obtained. Furthermore, according to the production method and the coating liquid of the present invention, the above-mentioned composite structural material can be easily produced. It should be noted that the "gas barrier properties" herein means the performance to serve as a barrier against gases other than water vapor, unless otherwise specified. Further, "barrier properties", simply described, herein means both barrier properties of the gas barrier properties and the water vapor barrier properties.

DESCRIPTION OF EMBODIMENTS

Hereinafter, embodiments of the present invention are described. In the following description, a specific material (such as a compound) may be mentioned as an example that exhibits a specific function. However, the present invention is not limited to the embodiments using such a material. One of the below-mentioned examples of materials may be used alone or two or more of them may be used in combination, unless otherwise specified.

<Composite Structural Material>

Examples of the composite structural material of the present invention include a composite structural material (1). The composite structural material (1) has a base (X) and a layer (Y) stacked on the base (X). The layer (Y) in the composite structural material (1) includes a reaction product (R). The reaction product (R) is a reaction product formed by a reaction at least between a metal oxide (A) and a phosphorus compound (B). In the infrared absorption spectrum of the layer (Y) in the range of 800 to 1400 $cm^{-1}$, the wave number ($n^1$) at which the infrared absorption reaches maximum is in the range of 1080 to 1130 $cm^{-1}$. In another embodiment that can include the composite structural material (1), the composite structural material has a base (X) and a layer (Y) stacked on the base (X). The layer (Y) includes a reaction product (R). The reaction product (R) includes a reaction product (r) formed by a reaction between a metal oxide (A) and a phosphorus compound (B). In the infrared absorption spectrum attributed to the reaction product (r) in the range of 800 to 1400 $cm^{-1}$, the wave number ($n^1$) at which the infrared absorption reaches maximum is in the range of 1080 to 1130 $cm^{-1}$.

Hereinafter, the wave number ($n^1$) may be referred to as a "maximum absorption wave number ($n^1$)" in some cases. The metal oxide (A) normally reacts with the phosphorus compound (B) in the form of particles of the metal oxide (A).

Further, examples of the composite structural material of the present invention include a composite structural material (2). The composite structural material (2) includes a base (X) and a layer (Y) stacked on the base (X). The layer (Y) in the composite structural material (2) has a structure in which the particles of a metal oxide (A) are bonded to each other via a phosphorus atom derived from a phosphorus compound (B). Embodiments of bonding via a phosphorus atom include the embodiment of bonding via an atomic group containing a phosphorus atom, and also include, for example, the embodiment of bonding via an atomic group free from metal atoms and containing a phosphorus atom.

In the layer (Y) in the composite structural material (2), the number of moles of metal atom bonding the particles of the metal oxide (A) to each other is preferably in the range of 0 to 1 times (for example, in the range of 0 to 0.9 times) the number of moles of phosphorus atom bonding the particles of the metal oxide (A) to each other, and may also be, for example, 0.3 times or less, 0.05 times or less, 0.01 times or less, or 0 times.

The layer (Y) included in the composite structural material of the present invention may partially include the metal oxide (A) and/or the phosphorus compound (B) that are not involved in reactions.

The below-mentioned descriptions on the base (X), the layer (Y), the metal oxide (A), and the phosphorus compound (B) are intended to apply each to both of those included in the composite structural material (1) and those included in the composite structural material (2), unless otherwise specified.

The layer (Y) included in the composite structural material (1) includes a reaction product (R). The reaction product (R) is a reaction product formed by a reaction at least between a metal oxide (A) and a phosphorus compound (B). In the infrared absorption spectrum of the layer (Y) in the range of 800 to 1400 cm$^{-1}$, the wave number (n$^1$) at which the infrared absorption reaches maximum is in the range of 1080 to 1130 cm$^{-1}$. In another embodiment that can include the composite structural material (1), the composite structural material has a base (X) and a layer (Y) stacked on the base (X). The layer (Y) includes a reaction product (R). The reaction product (R) is a reaction product formed by a reaction at least between a metal oxide (A) and a phosphorus compound (B). In the infrared absorption spectrum of the layer (Y) in the range of 800 to 1400 cm$^{-1}$, the infrared absorption peak attributed to a bond expressed by M-O-P in which a metal atom (M) constituting the metal oxide (A) and a phosphorus atom (P) derived from the compound (B) are bonded via an oxygen atom (O) is the highest among all the infrared absorption peaks attributed to the bond constituting the metal oxide (A), the bond constituting the phosphorus compound (B), and the bond formed by a reaction of the metal oxide (A) and the phosphorus compound (B) individually and/or with each other. The wave number (n$^1$) of the highest infrared absorption peak is in the range of 1080 to 1130 cm$^{-1}$.

Generally, when a metal compound and a phosphorus compound are reacted, so that a bond expressed by M-O-P in which a metal atom (M) constituting a metal oxide and a phosphorus atom (P) derived from a phosphorus compound are bonded via an oxygen atom (O) is produced, characteristic peaks appear in the infrared absorption spectrum. Here, these characteristic peaks show an absorption peak at a specific wave number, depending on the peripheral environment and structure of the bond. As a result of studies by the inventors, it was found that, when the absorption peak attributed to the M-O-P bond is in the range of 1080 to 1130 cm$^{-1}$, excellent barrier properties and hot-water resistance were exhibited in the resultant composite structural material. Particularly, it was found that, when this absorption peak appears as an absorption peak at the maximum absorption wave number in the region of 800 to 1400 cm$^{-1}$, where the absorption attributed to the bond between an oxygen atom and various atoms can be generally seen, further excellent barrier properties and hot-water resistance were exhibited in the resultant composite structural material.

Although the present invention is not limited thereby at all, the following can be mentioned. When particles of the metal oxide (A) are bonded to each other via a phosphorus atom derived from the phosphorus compound (B) without intermediation of metal atoms that are not derived from the metal oxide (A), so that a bond expressed by M-O-P in which the metal atom (M) constituting the metal oxide (A) and the phosphorus atom (P) are bonded via the oxygen atom (O) is produced, the absorption peak attributed to the M-O-P bond seems to appear in the range of 1080 to 1130 cm$^{-1}$ as an absorption peak at the maximum absorption wave number in the infrared absorption spectrum of the layer (Y) in the region of 800 to 1400 cm$^{-1}$, due to a relatively definite environment, that is, the surface of the particles of the metal oxide (A).

In contrast, in the case where the phosphorus compound (B) and a metal compound that does not form a metal oxide, such as metal alkoxide and metal salt, are mixed beforehand and subjected to hydrolysis condensation, a composite in which metal atoms derived from the metal compound and phosphorus atoms derived from the phosphorus compound (B) are almost homogeneously mixed and reacted is obtained, and the maximum absorption wave number (n$^1$) in the infrared absorption spectrum in the range of 800 to 1400 cm$^{-1}$ is outside the range of 1080 to 1130 cm$^{-1}$.

In order to impart further excellent barrier properties and hot-water resistance to the composite structural material, the above-mentioned maximum absorption wave number (n$^1$) is preferably in the range of 1085 to 1120 cm$^{-1}$, more preferably in the range of 1090 to 1110 cm$^{-1}$.

In the infrared absorption spectrum of the layer (Y) included in the composite structural material (1), an absorption due to stretching vibration of hydroxyl group bonded to various atoms may be observed in the range of 2500 to 4000 cm$^{-1}$. Examples of the hydroxyl group that causes an absorption in this range include a hydroxyl group, in the form of M-OH, present on the surface of the portion of the metal oxide (A), a hydroxyl group, in the form of P-OH, bonded to the phosphorus atom (P) derived from the phosphorus compound (B), and a hydroxyl group, in the form of C-OH, derived from the later-mentioned polymer (C). The amount of hydroxyl group present in the layer (Y) can be associated with the absorbance (A$^2$) at a wave number (n$^2$) of the maximum absorption due to stretching vibration of hydroxyl group in the range of 2500 to 4000 cm$^{-1}$. Here, the wave number (n$^2$) is a wave number at which an infrared absorption due to stretching vibration of hydroxyl group reaches maximum in the infrared absorption spectrum of the layer (Y) in the range of 2500 to 4000 cm$^{-1}$. Hereinafter, the wave number (n$^2$) may be referred to as the "maximum absorption wave number (n$^2$)".

The larger the amount of hydroxyl group present in the layer (Y) is, the more the water vapor barrier properties and hot-water resistance tend to deteriorate due to the hydroxyl group serving as permeation pathway for water molecules. Further, it seems that, in the infrared absorption spectrum of the layer (Y) included in the composite structural material (1), the smaller the ratio of the absorbance (A$^1$) at the above-mentioned maximum absorption wave number (n$^1$) and the above-mentioned absorbance (A$^2$) [Absorbance (A$^2$)/Absorbance (A$^1$)] is, the more effectively the particles of the metal oxide (A) are bonded to each other via a phosphorus atom derived from the phosphorus compound (B). Therefore, the ratio [Absorbance (A$^2$)/Absorbance (A$^1$)] is preferably 0.2 or less, more preferably 0.1 or less, in order to allow the resultant composite structural material to exhibit gas barrier properties and water vapor barrier properties at high levels. The composite structural material (1) in which the layer (Y) has such a ratio [Absorbance (A$^2$)/Absorbance (A$^1$)] as mentioned above can be obtained by adjusting the ratio of the number of moles (N$_M$) of the metal atom constituting the later-mentioned metal oxide (A) and the number of moles (N$_P$) of the phosphorus atom derived from the phosphorus compound (B), heat treatment conditions, etc. In the infrared absorption spectrum of the later-mentioned precursor layer of the layer (Y), a maximum absorbance (A$^{1'}$) in the range of 800 to 1400 cm$^{-1}$ and a maximum absorbance (A$^{2'}$) in the range of 2500 to 4000 cm$^{-1}$ due to stretching vibration of hydroxyl group may satisfy the relationship of Absorbance (A$^{2'}$)/Absorbance (A$^{1'}$)>0.2, in some cases, which however is not particularly restrictive.

In the infrared absorption spectrum of the layer (Y) included in the composite structural material (1), the half width of the absorption peak that reaches maximum at the above-mentioned maximum absorption wave number (n$^1$) is preferably 200 cm$^{-1}$ or less, more preferably 150 cm$^{-1}$ or less, more preferably 130 cm$^{-1}$ or less, still more preferably 110 cm$^{-1}$ or less, further preferably 100 cm$^{-1}$ or less, particularly preferably 50 cm$^{-1}$ or less, in view of the gas barrier properties and water vapor barrier properties of the resultant composite structural material. Although the present invention is not limited thereby at all, the following can be mentioned. When the particles of the metal oxide (A) are bonded to each other via a phosphorus atom, if the particles of the metal oxide (A) are bonded to each other via a phosphorus atom derived from the phosphorus compound (B) without intermediation of metal atoms that are not derived from the metal oxide (A), so that a bond expressed by M—O—P in which the metal atom (M) constituting the metal oxide (A) and the phosphorus atom (P) are bonded via the oxygen atom (O) is produced, the half width of the absorption peak that reaches maximum at the maximum absorption wave number (n$^1$) is in the above-mentioned range, due to a relatively definite environment, that is, the surface of the particles of the metal oxide (A). In this description, the half width of the absorption peak at the maximum absorption wave number (n$^1$) can be obtained by determining the wave numbers at two points where the absorbance is half the absorbance (A$^1$) (Absorbance (A$^1$)/2) in the absorption peak and calculating the difference between the two.

The above-mentioned infrared absorption spectrum of the layer (Y) can be obtained through measurement by the ATR method (total reflection measurement), or the infrared absorption spectrum of the layer (Y) scraped from the composite structural material can be measured by the KBr method.

From one point of view, at least part of the embodiments of the composite structural material (2) is included in the embodiments of the composite structural material (1), and at least part of the examples of the layer (Y) in the composite structural material (2) is included in the examples of the layer (Y) in the composite structural material (1). Therefore, descriptions for the layer (Y) of the composite structural material (1) serve as descriptions for one embodiment of the layer (Y) of the composite structural material (2). Likewise, descriptions for the layer (Y) of the composite structural material (2) serve as descriptions for one embodiment of the layer (Y) of the composite structural material (1). For example, descriptions for the infrared absorption spectrum of the layer (Y) in the composite structural material (1) may apply to the infrared absorption spectrum of the layer (Y) of the composite structural material (2) in some cases. Specifically, descriptions for the layer (Y) in the composite structural material (1) about the positions of the maximum absorption wave numbers (n$^1$) and (n$^2$), the value of [absorbance (A$^2$)/ absorbance (A$^1$)], and the half width of the infrared absorption peak that reaches maximum at the maximum absorption wave number (n$^1$) may apply to those for the layer (Y) of the composite structural material (2) in some cases.

In the layer (Y) included in the composite structural material (2), the shape of each particle of the metal oxide (A) is not specifically limited. Examples thereof include spherical shape, flat shape, polyhedral shape, fibrous shape, and needle shape. Fibrous shape or needle shape is preferred for achieving a composite structural material with further excellent barrier properties and hot-water resistance. The layer (Y) may have particles with a single shape, or may have particles with two or more different shapes. The particle size of the metal oxide (A) is also not specifically limited. Examples thereof include nanometer size to submicron size. However, the particles of the metal oxide (A) preferably have an average particle size in the range of 1 to 100 nm for achieving a composite structural material with further excellent barrier properties and transparency. When the layer (Y) included in the composite structural material (2) has such a microstructure as mentioned above, the barrier properties and hot-water resistance of the composite structural material (2) are improved.

It should be noted that the microstructure of the layer (Y) included in the composite structural material (2) can be checked by observing the cross section of the layer (Y) using a transmission electron microscope (TEM). The size of each particle of the metal oxide (A) in the layer (Y) can be determined by averaging the maximum length in the longest axis of each particle and the maximum length in the axis perpendicular thereto of the particle in the observed image of the cross section of the layer (Y) obtained using the transmission electron microscope (TEM). The above-mentioned average particle size can be determined by averaging the sizes of ten particles arbitrarily selected from particles in the observed image of the cross section.

In an example of the composite structural material (2), the layer (Y) has a structure in which the particles of the metal oxide (A) are bonded to each other via a phosphorus atom derived from the phosphorus compound (B) without intermediation of metal atoms that are not derived from the metal oxide (A). Here, the "structure in which the particles of the metal oxide (A) are bonded to each other via a phosphorus atom derived from the phosphorus compound (B) without intermediation of metal atoms that are not derived from the metal oxide (A)" means a structure in which the main chain of the bond between each two particles of the metal oxide (A) to be bonded has a phosphorus atom derived from the phosphorus compound (B) but does not have metal atoms that are not derived from the metal oxide (A), which structure may include a structure in which the side chain of the bond has a metal atom. The layer (Y) included in the composite structural material (2) may partially have a structure in which the particles of the metal oxide (A) are bonded to each other via both of a phosphorus atom derived from the phosphorus compound (B) and a metal atom (a structure in which the main chain of the bond between each two particles of the metal oxide (A) to be bonded has both of the phosphorus atom derived from the phosphorus compound (B) and the metal atom).

In the layer (Y) included in the composite structural material (2), examples of the bonding form between a phosphorus atom and each particle of the metal oxide (A) include a bonding form in which the metal atom (M) constituting the metal oxide (A) and the phosphorus atom (P) are bonded via the oxygen atom (O). The particles of the metal oxide (A) may be bonded to each other via the phosphorus atom (P) derived from the phosphorus compound (B) of one molecule, or may be bonded via the phosphorus atom (P) derived from the phosphorus compound (B) of two or more molecules. Specific examples of the bonding form between two particles of the metal oxide (A) bonded with each other include the bonding form of (Mα)-O—P—O-(Mβ); the bonding form of (Mα)-O—P—[O—P]$_n$—O-(Mβ); the bonding form of (Mα)-O—P—Z—P—O-(Mβ); and the bonding form of (Mα)-O—P—Z—P—[O—P—Z—P]$_n$—O-(Mβ), in which a metal atom constituting one of the bonded particles of the metal oxide (A) is referred to as (Mα), and a metal atom constituting the other one of the bonded particles of the metal oxide (A) is referred to as (Mβ). In the above-mentioned examples of the bonding form, n denotes an integer of 1 or more, Z denotes, when the phosphorus compound (B) has two or more phosphorus atoms in its molecule, a group of constituent atoms present between the two or more phosphorus atoms, and descriptions for other substituents bonded to the phosphorus atoms are omitted. In the layer (Y) included in the composite structural material (2), one particle of the metal oxide (A) is preferably bonded to a plurality of other particles of the metal oxide (A) from the viewpoint of the barrier properties of the resultant composite structural material.

<Metal Oxide (A)>

Examples of the metal atom (M) constituting the metal oxide (A) include a metal atom with a valence of 2 or more (for example, divalent to tetravalent or trivalent to tetravalent), more specifically, Group 2 metals in the periodic table such as magnesium and calcium; Group 12 metals in the periodic table such as zinc; Group 13 metals in the periodic table such as aluminum; Group 14 metals in the periodic table such as silicon; and transition metals such as titanium and zirconium. Silicon may be classified into semimetal in some cases, but in this description, silicon is deemed to be included in metal. The metal atom (M) constituting the metal oxide (A) may be of one type or of two or more types. Among these, the metal atom (M) constituting the metal oxide (A) is preferably at least one selected from the group consisting of aluminum, titanium, and zirconium, particularly preferably aluminum, for ease of handling in the production of the metal oxide (A) and more excellent barrier properties of the resultant composite structural material.

As the metal oxide (A), those produced by methods such as liquid-phase synthesis, vapor-phase synthesis, and solid grinding can be used. Those produced by the liquid-phase synthesis are preferred in consideration of the production efficiency and the controllability of shape and size of the resultant metal oxide (A).

In the liquid-phase synthesis, the metal oxide (A) can be synthesized as a hydrolyzed condensate of a compound (L) by using the compound (L) in which a hydrolyzable characteristic group is bonded to the metal atom (M) as a raw material and subjecting it to hydrolysis condensation. With regard to production of the hydrolyzed condensate of the compound (L) by liquid-phase synthesis, in addition to the method of using the compound (L) itself as a raw material, the metal oxide (A) can be produced by using a partial hydrolysate of the compound (L) obtained by partial hydrolysis of the compound (L), a total hydrolysate of the compound (L) obtained by total hydrolysis of the compound (L), a partially hydrolyzed condensate of the compound (L) obtained by partial hydrolysis condensation of the compound (L), a partial condensate of the total hydrolysate of the compound (L), or a mixture of two or more of them, as a raw material, and subjecting it to condensation or hydrolysis condensation. The metal oxide (A) thus obtained is also referred to as the "hydrolyzed condensate of the compound (L)" in this description. The type of the above-mentioned hydrolyzable characteristic group (functional group) is not particularly limited. Examples thereof include halogen atom (such as F, Cl, Br, and I), alkoxy group, acyloxy group, diacylmethyl group, and nitro group. Halogen atom or alkoxy group is preferred, and alkoxy group is more preferred, because of their excellent reaction controllability.

The compound (L) preferably includes at least one compound ($L^1$) represented by the following formula (I) for ease of the reaction control and excellent barrier properties of the resultant composite structural material.

$$M^1 X^1{}_m R^1{}_{(n-m)} \quad (I)$$

In the formula (I): $M^1$ is selected from the group consisting of Al, Ti, and Zr; $X^1$ is selected from the group consisting of F, Cl, Br, I, $R^2O-$, $R^3C(=O)O-$, $(R^4C(=O))_2CH-$ and $NO_3$; $R^1$, $R^2$, $R^3$, and $R^4$ each are selected from the group consisting of alkyl group, aralkyl group, aryl group, and alkenyl group; in the case where a plurality of $X^1$ are present in the formula (I), the plurality of $X^1$ may be the same as or different from each other; in the case where a plurality of $R^1$ are present in the formula (I), the plurality of $R^1$ may be the same as or different from each other; in the case where a plurality of $R^2$ are present in the formula (I), the plurality of $R^2$ may be the same as or different from each other; in the case where a plurality of $R^3$ are present in the formula (I), the plurality of $R^3$ may be the same as or different from each other; in the case where a plurality of $R^4$ are present in the formula (I), the plurality of $R^4$ may be the same as or different from each other; n is equal to the valence of $M^1$; and m denotes an integer of 1 to n.

Examples of the alkyl group denoted by $R^1$, $R^2$, $R^3$, and $R^4$ include methyl group, ethyl group, normal propyl group, isopropyl group, normal butyl group, s-butyl group, t-butyl group, and 2-ethylhexyl group. Examples of the aralkyl group denoted by $R^1$, $R^2$, $R^3$, and $R^4$ include benzyl group, phenethyl group, and trityl group. Examples of the aryl group denoted by $R^1$, $R^2$, $R^3$, and $R^4$ include phenyl group, naphthyl group, tolyl group, xylyl group, and mesityl group. Examples of the alkenyl group denoted by $R^1$, $R^2$, $R^3$, and $R^4$ include vinyl group, and allyl group. $R^1$, for example, is preferably alkyl group having 1 to 10 carbon atoms, more preferably alkyl group having 1 to 4 carbon atoms. $X^1$ is preferably F, Cl, Br, I, or $R^2O-$. In one preferred example of the compound ($L^1$), $X^1$ is halogen atom (F, Cl, Br, or I) or alkoxy group ($R^2O-$) having 1 to 4 carbon atoms, and m is equal to n (the valence of $M^1$). $M^1$ is preferably Al, Ti, or Zr, particularly preferably Al, for ease of handling in the production of the metal oxide (A) and more excellent barrier properties of the resultant composite structural material. In one example of the compound (L), $X^1$ is halogen atom (F, Cl, Br, I) or alkoxy group ($R^2O-$) having 1 to 4 carbon atoms, m is equal to n (the valence of $M^1$), and $M^1$ is Al.

Specific examples of the compound ($L^1$) include aluminum compounds such as aluminum chloride, aluminum triethoxide, aluminum tri-normal propoxide, aluminum triisopropoxide, aluminum tri-normal butoxide, aluminum tri-s-butoxide, aluminum tri-t-butoxide, aluminum triacetate, aluminum acetylacetonate, and aluminum nitrate; titanium compounds such as titanium tetraisopropoxide, titanium tetra-normal butoxide, titanium tetra(2-ethylhexoxide), titanium tetramethoxide, titanium tetraethoxide, and titanium acetylacetonate; and zirconium compounds such as zirconium tetra-normal propoxide, zirconium tetrabutoxide, and zirconium tetraacetylacetonate. Among these, the compound ($L^1$) is preferably at least one compound selected from aluminum triisopropoxide and aluminum tri-s-butoxide. One type of the compound ($L^1$) may be used alone, or two types thereof may be used in combination.

As long as the effects of the present invention are obtained, the proportion of the compound ($L^1$) in the compound (L) is not specifically limited. The proportion of a compound other than the compound ($L^1$) in the compound (L), for example, is 20 mol % or less, 10 mol % or less, 5 mol % or less, or 0 mol %. In one example, the compound (L) consists of the compound ($L^1$).

As the compound other than the compound ($L^1$), which is not specifically limited as long as the effects of the present invention are obtained, a compound in which the above-mentioned hydrolyzable characteristic group is bonded to a metal atom such as magnesium, calcium, zinc, and silicon, for example, can be mentioned.

The hydrolysis of the compound (L) allows at least part of the hydrolyzable characteristic group in the compound (L) to be substituted by a hydroxyl group. Further, the resultant hydrolysate is condensed, thereby forming a compound in which the metal atom (M) is bonded via the oxygen atom (O).

This condensation is repeated, as a result of which a compound that can be considered substantially as a metal oxide is formed. Usually, hydroxyl group is present on the surface of the metal oxide (A) thus formed.

In this description, a compound in which the ratio of the number of moles of oxygen atom bonded only to the metal atom (M), as is the oxygen atom (O) in the structure expressed by M-O-M, with respect to the number of moles of metal atom (M) ([The number of moles of oxygen atom (O) bonded only to the metal atom (M)]/[The number of moles of metal atom (M)]) is at least 0.8 is deemed to be included in the metal oxide (A) (for example, the oxygen atom bonded to the metal atom (M) and hydrogen atom (H), as the oxygen atom (O) in the structure expressed by M-O—H, is excluded). In the metal oxide (A), the above-mentioned ratio is preferably at least 0.9, more preferably at least 1.0, further preferably at least 1.1. The upper limit of the above-mentioned ratio is not specifically limited, but is usually expressed as n/2 when the valence of the metal atom (M) is referred to as n.

In order to cause the above-mentioned hydrolysis and condensation, it is important for the compound (L) to have a hydrolyzable characteristic group (functional group). When such a group is not bonded, hydrolysis condensation does not occur or occurs very slowly, which makes it difficult to prepare the target metal oxide (A).

A hydrolyzed condensate can be produced, for example, from a specific raw material by a technique used in a known sol-gel method. As a raw material, at least one selected from the group consisting of the compound (L), a partial hydrolysate of the compound (L), a total hydrolysate of the compound (L), a partially hydrolyzed condensate of the compound (L), and a partial condensate of the total hydrolysate of the compound (L) (which hereinafter may be referred to as a "compound (L)-based component") can be used. These raw materials may be produced using a known method, or commercially available raw materials may be used. Although the raw material is not particularly limited, a condensate to be obtained by hydrolysis condensation of about 2 to 10 of the compound (L), for example, can be used as the raw material. Specifically, a condensate of dimer to decamer obtained by hydrolysis condensation of aluminum triisopropoxide, for example, can be used as a part of the raw material.

The number of molecules to be condensed in the hydrolyzed condensate of the compound (L) can be controlled by the conditions for the condensation or hydrolysis condensation of the compound (L)-based component. For example, the number of molecules to be condensed can be controlled by the amount of water, the type or concentration of catalyst, the temperature or duration of the condensation or hydrolysis condensation, etc.

As mentioned above, the layer (Y) included in the composite structural material (1) includes the reaction product (R), and the reaction product (R) is a reaction product formed by a reaction at least between the metal oxide (A) and the phosphorus compound (B). Meanwhile, the layer (Y) included in the composite structural material (2) has a specific structure in which the particles of the metal oxide (A) are bonded to each other via a phosphorus atom derived from the phosphorus compound (B). Such a reaction product and structure can be formed by mixing the metal oxide (A) and the phosphorus compound (B) to cause a reaction therebetween. The metal oxide (A) to be mixed with the phosphorus compound (B) (immediately before being mixed) may be the metal oxide (A) as it is, or may be in the form of a composition containing the metal oxide (A). In one preferred example, the metal oxide (A) in the form of a liquid (solution or dispersion) obtained by dissolving or dispersing the metal oxide (A) in a solvent is mixed with the phosphorus compound (B).

A preferred method for producing the solution or dispersion of the metal oxide (A) is described below. The case where the metal oxide (A) is aluminum oxide (alumina) is exemplified and a method for producing the dispersion thereof is described herein. However, a similar production method can be employed in the case of producing a solution or dispersion of other metal oxides. A preferred alumina dispersion can be obtained by subjecting aluminum alkoxide to hydrolysis condensation in an aqueous solution whose pH has been adjusted with an acid catalyst, as needed, so as to form an alumina slurry and peptizing it in the presence of a specific amount of acid.

The temperature of the reaction system during the hydrolysis condensation of aluminum alkoxide is not specifically limited. The temperature of the reaction system is normally in the range of 2 to 100° C. When water and aluminum alkoxide are brought into contact, the temperature of the liquid rises. However, as hydrolysis proceeds, alcohol is produced as a by-product, and volatilization of the alcohol may prevent, when the boiling point of the alcohol is lower than that of water, the temperature of the reaction system from rising to or beyond the vicinity of the boiling point of the alcohol in some cases. In such a case, since the growth of alumina may be decelerated, it is effective to heat it to about 95° C. so as to remove the alcohol. The duration of the reaction differs depending on the reaction conditions (the presence or absence of the acid catalyst, the amount and the type thereof, etc.). The duration of the reaction is normally in the range of 0.01 to 60 hours, preferably in the range of 0.1 to 12 hours, more preferably in the range of 0.1 to 6 hours. The reaction can be carried out in an atmosphere of various gases such as air, carbon dioxide, nitrogen, and argon.

The amount of water for use in the hydrolysis condensation is preferably 1 to 200 times (by mol), more preferably 10 to 100 times (by mol), as much as aluminum alkoxide. When the amount of water is less than 1 time (by mol), the hydrolysis does not proceed sufficiently, which is not preferred. On the other hand, when it exceeds 200 times (by mol), the production efficiency decreases or the viscosity increases, which is not preferred. In the case of using a component containing water (such as hydrochloric acid and nitric acid), the use amount of water is preferably determined in consideration of the amount of water to be introduced by such a component.

Examples of the acid catalyst to be used for hydrolysis condensation include hydrochloric acid, sulfuric acid, nitric acid, p-toluenesulfonic acid, benzoic acid, acetic acid, lactic acid, butyric acid, carbonic acid, oxalic acid, and maleic acid. Among these, hydrochloric acid, sulfuric acid, nitric acid, acetic acid, lactic acid, and butyric acid are preferred, and nitric acid and acetic acid are more preferred. In the case of using an acid catalyst in hydrolysis condensation, it is preferred to use it in a suitable amount, depending on the type of acid, so that the pH before the hydrolysis condensation should be in the range of 2.0 to 4.0.

It is also possible to use the alumina slurry obtained through the hydrolysis condensation as it is as an alumina dispersion. However, a transparent alumina dispersion with excellent viscosity stability can be obtained by heating the obtained alumina slurry in the presence of a specific amount of acid and peptizing it.

Examples of the acid to be used in peptization include monovalent organic acids and monovalent inorganic acids, such as nitric acid, hydrochloric acid, perchloric acid, formic acid, acetic acid, and propionic acid. Among these, nitric acid, hydrochloric acid, and acetic acid are preferred, and nitric acid and acetic acid are more preferred.

In the case of using nitric acid or hydrochloric acid as an acid in peptization, the amount thereof is preferably 0.001 to 0.4 times (by mol), more preferably 0.005 to 0.3 times (by mol), as much as aluminum atom. When it is less than 0.001 times (by mol), the peptization may fail to proceed sufficiently, or require a considerable time, in some cases, which is inconvenient. On the other hand, when it exceeds 0.4 times (by mol), the aging stability of the resultant alumina dispersion tends to decrease.

Meanwhile, in the case of using acetic acid as an acid in peptization, the amount thereof is preferably 0.01 to 1.0 times (by mol), more preferably 0.05 to 0.5 times (by mol), as much as aluminum atom. When it is less than 0.01 times (by mol), the peptization may fail to proceed sufficiently, or require a considerable time, in some cases, which is inconvenient. On the other hand, when it exceeds 1.0 times (by mol), the aging stability of the resultant alumina dispersion tends to decrease.

The acid to be present in peptization may be added during hydrolysis condensation. However, in the case where the acid is lost during removal of alcohol produced as a by-product in the hydrolysis condensation, it is preferably added again within the above range of the amount.

An alumina dispersion having a specific particle size with excellent viscosity stability can be produced by carrying out the peptization within the temperature range of 40 to 200° C. and thus allowing the peptization to be completed in a short time with an appropriate amount of acid. When the temperature during the peptization is less than 40° C., the peptization requires a long time. When it exceeds 200° C., the increase in the peptization speed is small, but a high pressure-resistant container, etc., is required, which is economically disadvantageous and therefore not preferred.

After the completion of peptization, dilution with a solvent or concentration by heating may be performed if needed, so that an alumina dispersion having a specific concentration can be obtained. However, in the case of performing concentration by heating, it is preferably performed at 60° C. or less under reduced pressure for suppressing thickening and gelation.

Preferably, the metal oxide (A) to be mixed with the phosphorus compound (B) (when used as a composition, the composition containing the phosphorus compound (B)) is substantially free from phosphorus atoms. However, a small amount of phosphorus atom may be incorporated into the metal oxide (A) to be mixed with the phosphorus compound (B) (when used as a composition, the composition containing the phosphorus compound (B)), for example, due to the influence of impurities during the preparation of the metal oxide (A), in some cases. Therefore, as long as the effects of the present invention are not impaired, the metal oxide (A) to be mixed with the phosphorus compound (B) (when used as a composition, the composition containing the phosphorus compound (B)) may contain a small amount of phosphorus atom. In order to obtain a composite structural material with more excellent barrier properties and hot-water resistance, the content of the phosphorus atom in the metal oxide (A) to be mixed with the phosphorus compound (B) (when used as a composition, the composition containing the phosphorus compound (B)) is preferably 30 mol % or less, more preferably 10 mol % or less, further preferably 5 mol % or less, particularly preferably 1 mol % or less, or may be 0 mol %, when the total number of moles of the metal atoms (M) contained in the metal oxide (A) is taken as a reference (100 mol %).

Although the layer (Y) included in the composite structural material (2) has a specific structure in which the particles of the metal oxide (A) are bonded to each other via a phosphorus atom derived from the phosphorus compound (B), the shape and size of the particles of the metal oxide (A) in the layer (Y) and the shape and size of the particles of the metal oxide (A) to be mixed with the phosphorus compound (B) (when used as a composition, the composition containing the phosphorus compound (B)) may be the same as or different from each other. That is, the shape and size of the particles of the metal oxide (A) used as a raw material for the layer (Y) may vary in the process of forming the layer (Y). Particularly, in the case of using the later-mentioned coating liquid (U) to form the layer (Y), the shape and size thereof may sometimes vary in each step such as in the coating liquid (U), in the later-mentioned liquid (S) to be used for forming the coating liquid (U), or after the coating liquid (U) is applied onto the base (X).

<Phosphorus Compound (B)>

The phosphorus compound (B) has a site capable of reacting with the metal oxide (A), and typically has a plurality of such sites. In one preferred example, the phosphorus compound (B) has 2 to 20 of such sites (atomic groups or functional groups). Examples of such a site include a site capable of reacting with a functional group present on the surface of the metal oxide (A) (for example, hydroxyl group). Examples of such a site include halogen atom directly bonded to a phosphorus atom and an oxygen atom directly bonded to a phosphorus atom. Such halogen atom and oxygen atom can cause a condensation reaction with the hydroxyl group present on the surface of the metal oxide (A) (hydrolysis condensation). The functional group present on the surface of the metal oxide (A) (for example, hydroxyl group) is normally bonded to the metal atom (M) constituting the metal oxide (A).

As the phosphorus compound (B), one having a structure in which halogen atom or oxygen atom is directly bonded to a phosphorus atom, for example, can be used, which can be bonded to the hydroxyl group (hydrolysis) present on the surface of the metal oxide (A) through condensation using the phosphorus compound (B). The phosphorus compound (B) may have one phosphorus atom, or may have two or more phosphorus atoms.

Examples of the phosphorus compound (B) include phosphoric acid, polyphosphoric acid, phosphorous acid, phosphonic acid, and the derivatives thereof. Specific examples of polyphosphoric acid include pyrophosphoric acid, triphosphoric acid, and polyphosphoric acid in which four or more phosphoric acids are condensed. Examples of their derivatives include phosphoric acid, polyphosphoric acid, phosphorous acid, phosphonic acid salt, (partial) ester compounds, halides (chlorides, etc.), and dehydrates (diphosphorus pentoxide, etc.). Examples of the derivatives of phosphonic acid include, a compound in which a hydrogen atom directly bonded to a phosphorus atom of phosphonic acid (H—P(=O)(OH)$_2$) is substituted by an alkyl group that may have various functional groups (such as nitrilotris-(methylenephosphonic acid), and N,N,N',N'-ethylenediaminetetrakis-(methylenephosphonic acid)) and the salts thereof, (partial) ester compounds, halides, and dehydrates. Further, an organic polymer having a phosphorus atom such as phosphorylated starch can also be used as the phosphorus compound (B). One type of the phosphorus compound (B) may be used alone, or two or more types thereof may be used in combination. Among these examples of the phosphorus compound (B), it is preferred to use phosphoric acid alone, or to use phosphoric acid and another phosphorus compound in combination, for rendering the barrier properties of the resultant composite structural material as well as the stability of the later-mentioned coating liquid (U) when used to form the layer (Y) more excellent.

As mentioned above, the layer (Y) included in the composite structural material (1) includes the reaction product (R). The reaction product (R) is a reaction product formed by a reaction at least between the metal oxide (A) and the phosphorus compound (B). The layer (Y) included in the composite structural material (2) has a specific structure in which the particles of the metal oxide (A) are bonded to each other via a phosphorus atom derived from the phosphorus compound (B). Such a reaction product and structure can be formed by mixing the metal oxide (A) and the phosphorus compound (B) to cause a reaction therebetween. The phosphorus compound (B) to be mixed with the metal oxide (A) (immediately before being mixed) may be the phosphorus compound (B) as it is, or may be in the form of a composition containing the phosphorus compound (B), and is preferably in the form of a composition containing the phosphorus compound (B). In one preferred example, the phosphorus compound (B) is mixed with the metal oxide (A) in the form of a solution obtained by dissolving the phosphorus compound (B) in a solvent. In this case, an arbitrary solvent can be used, but water or a mixed solvent containing water can be mentioned as a preferred solvent.

The content of metal atoms in the phosphorus compound (B) or the composition containing the phosphorus compound (B) to be mixed with the metal oxide (A) is preferably reduced, in order to obtain a composite structural material with more excellent barrier properties and hot-water resistance. The content of metal atoms in the phosphorus compound (B) or the composition containing the phosphorus compound (B) to be mixed with the metal oxide (A) is preferably 100 mol % or less, more preferably 30 mol % or less, further preferably 5 mol % or less, particularly preferably 1 mol % or less, or may be 0 mol %, when the total number of moles of the phosphorus atom contained in the phosphorus compound (B) or the composition containing the phosphorus compound (B) is taken as a reference (100 mol %).

<Reaction Product (R)>

The reaction product (R) includes a reaction product produced by a reaction between only the metal oxide (A) and the phosphorus compound (B). The reaction product (R) also includes a reaction product produced by a reaction of the metal oxide (A), the phosphorus compound (B), and another compound, in addition. The reaction product (R) can be formed by a method described in the later-mentioned production method.

<Ratio of the Metal Oxide (A) and the Phosphorus Compound (B)>

In the layer (Y), the ratio of the number of moles ($N_M$) of the metal atom constituting the metal oxide (A) and the number of moles ($N_P$) of the phosphorus atom derived from the phosphorus compound (B) preferably satisfies the relationship of $0.8 \leq$ Number of moles ($N_M$)/Number of moles ($N_P$) $\leq 4.5$, more preferably satisfies the relationship of $1.0 \leq$ Number of moles ($N_M$)/Number of moles ($N_P$) $\leq 3.6$, further preferably satisfies the relationship of $1.1 \leq$ Number of moles ($N_M$)/Number of moles ($N_P$) $\leq 3.0$. When the value of Number of moles ($N_M$)/Number of moles ($N_P$) exceeds 4.5, the metal oxide (A) becomes excessive relative to the phosphorus compound (B), and thus the bond between the particles of the metal oxide (A) is rendered insufficient, while the amount of hydroxyl group present on the surface of the metal oxide (A) increases, thereby resulting in a tendency for the barrier properties and hot-water resistance to deteriorate. On the other hand, when the value of Number of moles ($N_M$)/Number of moles ($N_P$) is less than 0.8, the phosphorus compound (B) becomes excessive relative to the metal oxide (A), and thus the excess of the phosphorus compound (B) that is not involved in the bond with the metal oxide (A) increases, while the amount of hydroxyl group derived from the phosphorus compound (B) is likely to increase, thereby resulting also in a tendency for the barrier properties and hot-water resistance to deteriorate.

The above-mentioned ratio can be adjusted by the ratio of the amount of the metal oxide (A) and the amount of the phosphorus compound (B) in the coating liquid for forming the layer (Y). The ratio of the number of moles ($N_M$) and the number of moles ($N_P$) in the layer (Y) is usually a ratio in the coating liquid, and is the same as the ratio of the number of moles of metal atom constituting the metal oxide (A) and the number of moles of phosphorus atom constituting the phosphorus compound (B).

<Polymer (C)>

The layer (Y) may further include a specific polymer (C). The polymer (C) is a polymer having at least one functional group (f) selected from the group consisting of hydroxyl group, carboxyl group, carboxylic anhydride group, and a salt of carboxyl group. In the layer (Y) included in the composite structural material (1), the polymer (C) may be bonded directly or indirectly to one or both of the particles of the metal oxide (A) and the phosphorus atom derived from the phosphorus compound (B) via its functional group (f). In the layer (Y) included in the composite structural material (1), the reaction product (R) may have a polymer (C) portion that is produced, for example, by a reaction of the polymer (C) with the metal oxide (A) or the phosphorus compound (B). In the layer (Y) of the composite structural material (2), the polymer (C) may be bonded directly or indirectly to one or both of the particle of the metal oxide (A) and the phosphorus atom derived from the phosphorus compound (B) via its functional group (f). In this description, a polymer that satisfies the requirements as the phosphorus compound (B) and has the functional group (f) is not included in the polymer (C) and treated as the phosphorus compound (B).

As the polymer (C), a polymer containing a constitutional unit having the functional group (f) can be used. Specific examples of such a constitutional unit include a constitutional unit having at least one functional group (f) such as vinyl alcohol unit, acrylic acid unit, methacrylic acid unit, maleic acid unit, itaconic acid unit, maleic anhydride unit, and phthalic anhydride unit. The polymer (C) may contain only one type of the constitutional unit having the functional group (f), or may contain two or more types of the constitutional unit having the functional group (f).

In order to obtain a composite structural material with more excellent barrier properties and hot-water resistance, the proportion of the constitutional unit having the functional group (f) in all constitutional units of the polymer (C) is preferably at least 10 mol %, more preferably at least 20 mol %, further preferably at least 40 mol %, particularly preferably at least 70 mol %, or may be 100 mol %.

In the case where the polymer (C) is composed of the constitutional unit having the functional group (f) and another constitutional unit, the type of such another constitutional unit is not specifically limited. Examples of such another constitutional unit include a constitutional unit derived from (meth)acrylic acid ester such as methyl acrylate unit, methyl methacrylate unit, ethyl acrylate unit, ethyl methacrylate unit, butyl acrylate unit, and butyl methacrylate unit; a constitutional unit derived from vinyl ester such as vinyl formate unit and vinyl acetate unit; a constitutional unit derived from aromatic vinyl such as styrene unit and p-styrenesulfonic acid unit; and a constitutional unit derived from olefin such as ethylene unit, propylene unit, and isobutylene unit. In the case where the polymer (C) contains two or more types of constitutional units, the polymer (C) may be any one of an alternating copolymer, a random copolymer, a block copolymer, and a tapered copolymer.

Specific examples of the polymer (C) having hydroxyl group include polyvinyl alcohol, a partially saponified product of polyvinyl acetate, polyethylene glycol, polyhydroxy ethyl (meth)acrylate, polysaccharides such as starch, and polysaccharide derivatives derived from polysaccharides. Specific examples of the polymer (C) having carboxyl group, carboxylic anhydride group, or a salt of carboxyl group include polyacrylic acid, polymethacrylic acid, poly(acrylic acid/methacrylic acid), and the salts thereof. Specific examples of the polymer (C) containing a constitutional unit free from the functional group (f) include ethylene-vinyl alcohol copolymer, ethylene-maleic anhydride copolymer, styrene-maleic anhydride copolymer, isobutylene-maleic anhydride alternating copolymer, ethylene-acrylic acid copolymer, and a saponified product of ethylene-ethyl acrylate copolymer. In order to obtain a composite structural material with more excellent barrier properties and hot-water resistance, the polymer (C) is preferably at least one polymer selected from the group consisting of polyvinyl alcohol, ethylene-vinyl alcohol copolymer, polysaccharides, polyacrylic acid, a salt of polyacrylic acid, polymethacrylic acid, and a salt of polymethacrylic acid.

The molecular weight of the polymer (C) is not particularly limited. In order to obtain a composite structural material with more excellent barrier properties and mechanical properties (such as drop impact strength), the number average molecular weight of the polymer (C) is preferably at least 5,000, more preferably at least 8,000, further preferably at least 10,000. The upper limit of the number average molecular weight of the polymer (C) is not specifically limited, which, for example, is 1,500,000 or less.

For further improved barrier properties, the content of the polymer (C) in the layer (Y) is preferably 50 mass % or less, more preferably 40 mass % or less, further preferably 30 mass % or less, or may be 20 mass % or less, when the mass of the layer (Y) is taken as a reference (100 mass %). The polymer (C) may or may not be reacted with other components in the layer (Y). In this description, the polymer (C) even when reacted with other components is referred to as the polymer (C). For example, the polymer (C) bonded to the metal oxide (A) and/or a phosphorus atom derived from the phosphorus compound (B) is referred to as the polymer (C). In this case, the above-mentioned content of the polymer (C) is calculated by dividing the mass of the polymer (C) before being bonded to the metal oxide (A) and/or the phosphorus atom by the mass of the layer (Y).

The layer (Y) included in the composite structural material (1) may consist of the reaction product (R) (which includes one having a polymer (C) portion) formed by a reaction at least between the metal oxide (A) and the phosphorus compound (B), or may be consist of the unreacted polymer (C) and the reaction product (R), but may also contain other components additionally. Meanwhile, the layer (Y) included in the composite structural material (2) may consist of the particles of the metal oxide (A), and a component derived from the phosphorus compound (B) including the phosphorus atom bonding the particles to each other, or may be consist of these and the polymer (C) (which includes one bonded to the particles of the metal oxide (A) and/or the phosphorus atom derived from the phosphorus compound (B)), but may also contain other components additionally.

Examples of the above-mentioned other components include inorganic acid metal salts such as carbonate, hydrochloride, nitrate, hydrogencarbonate, sulfate, hydrogensulfate, borate, and aluminate; organic acid metal salts such as oxalate, acetate, tartrate, and stearate; metal complexes such as acetylacetonate metal complex (such as aluminum acetylacetonate), cyclopentadienyl metal complex (such as titanocene), and cyano metal complex; a layered clay compound; a crosslinking agent; a polymeric compound other than the polymer (C); a plasticizer; an antioxidant; an ultraviolet absorber; and a flame retardant.

The content of the above-mentioned other components in the layer (Y) of the composite structural material (1) or in the layer (Y) of the composite structural material (2) is preferably 50 mass % or less, more preferably 20 mass % or less, further preferably 10 mass % or less, particularly preferably 5 mass % or less, or may be 0 mass % (free from such other components).

<Thickness of the Layer (Y)>

The thickness of the layer (Y) included in the composite structural material of the present invention (when the composite structural material has two or more layers of the layer (Y), the total thickness of the layers (Y)) is preferably 4.0 μm or less, more preferably 2.0 μm or less, further preferably 1.0 μm or less, particularly preferably 0.9 μm or less. A reduction in the thickness of the layer(s) (Y) allows the change in the size of the composite structural material to be kept low in processing such as printing and lamination, and further increases the flexibility of the composite structural material. Thus, it is possible to make the mechanical properties of the composite structural material close to the original mechanical properties of the base. The composite structural material of the present invention allows the moisture transmission rate under conditions of 40° C. and 90/0% RH (relative humidity) to be 5 g/(m$^2$·day) or less and the oxygen transmission rate under conditions of 20° C. and 85% RH (relative humidity) to be 1 ml/(m$^2$·day·atm) or less, even when the total thickness of the layer(s) (Y) is 1.0 μm or less (for example, 0.9 μm or less). The term "90/0% RH" herein means that, with respect to the composite structural material, the relative humidity on one side is 90% and the relative humidity on the other side is 0%. The thickness of the layer (Y) (when the composite structural material has two or more layers of the layer (Y), the total thickness of the layers (Y)) is preferably at least 0.1 μm (for example, at least 0.2 μm). The thickness of the layer (Y) per layer is preferably at least 0.05 μm (for example, at least 0.15 μm) for better barrier properties of the composite structural material of the present invention. The thickness of the layer(s) (Y) can be controlled by the concentration of the later-mentioned coating liquid (U) to be used for forming the layer (Y) and the application method thereof.

<Base (X)>

The material of the base (X) included in the composite structural material of the present invention is not particularly limited, and bases made of various materials can be used therefor. Examples of the material of the base (X) include resins such as thermoplastic resins and thermosetting resins; fiber assemblies such as fabrics and papers; woods; glasses; metals; and metal oxides. The base may have a composite structure or multilayered structure composed of a plurality of materials.

The form of the base (X) is not particularly limited, and the base may be a layer-like base such as a film or sheet, or may be a formed product having a solid shape in various forms, for example, of a sphere, polyhedron, and a pipe. Among these, a layer-like base is particularly useful when the composite structural material (layered structural material) is used as a packaging material for packaging foods, etc.

Examples of the layer-like base include single-layer or multilayer bases including at least one layer selected from the group consisting of a thermoplastic resin film layer, a thermosetting resin film layer, a fibrous polymer sheet (such as fabrics and papers) layer, a wood sheet layer, a glass layer, an inorganic deposited layer, and a metal foil layer. Among these, bases including at least one layer selected from the group consisting of a thermoplastic resin film layer, a paper layer, and an inorganic deposited layer are preferred, and such a base may be single layered or multilayered. A composite structural material (layered structural material) using such a base is excellent in processability into a packaging material and various properties when used as a packaging material.

Examples of the thermoplastic resin film for forming a thermoplastic resin film layer include films to be obtained by subjecting, to a forming process, thermoplastic resins such as polyolefin resins, e.g., polyethylene and polypropylene; polyester resins, e.g., polyethylene terephthalate, polyethylene-2, 6-naphthalate, polybutylene terephthalate, and the copolymers thereof, polyamide resins, e.g., nylon-6, nylon-66, and nylon-12; hydroxyl group-containing polymers, e.g., polyvinyl alcohol and ethylene-vinyl alcohol copolymer; polystyrene; poly(meth)acrylic acid ester; polyacrylonitrile; polyvinyl acetate; polycarbonate; polyarylate; regenerated cellulose; polyimide; polyetherimide; polysulfone; polyethersulfone; polyetheretherketone; and ionomer resin. Preferred examples of the base of the layered product to be used as a packaging material for packaging foods include films made of polyethylene, polypropylene, polyethylene terephthalate, nylon 6, or nylon 66.

The thermoplastic resin film may be a stretched film or may be an unstretched film. Stretched films, particularly biaxially stretched films, are preferred in order for the resultant composite structural material to have excellent processability (e.g., in printing or lamination). The biaxially stretched film may be a biaxially stretched film produced using any method of simultaneous biaxial stretching, sequential biaxial stretching, and tubular stretching.

Examples of the paper to be used for the paper layer include Kraft paper, pure paper, simili paper, glassine paper, parchment paper, synthetic paper, white board, manila board, milk-carton board, cupboard, ivory paper, etc. A layered structural material for a paper container can be obtained by using a base including a paper layer.

The inorganic deposited layer preferably has barrier properties against oxygen gas and water vapor. As the inorganic deposited layer, one having shielding properties such as a deposited layer of metal, e.g., aluminum or one having transparency can be appropriately used. The inorganic deposited layer can be formed by depositing an inorganic substance on the base, and a layered product including a base on which an inorganic deposited layer is formed as a whole can be used as the base (X) having a multilayer structure. Examples of the inorganic deposited layer having transparency include a layer formed from inorganic oxides such as aluminum oxide, silicon oxide, silicon oxynitride, magnesium oxide, tin oxide, and a mixture thereof, a layer formed from inorganic nitrides such as silicon nitride and silicon carbonitride; and a layer formed from inorganic carbides such as silicon carbide. Among these, a layer formed from aluminum oxide, silicon oxide, magnesium oxide, or silicon nitride is preferred for achieving excellent barrier properties against oxygen gas and water vapor.

A preferred thickness of the inorganic deposited layer differs depending on the type of the components of the inorganic deposited layer, which however is usually in the range of 2 to 500 nm. The thickness can be selected in this range so that the composite structural material has good barrier properties and mechanical properties. If the thickness of the inorganic deposited layer is less than 2 nm, the inorganic deposited layer tends to have reduced reproducibility in exhibiting the barrier properties against oxygen gas and water vapor, and the inorganic deposited layer may fail to exhibit sufficient barrier properties in some cases. Meanwhile, if the thickness of the inorganic deposited layer exceeds 500 nm, the inorganic deposited layer tends to have reduced barrier properties when the composite structural material is stretched or bent. The thickness of the inorganic deposited layer is more preferably in the range of 5 to 200 nm, further preferably in the range of 10 to 100 nm.

Examples of the method for forming the inorganic deposited layer include vacuum deposition, sputtering, ion plating, chemical vapor deposition (CVD), etc. Among these, vacuum deposition is preferred from the viewpoint of productivity. A preferred heating method that is employed for carrying out vacuum deposition is one of electron beam heating, resistance heating, and induction heating. In order to improve the adhesion to the base on which the inorganic deposited layer is formed and the denseness of the inorganic deposited layer, plasma assisted deposition or ion beam assisted deposition may be employed in the deposition. In order to enhance the transparency of the inorganic deposited layer, reactive evaporation in which a reaction is caused, for example, by injecting oxygen gas may be employed in the deposition.

In the case where the base (X) is a layer-like base, the thickness thereof is preferably in the range of 1 to 200 μm, more preferably in the range of 5 to 100 μm, further preferably in the range of 7 to 60 μm, for better mechanical strength and processability of the resultant composite structural material.

<Adhesive Layer (H)>

In the composite structural material of the present invention, the layer (Y) may be stacked so as to be directly in contact with the base (X), or the layer (Y) may be stacked on the base (X) via an adhesive layer (H) interposed between the base (X) and the layer (Y). This configuration may enhance the adhesiveness between the base (X) and the layer (Y) in some cases. The adhesive layer (H) may be formed of an adhesive resin. The adhesive layer (H) made of an adhesive resin can be formed by treating the surface of the base (X) with a known primer, or applying a known adhesive onto the surface of the base (X). As such an adhesive, a two-component reactive polyurethane adhesive in which a polyisocyanate component and a polyol component are mixed together to react with each other is preferred. It may sometimes be possible to further enhance the adhesiveness by adding a small amount of additive such as a known silane coupling agent to the primer or the adhesive. Preferred examples of the silane coupling agent include a silane coupling agent having a reactive group such as isocyanate group, epoxy group, amino group, ureide group, and mercapto group. A strong bond between the base (X) and the layer (Y) via the adhesive layer (H) can more effectively suppress deterioration in barrier properties and appearance when the composite structural material of the present invention is subjected to processing such as printing and lamination.

It is possible to enhance the strength of the composite structural material of the present invention by increasing the thickness of the adhesive layer (H). However, when the thickness of the adhesive layer (H) is increased excessively, the appearance tends to deteriorate. The thickness of the adhesive layer (H) is preferably in the range of 0.03 to 0.18 μm. Such an adhesive layer can effectively suppress deterioration in barrier properties and appearance when the composite structural material of the present invention is subjected to processing such as printing and lamination. In addition, the adhesive layer can enhance the drop strength of the packaging material that uses the composite structural material of the present invention. The thickness of the adhesive layer (H) is more preferably in the range of 0.04 to 0.14 μm, further preferably in the range of 0.05 to 0.10 μm.

<Structure of the Composite Structural Material>

The composite structural material (layered product) of the present invention may consist of the base (X) and the layer (Y), or may consist of the base (X), the layer (Y), and the adhesive layer (H). The composite structural material of the present invention may include a plurality of layers (Y). The composite structural material of the present invention may further include a member other than the base (X), the layer (Y), and the adhesive layer (H) (for example, an additional layer such as a thermoplastic resin film layer, a paper layer, and an inorganic deposited layer). The composite structural material of the present invention having such another member (additional layer, etc.) can be produced by forming or bonding such another member (additional layer, etc.) directly, or via an adhesive layer, on the layer (Y) that has been stacked directly, or via the adhesive layer (H), on the base (X). The properties of the composite structural material can be improved, or new properties can be imparted thereto, by allowing the composite structural material to include such another member (additional layer, etc.). For example, heat-sealing properties can be imparted to the composite structural material of the present invention, or the barrier properties and mechanical properties can be further improved.

Particularly, the use of a polyolefin layer as the outermost layer of the composite structural material of the present invention can impart heat-sealing properties to the composite structural material, or improve the mechanical properties of the composite structural material. In order to improve the heat-sealing properties and mechanical properties, the polyolefin is preferably polypropylene or polyethylene. Further, in order to improve the mechanical properties of the composite structural material, at least one film selected from the group consisting of a film made of polyester, a film made of polyamide, and a film made of a hydroxyl group-containing polymer is preferably stacked as an additional layer. In order to improve the mechanical properties, polyethylene terephthalate (PET) is preferred as the polyester, nylon-6 is preferred as the polyamide, and ethylene-vinyl alcohol copolymer is preferred as the hydroxyl group-containing polymer. A primer layer or a layer formed of an adhesive may be provided between the respective layers, as required.

Specific examples of the structure of the composite structural material of the present invention are shown below. In the following specific examples, each layer may be replaced by a formed product made of the material of the layer (formed product having a solid shape). It should be noted that, although the composite structural material may have adhesive layers such as the adhesive layer (H), descriptions for such adhesive layers are omitted in the following specific examples.

(1) Layer (Y)/Polyester layer
(2) Layer (Y)/Polyester layer/Layer (Y)
(3) Layer (Y)/Polyamide layer
(4) Layer (Y)/Polyamide layer/Layer (Y)
(5) Layer (Y)/Polyolefin layer
(6) Layer (Y)/Polyolefin layer/Layer (Y)
(7) Layer (Y)/Hydroxyl group-containing polymer layer
(8) Layer (Y)/Hydroxyl group-containing polymer layer/Layer (Y)
(9) Layer (Y)/Paper layer
(10) Layer (Y)/Paper layer/Layer (Y)
(11) Layer (Y)/Deposited inorganic layer/Polyester layer
(12) Layer (Y)/Deposited inorganic layer/Polyamide layer
(13) Layer (Y)/Deposited inorganic layer/Polyolefin layer
(14) Layer (Y)/Deposited inorganic layer/Hydroxyl group-containing polymer layer
(15) Layer (Y)/Polyester layer/Polyamide layer/Polyolefin layer
(16) Layer (Y)/Polyester layer/Layer (Y)/Polyamide layer/Polyolefin layer
(17) Polyester layer/Layer (Y)/Polyamide layer/Polyolefin layer
(18) Layer (Y)/Polyamide layer/Polyester layer/Polyolefin layer
(19) Layer (Y)/Polyamide layer/Layer (Y)/Polyester layer/Polyolefin layer
(20) Polyamide layer/Layer (Y)/Polyester layer/Polyolefin layer
(21) Layer (Y)/Polyolefin layer/Polyamide layer/Polyolefin layer
(22) Layer (Y)/Polyolefin layer/Layer (Y)/Polyamide layer/Polyolefin layer
(23) Polyolefin layer/Layer (Y)/Polyamide layer/Polyolefin layer
(24) Layer (Y)/Polyolefin layer/Polyolefin layer
(25) Layer (Y)/Polyolefin layer/Layer (Y)/Polyolefin layer
(26) Polyolefin layer/Layer (Y)/Polyolefin layer
(27) Layer (Y)/Polyester layer/Polyolefin layer
(28) Layer (Y)/Polyester layer/Layer (Y)/Polyolefin layer
(29) Polyester layer/Layer (Y)/Polyolefin layer
(30) Layer (Y)/Polyamide layer/Polyolefin layer
(31) Layer (Y)/Polyamide layer/Layer (Y)/Polyolefin layer
(32) Polyamide layer/Layer (Y)/Polyolefin layer
(33) Layer (Y)/Polyester layer/Paper layer
(34) Layer (Y)/Polyamide layer/Paper layer
(35) Layer (Y)/Polyolefin layer/Paper layer
(36) Polyolefin layer/Paper layer/Polyolefin layer/Layer (Y)/Polyester layer/Polyolefin layer
(37) Polyolefin layer/Paper layer/Polyolefin layer/Layer (Y)/Polyamide layer/Polyolefin layer
(38) Polyolefin layer/Paper layer/Polyolefin layer/Layer (Y)/Polyolefin layer
(39) Paper layer/Polyolefin layer/Layer (Y)/Polyester layer/Polyolefin layer
(40) Polyolefin layer/Paper layer/Layer (Y)/Polyolefin layer
(41) Paper layer/Layer (Y)/Polyester layer/Polyolefin layer
(42) Paper layer/Layer (Y)/Polyolefin layer
(43) Layer (Y)/Paper layer/Polyolefin layer
(44) Layer (Y)/Polyester layer/Paper layer/Polyolefin layer
(45) Polyolefin layer/Paper layer/Polyolefin layer/Layer (Y)/Polyolefin layer/Hydroxyl group-containing polymer layer
(46) Polyolefin layer/Paper layer/Polyolefin layer/Layer (Y)/Polyolefin layer/Polyamide layer
(47) Polyolefin layer/Paper layer/Polyolefin layer/Layer (Y)/Polyolefin layer/Polyester layer According to the present invention, a composite structural material having at least one of the following performances can be obtained. In one preferred example, a composite structural material in which the thickness of the layer (Y) (when the composite structural material has two or more layers of the layer (Y), the total thickness of the layers (Y)) is 1.0 μm or less (for example, 0.9 μm or less, 0.8 μm or less, or 0.5 μm or less) shows at least one of the following performances.

(Performance 1) The moisture transmission rate under conditions of 40° C. and 90/0% RH is 5 g/(m²·day) or less, more preferably 1 g/(m²·day) or less, further preferably 0.5 g/(m²·day) or less.

(Performance 2) The oxygen transmission rate under conditions of 20° C. and 85% RH is 1 ml/(m²·day·atm) or less, more preferably 0.7 ml/(m²·day·atm) or less, further preferably 0.4 ml/(m²·day·atm) or less.

(Performance 3) The moisture transmission rate under conditions of 40° C. and 90/0% RH after immersion in hot water of 120° C. for 30 minutes is not more than twice the moisture transmission rate under conditions of 40° C. and 90/0% RH before the immersion.

(Performance 4) The oxygen transmission rate under conditions of 20° C. and 85% RH after immersion in hot water of 120° C. for 30 minutes is not more than twice the oxygen transmission rate under conditions of 20° C. and 85% RH before the immersion.

<Applications>

The composite structural material of the present invention is excellent both in gas barrier properties and water vapor barrier properties, and can maintain both barrier properties at high levels even after retorting. Further, the present invention allows a composite structural material with excellent appearance to be obtained. Therefore, the composite structural material of the present invention can be applied to various uses. The composite structural material of the present invention is particularly preferably used as a packaging material. Examples of applications other than the packaging material include electronic device-related films such as a substrate film for LCDs, a substrate film for organic EL devices, a substrate film for electronic paper, a sealing film for electronic devices, a film for PDPs, a film for LEDs, a film for IC tags, a backsheet for solar cells, and a protective film for solar cells, a member for optical communications, a flexible film for electronic equipment, a barrier membrane for fuel cells, a sealing film for fuel cells, and a substrate film for various functional films.

This packaging material can be applied to various uses, and is preferably used in applications that require barrier properties against oxygen or water vapor, and applications in which the air inside the packaging material is replaced by various functional gases. For instance, the packaging material of the present invention is preferably used as a food-packaging material (particularly a packaging material for retort foods). When used as a packaging material for retort foods, it is particularly preferably used in a folded form such as a stand-up pouch. The packaging material of the present invention can also be preferably used as a packaging material for packaging, for example, chemicals such as agricultural chemicals and medicines; medical devices; industrial materials such as machine parts and precision materials; and garments, other than as a food-packaging material.

The formed product of the present invention is formed using the packaging material of the present invention. The formed product of the present invention may be a vertical form fill seal pouch, a vacuum packaging pouch, a pouch with a spout, a laminated tube container, an infusion bag, a lidding film, a paper container, or a vacuum insulator. The formed product of the present invention may also be a formed product other than the vacuum insulator.

The formed product of the present invention may be a vertical form fill seal pouch for packaging, for example, foods or beverages in the form such as liquid, viscous body, powder, solid bulk, or a combination of these. The vertical form fill seal pouch of the present invention has excellent gas barrier properties and water vapor barrier properties. Its gas barrier properties and water vapor barrier properties are less deteriorated even after bending or after retorting. Therefore, the vertical form fill seal pouch can suppress the deterioration in the quality of the content over a long period of time.

The vertical form fill seal pouch of the present invention is generally subjected to heat sealing. Therefore, it is generally necessary that a heat sealable layer be disposed on a side that serves as the inner portion of the pouch or each of both sides that serve as the inner portion and the outer portion of the pouch, in the layered product that forms the vertical form fill seal pouch. In the case where the heat sealable layer is present only on the side that serves as the inner portion of the pouch, the body part is generally sealed with a fin seal. In the case where the heat sealable layer is present on each of both sides that serve as the inner portion and the outer portion of the pouch, the body part is generally sealed with a lap seal. Preferred examples of the heat sealable layer include a polyolefin layer (hereinafter also referred to as a "PO layer").

Hereinafter, a multilayer film including the base (X) and the layer (Y) stacked on the base (X) may be referred to as a multilayer barrier film. This multilayer barrier film is also one type of the composite structural material of the present invention. Layers for imparting various properties (for example, heat-sealing properties) may be stacked on the multilayer barrier film. For example, the composite structural material of the present invention may have a structure of Multilayer barrier film/Adhesive layer/Polyolefin layer, or Polyolefin layer/Adhesive layer/Multilayer barrier film/Adhesive layer/Polyolefin layer. That is, the composite structural material of the present invention may include a polyolefin layer disposed on one outermost surface. Further, the composite structural material of the present invention may include a first polyolefin layer disposed on one outermost surface and a second polyolefin layer disposed on the other outermost surface. The first polyolefin layer and the second polyolefin layer may be the same as or different from each other.

The composite structural material used as the vertical form fill seal pouch may have the following structure from the layer to serve as the outer portion of the vertical form fill seal pouch toward the layer to serve as the inner portion thereof.

(1) Multilayer barrier film/PO layer
(2) Inorganic deposited film layer/Multilayer barrier film/PO layer
(3) Multilayer barrier film/Inorganic deposited film layer/PO layer
(4) Multilayer barrier film/Polyamide layer/PO layer
(5) Inorganic deposited film layer/Multilayer barrier film/Polyamide layer/PO layer
(6) Multilayer barrier film/Inorganic deposited film layer/Polyamide layer/PO layer
(7) Polyamide layer/Multilayer barrier film/PO layer
(8) Polyamide layer/Inorganic deposited film layer/Multilayer barrier film/PO layer
(9) Polyamide layer/Multilayer barrier film/Inorganic deposited film layer/PO layer
(10) Polyamide layer/Multilayer barrier film/Polyamide layer/PO layer
(11) Polyamide layer/Inorganic deposited film layer/Multilayer barrier film/Polyamide layer/PO layer
(12) Polyamide layer/Multilayer barrier film/Inorganic deposited film layer/Polyamide layer/PO layer
(13) Polyester layer/Multilayer barrier film/PO layer
(14) Polyester layer/Multilayer barrier film/Polyamide layer/PO layer
(15) Polyester layer/Inorganic deposited film layer/Multilayer barrier film/PO layer

(16) Polyester layer/Inorganic deposited film layer/Multilayer barrier film/Polyamide layer/PO layer
(17) Polyester layer/Multilayer barrier film/Inorganic deposited film layer/PO layer
(18) Polyester layer/Multilayer barrier film/Inorganic deposited film layer/Polyamide layer/PO layer
(19) Multilayer barrier film/EVOH layer/PO layer
(20) Multilayer barrier film/EVOH layer/Polyamide layer/PO layer
(21) PO layer/Multilayer barrier film/PO layer
(22) PO layer/Multilayer barrier film/Polyamide layer/PO layer
(23) PO layer/Polyamide layer/Multilayer barrier film/PO layer
(24) PO layer/Polyester layer/Multilayer barrier film/PO layer
(25) PO layer/Inorganic deposited film layer/Multilayer barrier film/PO layer
(26) PO layer/Multilayer barrier film/Inorganic deposited film layer/PO layer
(27) PO layer/Polyamide layer/Inorganic deposited film layer/Multilayer barrier film/PO layer
(28) PO layer/Polyamide layer/Multilayer barrier film/Inorganic deposited film layer/PO layer
(29) PO layer/Polyamide layer/Inorganic deposited film layer/Multilayer barrier film/Polyamide layer/PO layer
(30) Polyamide layer/Multilayer barrier film/Inorganic deposited film layer/Polyamide layer/PO layer
(31) PO layer/Polyester layer/Inorganic deposited film layer/Multilayer barrier film/PO layer
(32) PO layer/Polyester layer/Inorganic deposited film layer/Multilayer barrier film/Polyamide layer/PO layer
(33) PO layer/Polyester layer/Multilayer barrier film/Inorganic deposited film layer/PO layer
(34) PO layer/Polyester layer/Multilayer barrier film/Inorganic deposited film layer/Polyamide layer/PO layer
(35) PO layer/EVOH layer/Multilayer barrier film/PO layer
(36) PO layer/EVOH layer/Multilayer barrier film/Polyamide layer/PO layer
(37) PO layer/Multilayer barrier film/EVOH layer/PO layer
(38) PO layer/Multilayer barrier film/EVOH layer/Polyamide layer/PO layer
(39) Multilayer barrier film/Polyamide layer/EVOH layer/PO layer
(40) Polyamide layer/Multilayer barrier film/EVOH layer/PO layer
(41) Polyamide layer/Multilayer barrier film/EVOH layer/Polyamide layer/PO layer
(42) Polyamide layer/Multilayer barrier film/Polyamide layer/EVOH layer/PO layer
(43) Paper layer/PO layer/Multilayer barrier film/PO layer
(44) Paper layer/PO layer/Multilayer barrier film/Polyamide layer/PO layer
(45) Paper layer/PO layer/Polyamide layer/Multilayer barrier film/PO layer
(46) Paper layer/PO layer/Multilayer barrier film/EVOH layer/PO layer
(47) Paper layer/PO layer/Multilayer barrier film/EVOH layer/Polyamide layer/PO layer
(48) PO layer/Paper layer/PO layer/Multilayer barrier film/Polyolefin layer
(49) PO layer/Paper layer/PO layer/Multilayer barrier film/Polyamide layer/PO layer
(50) PO layer/Paper layer/PO layer/Polyamide layer/Multilayer barrier film/PO layer
(51) PO layer/Paper layer/PO layer/Multilayer barrier film/EVOH layer/PO layer
(52) PO layer/Paper layer/PO layer/Multilayer barrier film/EVOH layer/Polyamide layer/PO layer Particularly preferred examples of the structure of the composite structural material as the vertical form fill seal pouch include structures of: Multilayer barrier film/Polyamide layer/PO layer; Multilayer barrier film/PO layer; and PO layer/Multilayer barrier film/PO layer. In these structures, a polyamide film, for example, can be used as the base of the multilayer barrier film. The vertical form fill seal pouch exhibits particularly excellent gas barrier properties and water vapor barrier properties after forming the pouch, after heat sterilization, and after heat sterilization/transportation. An adhesive layer may be provided between each two adjacent layers that form the above-mentioned vertical form fill seal pouch. In the case where the layer (Y) of the composite structural material of the present invention is provided on one surface of the base, the layer (Y) may face either internally or externally of the vertical form fill seal pouch.

The formed product of the present invention may be a vacuum packaging pouch for packaging foods containing solids, etc. The vertical form fill seal pouch has excellent gas barrier properties and water vapor barrier properties. Its gas barrier properties and water vapor barrier properties are less deteriorated even after bending or after retorting. Therefore, the gas barrier properties and water vapor barrier properties of the vacuum packaging pouch are hardly deteriorated due to deformation during vacuum packaging/heat sterilization. The vacuum packaging pouch is flexible and is easily adhered closely to foods containing solids. Therefore, degassing at the time of vacuum packaging is easy. Accordingly, the vacuum packaging pouch can reduce the residual oxygen thereinside, and thus is excellent in giving a long shelf life of foods. Further, angulated or folded portions are less likely to occur after vacuum packaging, and therefore defects such as pinholes or cracks are less likely to occur. Furthermore, the vacuum packaging pouch can suppress the occurrence of pinholes resulting from the abrasion of vacuum packaging pouches against each other, or vacuum packaging pouches against a cardboard. Moreover, the vacuum packaging pouch has excellent gas barrier properties and water vapor barrier properties, and thus can suppress deterioration in the quality of the content (e.g., foods) over a long period of time.

The composite structural material used as the above-mentioned vacuum packaging pouch may have the following structure from the layer to serve as the outer portion of the vacuum packaging pouch toward the layer to serve as the inner portion thereof.

(1) Multilayer barrier film/PO layer
(2) Inorganic deposited film layer/Multilayer barrier film/PO layer
(3) Multilayer barrier film/Inorganic deposited film layer/PO layer
(4) PO layer/Multilayer barrier film/PO layer
(5) Multilayer barrier film/Polyamide layer/PO layer
(6) Inorganic deposited film layer/Multilayer barrier film/Polyamide layer/PO layer
(7) Multilayer barrier film/Inorganic deposited film layer/Polyamide layer/PO layer
(8) Polyamide layer/Multilayer barrier film/PO layer
(9) Polyamide layer/Inorganic deposited film layer/Multilayer barrier film/PO layer
(10) Polyamide layer/Multilayer barrier film/Inorganic deposited film layer/PO layer
(11) Polyamide layer/Multilayer barrier film/Polyamide layer/PO layer
(12) Polyamide layer/Inorganic deposited film layer/Multilayer barrier film/Polyamide layer/PO layer

(13) Polyamide layer/Multilayer barrier film/Inorganic deposited film layer/Polyamide layer/PO layer
(14) Polyester layer/Multilayer barrier film/PO layer
(15) Polyester layer/Inorganic deposited film layer/Multilayer barrier film/PO layer
(16) Polyester layer/Multilayer barrier film/Inorganic deposited film layer/PO layer
(17) Multilayer barrier film/EVOH layer/PO layer
(18) PO layer/EVOH layer/Multilayer barrier film/PO layer
(19) PO layer/Multilayer barrier film/EVOH layer/PO layer
(20) Multilayer barrier film/EVOH layer/Polyamide layer/PO layer
(21) Multilayer barrier film/Polyamide layer/EVOH layer/PO layer
(22) Multilayer barrier film/Polyamide layer/PO layer
(23) Polyamide layer/Multilayer barrier film/EVOH layer/PO layer
(24) Polyamide layer/Multilayer barrier film/EVOH layer/Polyamide layer/PO layer
(25) Polyamide layer/Multilayer barrier film/Polyamide layer/EVOH layer/PO layer Particularly preferred examples of the structure of the composite structural material as the vacuum packaging pouch include structures of: Multilayer barrier film/Polyamide layer/PO layer; and Polyamide layer/Multilayer barrier film/PO layer. In these structures, a polyamide film, for example, can be used as the base of the multilayer barrier film. The vacuum packaging pouch that uses such a composite structural material has particularly excellent gas barrier properties after vacuum packaging, and after vacuum packaging/heat sterilization. An adhesive layer may be provided between each two adjacent layers in the above-mentioned layers. In the case where the layer (Y) is stacked only on one surface of the base, the layer (Y) may be disposed either internally or externally of the vacuum packaging pouch with respect to the base.

The formed product of the present invention may be a pouch with a spout for packaging various liquid contents. The pouch with the spout can be used as a container for liquid beverages (e.g., soft drinks), jelly drinks, yogurts, fruit sources, seasonings, functional waters, liquid diets, etc. Further, the pouch with the spout can be used preferably also as a container for liquid medical products such as amino acid infusion, electrolyte infusion, carbohydrate infusion, and fat emulsions for infusion. The pouch with the spout has excellent gas barrier properties and water vapor barrier properties. Its gas barrier properties and water vapor barrier properties are less deteriorated even after bending or after retorting. Therefore, the use of the pouch with the spout can prevent alteration of the content by oxygen, before retorting, during retorting, after retorting, after transportation, and after long storage. Further, the pouch with the spout has good transparency, which makes it easy to identify the content, or check for alteration of the content resulting from deterioration.

The composite structural material used as the above-mentioned pouch with the spout may have the following structure from the layer to serve as the outer portion of the pouch with the spout toward the layer to serve as the inner portion thereof.
(1) Multilayer barrier film/PO layer
(2) Inorganic deposited film layer/Multilayer barrier film/PO layer
(3) Multilayer barrier film/Inorganic deposited film layer/PO layer
(4) PO layer/Multilayer barrier film/PO layer
(5) Multilayer barrier film/Polyamide layer/PO layer
(6) Inorganic deposited film layer/Multilayer barrier film/Polyamide layer/PO layer
(7) Multilayer barrier film/Inorganic deposited film layer/Polyamide layer/PO layer
(8) Polyamide layer/Multilayer barrier film/PO layer
(9) Polyamide layer/Inorganic deposited film layer/Multilayer barrier film/PO layer
(10) Polyamide layer/Multilayer barrier film/Inorganic deposited film layer/PO layer
(11) Polyamide layer/Multilayer barrier film/Polyamide layer/PO layer
(12) Polyamide layer/Inorganic deposited film layer/Multilayer barrier film/Polyamide layer/PO layer
(13) Polyamide layer/Multilayer barrier film/Inorganic deposited film layer/Polyamide layer/PO layer
(14) Polyester layer/Multilayer barrier film/PO layer
(15) Polyester layer/Inorganic deposited film layer/Multilayer barrier film/PO layer
(16) Polyester layer/Multilayer barrier film/Inorganic deposited film layer/PO layer
(17) Multilayer barrier film/EVOH layer/PO layer
(18) PO layer/EVOH layer/Multilayer barrier film/PO layer
(19) PO layer/Multilayer barrier film/EVOH layer/PO layer
(20) Multilayer barrier film/EVOH layer/Polyamide layer/PO layer
(21) Multilayer barrier film/Polyamide layer/EVOH layer/PO layer
(22) Multilayer barrier film/Polyamide layer/PO layer
(23) Polyamide layer/Multilayer barrier film/EVOH layer/PO layer
(24) Polyamide layer/Multilayer barrier film/EVOH layer/Polyamide layer/PO layer
(25) Polyamide layer/Multilayer barrier film/Polyamide layer/EVOH layer/PO layer Particularly preferred examples of the structure of the composite structural material as the pouch with the spout include structures of: Multilayer barrier film/Polyamide layer/PO layer; and Polyamide layer/Multilayer barrier film/PO layer. An adhesive layer may be provided between each two adjacent layers in the above-mentioned layers. In the case where the layer (Y) is stacked only on one surface of the base, the gas barrier layer may be disposed either internally or externally of the pouch with the spout with respect to the base.

The formed product of the present invention may be a laminated tube container for packaging cosmetics, chemicals, medical products, foods, and toothpastes. The laminated tube container has excellent gas barrier properties and water vapor barrier properties. Its gas barrier properties and water vapor barrier properties are less deteriorated even after bending or after retorting, and thus the laminated tube container maintains excellent gas barrier properties and water vapor barrier properties even after being squeezed in use. Further, the laminated tube container has good transparency, which makes it easy to identify the content, or check for alteration of the content resulting from deterioration.

The layer to serve as the internal portion of the above-mentioned laminated tube container is preferably a polyolefin layer from the viewpoint of the heat-sealing properties. The composite structural material used as the laminated tube container may have the following structure from the layer to serve as the outer portion of the laminated tube container toward the layer to serve as the inner portion thereof.
(1) PO layer/Multilayer barrier film/PO layer
(2) PO layer/Multilayer barrier film/Inorganic deposited film layer/PO layer
(3) PO layer/Inorganic deposited film layer/Multilayer barrier film/PO layer
(4) PO layer/Pigment-containing PO layer/PO layer/Multilayer barrier film/PO layer (5) PO layer/Pigment-containing PO layer/PO layer/Multilayer barrier film/Inorganic deposited film layer/PO layer
(6) PO layer/Pigment-containing PO layer/PO layer/Inorganic deposited film layer/Multilayer barrier film/PO layer
(7) PO layer/Polyamide layer/Multilayer barrier film/PO layer
(8) PO layer/Polyamide layer/Multilayer barrier film/Inorganic deposited film layer/PO layer
(9) PO layer/Polyamide layer/Inorganic deposited film layer/Multilayer barrier film/PO layer
(10) PO layer/Pigment-containing PO layer/PO layer/Polyamide layer/Multilayer barrier film/PO layer
(11) PO layer/Pigment-containing PO layer/PO layer/Polyamide layer/Multilayer barrier film/Inorganic deposited film layer/PO layer
(12) PO layer/Pigment-containing PO layer/PO layer/Polyamide layer/Inorganic deposited film layer/Multilayer barrier film/PO layer
(13) PO layer/Multilayer barrier film/Ethylene-vinyl alcohol copolymer layer (hereinafter, referred to as an EVOH layer)/PO layer
(14) PO layer/Multilayer barrier film/Inorganic deposited film layer/EVOH layer/PO layer
(15) PO layer/Inorganic deposited film layer/Multilayer barrier film/EVOH layer/PO layer
(16) PO layer/Pigment-containing PO layer/PO layer/Multilayer barrier film/EVOH layer/PO layer
(17) PO layer/Pigment-containing PO layer/PO layer/Multilayer barrier film/Inorganic deposited film layer/EVOH layer/PO layer
(18) PO layer/Pigment-containing PO layer/PO layer/Inorganic deposited film layer/Multilayer barrier film/EVOH layer/PO layer
(19) PO layer/Polyamide layer/Multilayer barrier film/EVOH layer/PO layer
(20) PO layer/Polyamide layer/Multilayer barrier film/Inorganic deposited film layer/EVOH layer/PO layer
(21) PO layer/Polyamide layer/Inorganic deposited film layer/Multilayer barrier film/EVOH layer/PO layer
(22) PO layer/Pigment-containing PO layer/PO layer/Polyamide layer/Multilayer barrier film/EVOH layer/PO layer
(23) PO layer/Pigment-containing PO layer/PO layer/Polyamide layer/Multilayer barrier film/Inorganic deposited film layer/EVOH layer/PO layer
(24) PO layer/Pigment-containing PO layer/PO layer/Polyamide layer/Inorganic deposited film layer/Multilayer barrier film/EVOH layer/PO layer Particularly preferred examples of the structure as the laminated tube container include structures of: PO layer/Multilayer barrier film/PO layer; and PO layer/Pigment-containing PO layer/PO layer/Multilayer barrier film/PO layer. An adhesive layer may be provided between each two adjacent layers in the above-mentioned layers. In the case where the layer (Y) is stacked only on one surface of the base, the gas barrier layer may be disposed either internally or externally of the laminated tube container with respect to the base.

The formed product of the present invention may be an infusion bag to be filled, for example, with a liquid medical product such as amino acid infusion, electrolyte infusion, carbohydrate infusion, fat emulsions for infusion. The infusion bag has excellent gas barrier properties and water vapor barrier properties. Its gas barrier properties and water vapor barrier properties are less deteriorated even after bending or after retorting. Therefore, the infusion bag can prevent alteration of the liquid medical product filled therein by oxygen, before heat sterilization, during heat sterilization, after heat sterilization, after transportation, and after storage.

The composite structural material used as the above-mentioned infusion bag may have the following structure from the layer to serve as the outer portion of the infusion bag toward the layer to serve as the inner portion thereof.
(1) Multilayer barrier film/PO layer
(2) Inorganic deposited film layer/Multilayer barrier film/PO layer
(3) Multilayer barrier film/Inorganic deposited film layer/PO layer
(4) Inorganic deposited film layer/PO layer/Multilayer barrier film/PO layer
(5) PO layer/Inorganic deposited film layer/Multilayer barrier film/PO layer
(6) PO layer/Multilayer barrier film/Inorganic deposited film layer/PO layer
(7) Multilayer barrier film/Polyamide layer/PO layer
(8) Inorganic deposited film layer/Multilayer barrier film/Polyamide layer/PO layer
(9) Multilayer barrier film/Inorganic deposited film layer/Polyamide layer/PO layer
(10) Multilayer barrier film/Polyamide layer/Inorganic deposited film layer/PO layer
(11) Polyamide layer/Multilayer barrier film/PO layer
(12) Inorganic deposited film layer/Polyamide layer/Multilayer barrier film/PO layer
(13) Polyamide layer/Inorganic deposited film layer/Multilayer barrier film/PO layer
(14) Polyamide layer/Multilayer barrier film/Inorganic deposited film layer/PO layer
(15) PO layer/Multilayer barrier film/Polyamide layer/PO layer 40
(16) Inorganic deposited film layer/PO layer/Multilayer barrier film/Polyamide layer/PO layer
(17) PO layer/Inorganic deposited film layer/Multilayer barrier film/Polyamide layer/PO layer
(18) PO layer/Multilayer barrier film/Inorganic deposited film layer/Polyamide layer/PO layer
(19) PO layer/Multilayer barrier film/Polyamide layer/Inorganic deposited film layer/PO layer
(20) PO layer/Polyamide layer/Multilayer barrier film/PO layer
(21) Inorganic deposited film layer/PO layer/Polyamide layer/Multilayer barrier film/PO layer
(22) PO layer/Inorganic deposited film layer/Polyamide layer/Multilayer barrier film/PO layer
(23) PO layer/Polyamide layer/Inorganic deposited film layer/Multilayer barrier film/PO layer
(24) PO layer/Polyamide layer/Multilayer barrier film/Inorganic deposited film layer/PO layer
(25) Multilayer barrier film/Thermoplastic elastomer layer
(26) Inorganic deposited film layer/Multilayer barrier film/Thermoplastic elastomer layer
(27) Multilayer barrier film/Inorganic deposited film layer/Thermoplastic elastomer layer
(28) Thermoplastic elastomer layer/Multilayer barrier film/Thermoplastic elastomer layer
(29) Inorganic deposited film layer/Thermoplastic elastomer layer/Multilayer barrier film/Thermoplastic elastomer layer
(30) Thermoplastic elastomer layer/Inorganic deposited film layer/Multilayer barrier film/Thermoplastic elastomer layer
(31) Thermoplastic elastomer layer/Multilayer barrier film/Inorganic deposited film layer/Thermoplastic elastomer layer
(32) Multilayer barrier film/Thermoplastic elastomer layer/PO layer
(33) Multilayer barrier film/Inorganic deposited film layer/Thermoplastic elastomer layer/PO layer

(34) Multilayer barrier film/Thermoplastic elastomer layer/Inorganic deposited film layer/PO layer
(35) Thermoplastic elastomer layer/Multilayer barrier film/PO layer
(36) Inorganic deposited film layer/Thermoplastic elastomer layer/Multilayer barrier film/PO layer
(37) Thermoplastic elastomer layer/Inorganic deposited film layer/Multilayer barrier film/PO layer
(38) Thermoplastic elastomer layer/Multilayer barrier film/Inorganic deposited film layer/PO layer
(39) Thermoplastic elastomer layer/Multilayer barrier film/Thermoplastic elastomer layer/PO layer
(40) Inorganic deposited film layer/Thermoplastic elastomer layer/Multilayer barrier film/Thermoplastic elastomer layer/PO layer
(41) Thermoplastic elastomer layer/Inorganic deposited film layer/Multilayer barrier film/Thermoplastic elastomer layer/PO layer
(42) Thermoplastic elastomer layer/Multilayer barrier film/Inorganic deposited film layer/Thermoplastic elastomer layer/PO layer
(43) Thermoplastic elastomer layer/Multilayer barrier film/Thermoplastic elastomer layer/Inorganic deposited film layer/PO layer
(44) PO layer/Multilayer barrier film/Thermoplastic elastomer layer/PO layer
(45) Inorganic deposited film layer/PO layer/Multilayer barrier film/Thermoplastic elastomer layer/PO layer
(46) PO layer/Multilayer barrier film/Inorganic deposited film layer/Thermoplastic elastomer layer/PO layer
(47) PO layer/Multilayer barrier film/Thermoplastic elastomer layer/Inorganic deposited film layer/PO layer
(48) PO layer/Thermoplastic elastomer layer/Multilayer barrier film/PO layer
(49) Inorganic deposited film layer/PO layer/Thermoplastic elastomer layer/Multilayer barrier film/PO layer
(50) PO layer/Thermoplastic elastomer layer/Inorganic deposited film layer/Multilayer barrier film/PO layer
(51) PO layer/Thermoplastic elastomer layer/Multilayer barrier film/Inorganic deposited film layer/PO layer
(52) PO layer/Thermoplastic elastomer layer/Multilayer barrier film/Thermoplastic elastomer layer/PO layer
(53) Inorganic deposited film layer/PO layer/Thermoplastic elastomer layer/Multilayer barrier film/Thermoplastic elastomer layer/PO layer
(54) PO layer/Inorganic deposited film layer/Thermoplastic elastomer layer/Multilayer barrier film/Thermoplastic elastomer layer/PO layer
(55) PO layer/Thermoplastic elastomer layer/Inorganic deposited film layer/Multilayer barrier film/Thermoplastic elastomer layer/PO layer
(56) PO layer/Thermoplastic elastomer layer/Multilayer barrier film/Inorganic deposited film layer/Thermoplastic elastomer layer/PO layer
(57) PO layer/Thermoplastic elastomer layer/Multilayer barrier film/Thermoplastic elastomer layer/Inorganic deposited film layer/PO layer Particularly preferred examples of the structure of the composite structural material as the infusion bag include structures of: Multilayer barrier film/Polyamide layer/PO layer; and Polyamide layer/Multilayer barrier film/PO layer. An adhesive layer may be provided between each two adjacent layers in the above-mentioned layers. In the case where the layer (Y) is stacked only on one surface of the base, the gas barrier layer may be disposed either internally or externally of the infusion bag with respect to the base.

The formed product of the present invention may be a cover for a container to be filled with foods such as processed foods of meat, processed foods of vegetables, processed foods of marine products, and fruits. The lidding film has excellent gas barrier properties and water vapor barrier properties. Its gas barrier properties and water vapor barrier properties are less deteriorated even after bending or after retorting, and thus deterioration in the quality of foods as the content can be suppressed over a long period of time. The lidding film is used preferably as a cover for a container to be used for storing contents such as foods, particularly as a cover for a container to be subjected to heat sterilization such as boiling sterilization and retort sterilization.

The composite structural material used as the above-mentioned lidding film may have the following structure from the layer to serve as the outer portion of the lidding film toward the layer to serve as the internal portion thereof (on the container side).

(1) Multilayer barrier film/PO layer
(2) Inorganic deposited film layer/Multilayer barrier film/PO layer
(3) Multilayer barrier film/Inorganic deposited film layer/PO layer
(4) Multilayer barrier film/Polyamide layer/PO layer
(5) Inorganic deposited film layer/Multilayer barrier film/Polyamide layer/PO layer
(6) Multilayer barrier film/Inorganic deposited film layer/Polyamide layer/PO layer
(7) Polyamide layer/Multilayer barrier film/PO layer
(8) Polyamide layer/Inorganic deposited film layer/Multilayer barrier film/PO layer
(9) Polyamide layer/Multilayer barrier film/Inorganic deposited film layer/PO layer
(10) Polyamide layer/Multilayer barrier film/Polyamide layer/PO layer
(11) Polyamide layer/Inorganic deposited film layer/Multilayer barrier film/Polyamide layer/PO layer
(12) Polyamide layer/Multilayer barrier film/Inorganic deposited film layer/Polyamide layer/PO layer
(13) Polyester layer/Multilayer barrier film/PO layer
(14) Polyester layer/Multilayer barrier film/Polyamide layer/PO layer
(15) Polyester layer/Inorganic deposited film layer/Multilayer barrier film/PO layer
(16) Polyester layer/Inorganic deposited film layer/Multilayer barrier film/Polyamide layer/PO layer
(17) Polyester layer/Multilayer barrier film/Inorganic deposited film layer/PO layer
(18) Polyester layer/Multilayer barrier film/Inorganic deposited film layer/Polyamide layer/PO layer
(19) Multilayer barrier film/EVOH layer/PO layer
(20) Multilayer barrier film/EVOH layer/Polyamide layer/PO layer
(21) PO layer/EVOH layer/Multilayer barrier film/PO layer
(22) PO layer/EVOH layer/Multilayer barrier film/Polyamide layer/PO layer
(23) PO layer/Multilayer barrier film/EVOH layer/PO layer
(24) PO layer/Multilayer barrier film/EVOH layer/Polyamide layer/PO layer
(25) Multilayer barrier film/Polyamide layer/EVOH layer/PO layer
(26) Multilayer barrier film/Polyamide layer/PO layer
(27) Polyamide layer/Multilayer barrier film/EVOH layer/PO layer
(28) Polyamide layer/Multilayer barrier film/EVOH layer/Polyamide layer/PO layer

(29) Polyamide layer/Multilayer barrier film/Polyamide layer/EVOH layer/PO layer
(30) Paper layer/PO layer/Multilayer barrier film/PO layer
(31) Paper layer/PO layer/Multilayer barrier film/Polyamide layer/PO layer
(32) Paper layer/PO layer/Polyamide layer/Multilayer barrier film/PO layer
(33) Paper layer/PO layer/Multilayer barrier film/EVOH layer/PO layer
(34) Paper layer/PO layer/Multilayer barrier film/EVOH layer/Polyamide layer/PO layer
(35) PO layer/Paper layer/PO layer/Multilayer barrier film/PO layer
(36) PO layer/Paper layer/PO layer/Multilayer barrier film/Polyamide layer/PO layer
(37) PO layer/Paper layer/PO layer/Polyamide layer/Multilayer barrier film/PO layer
(38) PO layer/Paper layer/PO layer/Multilayer barrier film/EVOH layer/PO layer
(39) PO layer/Paper layer/PO layer/Multilayer barrier film/EVOH layer/Polyamide layer/PO layer Particularly preferred examples of the structure of the composite structural material as the lidding film include structures of Multilayer barrier film/Polyamide layer/PO layer; and Multilayer barrier film/PO layer. In these structures, a polyamide film, for example, can be used as the base of the multilayer barrier film. The cover having such a structure has particularly excellent gas barrier properties after heat sterilization, or after heat sterilization/transportation. An adhesive layer may be provided between each two adjacent layers in the above-mentioned layers. In the case where the layer (Y) of the composite structural material is present on one surface of the base, the layer (Y) may be disposed either internally (on the container side) or externally with respect to the base.

The formed product of the present invention may be a paper container. The paper container has gas barrier properties and water vapor barrier properties that are less deteriorated even after being subjected to folding or retorting. The paper container is preferably used for a container with a window because the paper container includes the layer (Y) that shows good transparency even after retorting. Further, the paper container is suitable for microwave heating.

The composite structural material used as the above-mentioned paper container may have the following structure from the layer to serve as the outer portion of the paper container toward the layer to serve as the inner portion thereof.
(1) Heat resistant polyolefin layer/Paper layer/Heat resistant polyolefin layer/Multilayer barrier film/Heat resistant polyolefin layer
(2) Heat resistant polyolefin layer/Paper layer/Heat resistant polyolefin layer/Multilayer barrier film/Heat resistant polyolefin layer/Hydroxyl group-containing polymer layer
(3) Heat resistant polyolefin layer/Paper layer/Heat resistant polyolefin layer/Multilayer barrier film/Heat resistant polyolefin layer/Polyester layer
(4) Heat resistant polyolefin layer/Paper layer/Heat resistant polyolefin layer/Multilayer barrier film/Heat resistant polyolefin layer/Polyamide layer
(5) Heat resistant polyolefin layer/Paper layer/Heat resistant polyolefin layer/Biaxially stretched heat resistant polyolefin layer/Multilayer barrier film/Heat resistant polyolefin layer
(6) Heat resistant polyolefin layer/Paper layer/Heat resistant polyolefin layer/Biaxially stretched heat resistant polyolefin layer/Multilayer barrier film/Heat resistant polyolefin layer/Hydroxyl group-containing polymer layer
(7) Heat resistant polyolefin layer/Paper layer/Heat resistant polyolefin layer/Biaxially stretched heat resistant polyolefin layer/Multilayer barrier film/Heat resistant polyolefin layer/Polyester layer
(8) Heat resistant polyolefin layer/Paper layer/Heat resistant polyolefin layer/Biaxially stretched heat resistant polyolefin layer/Multilayer barrier film/Heat resistant polyolefin layer/Polyamide layer
(9) Paper layer/Heat resistant polyolefin layer/Multilayer barrier film/Heat resistant polyolefin layer
(10) Paper layer/Heat resistant polyolefin layer/Multilayer barrier film/Heat resistant polyolefin layer/Hydroxyl group-containing polymer layer
(11) Paper layer/Heat resistant polyolefin layer/Multilayer barrier film/Heat resistant polyolefin layer/Polyester layer
(12) Paper layer/Heat resistant polyolefin layer/Multilayer barrier film/Heat resistant polyolefin layer/Polyamide layer
(13) Heat resistant polyolefin layer/Paper layer/Multilayer barrier film/Heat resistant polyolefin layer
(14) Heat resistant polyolefin layer/Paper layer/Multilayer barrier film/Heat resistant polyolefin layer/Hydroxyl group-containing polymer layer
(15) Heat resistant polyolefin layer/Paper layer/Multilayer barrier film/Heat resistant polyolefin layer/Polyester layer
(16) Paper layer/Multilayer barrier film/Heat resistant polyolefin layer/Polyamide layer
(17) Multilayer barrier film/Paper layer/Heat resistant polyolefin layer
(18) Multilayer barrier film/Paper layer/Heat resistant polyolefin layer/Hydroxyl group-containing polymer layer
(19) Multilayer barrier film/Paper layer/Heat resistant polyolefin layer/Polyester layer
(20) Multilayer barrier film/Paper layer/Heat resistant polyolefin layer/Polyamide layer Particularly preferred examples of the structure of the composite structural material as the paper container include a structure of Heat resistant polyolefin layer/Paper layer/Heat resistant polyolefin layer/Multilayer barrier film/Heat resistant polyolefin layer. An adhesive layer may be provided between each two adjacent layers in the above-mentioned layers. In the above-mentioned examples, the heat resistant polyolefin layer, for example, is composed of either a biaxially stretched heat resistant polyolefin film or an unstretched heat resistant polyolefin film. The heat resistant polyolefin layer to be disposed as the outermost layer of the composite structural material is preferably an unstretched polypropylene film because of ease of forming. Similarly, the heat resistant polyolefin layer to be disposed internally to the outermost layer of the composite structural material is preferably an unstretched polypropylene film. In one preferred example, every heat resistant polyolefin layer that forms the composite structural material is an unstretched polypropylene film.

The formed product of the present invention may be a vacuum insulator usable for various applications that require a cooling or warming effect. Such a vacuum insulator can maintain a heat insulating effect over a long period of time, and thus can be used as a heat insulator for home appliances, such as a refrigerator, a hot water supply unit and a rice cooker, a residential heat insulator for walls, ceilings, attics, floor parts, etc., a vehicle roof material, and a heat insulating panel for vending machines.

The composite structural material used as the above-mentioned vacuum insulator may have, for example, the following structure from the layer to serve as the outer portion of the vacuum insulator toward the layer to serve as the inner portion thereof.

(1) Multilayer barrier film/PO layer
(2) Multilayer barrier film/Gas barrier resin layer/PO layer
(3) Multilayer barrier film/Polyamide layer/PO layer
(4) Polyamide layer/Multilayer barrier film/PO layer
(5) Polyamide layer/Multilayer barrier film/Polyester layer/PO layer
(6) Multilayer barrier film/Polyamide layer/Gas barrier resin layer/PO layer
(7) Polyamide layer/Multilayer barrier film/Gas barrier resin layer/PO layer
(8) Multilayer barrier film/Polyester layer/PO layer
(9) Polyester layer/Multilayer barrier film/PO layer
(10) Multilayer barrier film/Polyester layer/Gas barrier resin layer/PO layer
(11) Polyester layer/Multilayer barrier film/Gas barrier resin layer/PO layer
(12) PO layer/Multilayer barrier film/PO layer
(13) PO layer/Multilayer barrier film/Gas barrier resin layer/PO layer
(14) PO layer/Multilayer barrier film/Polyamide layer/PO layer
(15) PO layer/Polyamide layer/Multilayer barrier film/PO layer
(16) PO layer/Multilayer barrier film/Polyamide layer/Gas barrier resin layer/PO layer
(17) PO layer/Polyamide layer/Multilayer barrier film/Gas barrier resin layer/PO layer
(18) PO layer/Multilayer barrier film/Polyester layer/PO layer
(19) PO layer/Polyester layer/Multilayer barrier film/PO layer
(20) PO layer/Multilayer barrier film/Polyester layer/Gas barrier resin layer/PO layer
(21) PO layer/Polyester layer/Multilayer barrier film/Gas barrier resin layer/PO layer Particularly preferred examples of the structure of the composite structural material as the vacuum insulator include structures of Multilayer barrier film/Polyamide layer/PO layer; and Polyamide layer/Multilayer barrier film/PO layer. An adhesive layer may be provided between each two adjacent layers in the above-mentioned layers. In the case where the layer (Y) is stacked only on one surface of the base, the gas barrier layer may be disposed either internally or externally of the vacuum insulator with respect to the base.

<Method for Producing the Composite Structural Material>

Hereinafter, a method for producing the composite structural material of the present invention is described. According to this method, the composite structural material of the present invention (composite structural materials (1) and (2)) can be easily produced. The materials to be used in the method for producing the composite structural material of the present invention and the configuration, etc., of the composite structural material are the same as those described above. Hence, the same descriptions may be omitted in some cases. For example, the descriptions on the metal oxide (A), the phosphorus compound (B), and the polymer (C) for the composite structural material of the present invention can be applied. The descriptions for this production method can be applied to the composite structural material of the present invention. Likewise, the descriptions for the composite structural material of the present invention can be applied to the production method of the present invention.

The method for producing the composite structural material of the present invention includes steps (I), (II), and (III). In step (I), the metal oxide (A), at least one compound having a site capable of reacting with the metal oxide (A), and a solvent are mixed to prepare a coating liquid (U) containing the metal oxide (A), the at least one compound, and the solvent. In step (II), a precursor layer of the layer (Y) is formed on the base (X) by applying the coating liquid (U) onto the base (X). In step (III), the layer (Y) is formed on the base (X) by treating the precursor layer.

<Step (I)>

Hereinafter, the at least one compound having a site capable of reacting with the metal oxide (A) used in step (I) may be referred to as "at least one compound (Z)" in some cases. In step (I), the metal oxide (A), the at least one compound (Z), and a solvent are at least mixed. In one aspect, raw materials containing the metal oxide (A) and the at least one compound (Z) are allowed to react with each other in the solvent in step (I). The raw material may contain compounds other than the metal oxide (A) and the at least one compound (Z). Typically, the metal oxide (A) is mixed in the form of particles.

The at least one compound (Z) contains the phosphorus compound (B). The number of moles of metal atom contained in the at least one compound (Z) is preferably in the range of 0 to 1 times the number of moles of phosphorus atom contained in the phosphorus compound (B). Typically, the at least one compound (Z) is a compound having a plurality of sites capable of reacting with the metal oxide (A), and the number of moles of metal atom contained in the at least one compound (Z) is in the range of 0 to 1 times the number of moles of phosphorus atom contained in the phosphorus compound (B).

A composite structural material with more excellent barrier properties and hot-water resistance can be obtained by adjusting the ratio of (Number of moles of metal atom contained in the at least one compound (Z))/(Number of moles of phosphorus atom contained in the phosphorus compound (B)) in the range of 0 to 1 (for example, in the range of 0 to 0.9). This ratio is preferably 0.3 or less, more preferably 0.05 or less, further preferably 0.01 or less, or may be 0, in order to further improve the barrier properties and hot-water resistance of the composite structural material. Typically, the at least one compound (Z) consists of the phosphorus compound (B). In step (I), the above-mentioned ratio can be easily reduced.

Step (I) preferably includes the following steps (a) to (c).
Step (a): Step of preparing a liquid (S) containing the metal oxide (A)
Step (b): Step of preparing a solution (T) containing the phosphorus compound (B)
Step (c): Step of mixing the liquid (S) and the solution (T) obtained in the above-mentioned steps (a) and (b)

Step (b) may be performed before step (a), simultaneously with step (a), or after step (a). Hereinafter, each step is described more specifically.

In step (a), the liquid (S) containing the metal oxide (A) is prepared. The liquid (S) is a solution or a dispersion. The liquid (S) can be prepared, for example, using a technique employed in a known sol-gel method. For example, it can be prepared by mixing the above-mentioned compound (L)-based component and water, and, as needed, an acid catalyst or an organic solvent, and then subjecting the compound (L)-based component to condensation or hydrolysis condensation using a technique employed in a known sol-gel method. A dispersion of the metal oxide (A) to be obtained through condensation or hydrolysis condensation of the compound (L)-based component can be used as the liquid (S) containing the metal oxide (A) as it is. However, the dispersion may be subjected to a specific treatment (such as the above-mentioned peptization or addition or reduction of the solvent for controlling the concentration), as needed.

Step (a) may include a step of subjecting at least one selected from the group consisting of the compound (L) and a hydrolysate of the compound (L) to condensation (for example, hydrolysis condensation). Specifically, step (a) may include a step of subjecting, to condensation or hydrolysis condensation, at least one selected from the group consisting of the compound (L), a partial hydrolysate of the compound (L), a total hydrolysate of the compound (L), a partially hydrolyzed condensate of the compound (L), and a partial condensate of the total hydrolysate of the compound (L).

As another example of the method for preparing the liquid (S), a method including the following steps can be mentioned. First, a metal is evaporated by thermal energy as metal atoms, and the metal atoms are brought into contact with a reaction gas (oxygen), thereby producing clusters and molecules of metal oxide. Thereafter, they are instantaneously cooled, so that the particles of the metal oxide (A) with a small particle size are produced. Next, these particles are dispersed in water or an organic solvent. Thus, the liquid (S) (dispersion containing the metal oxide (A)) is obtained. In order to enhance the dispersibility in water or an organic solvent, the particles of the metal oxide (A) may be subjected to surface treatment, or a stabilizer such as a surfactant may be added thereto. It is also possible to improve the dispersibility of the metal oxide (A) by controlling the pH.

As a still another example of the method for preparing the liquid (S), a method of preparing the liquid (S) (dispersion containing the metal oxide (A)) by grinding the metal oxide (A) as a bulk body using a grinder such as a ball mill and a jet mill, and then dispersing it in water or an organic solvent can be mentioned. In this method, however, there may be cases where the shape and size distribution of the particles of the metal oxide (A) are rendered difficult to control.

The type of the organic solvent usable in step (a) is not particularly limited. For example, alcohols such as methanol, ethanol, isopropanol, and normal propanol are suitably used.

The content of the metal oxide (A) in the liquid (S) is preferably in the range of 0.1 to 30 mass %, more preferably in the range of 1 to 20 mass %, further preferably in the range of 2 to 15 mass %.

In step (b), the solution (T) containing the phosphorus compound (B) is prepared. The solution (T) can be prepared by dissolving the phosphorus compound (B) in a solvent. When the phosphorus compound (B) has low solubility, heat treatment or ultrasonic treatment may be performed to promote the dissolution.

The solvent used for the preparation of the solution (T) may be appropriately selected depending on the type of the phosphorus compound (B), but preferably contains water. The solvent may contain alcohols such as methanol and ethanol; ethers such as tetrahydrofuran, dioxane, trioxane, and dimethoxyethane; ketones such as acetone and methyl ethyl ketone; glycols such as ethylene glycol and propylene glycol; glycol derivatives such as methyl cellosolve, ethyl cellosolve, and n-butyl cellosolve; glycerol; acetonitrile; amides such as dimethyl formamide; dimethyl sulfoxide; sulfolane, etc., as long as the dissolution of the phosphorus compound (B) is not hindered.

The content of the phosphorus compound (B) in the solution (T) is preferably in the range of 0.1 to 99 mass %, more preferably in the range of 0.1 to 95 mass %, further preferably in the range of 0.1 to 90 mass %. The content of the phosphorus compound (B) in the solution (T) may be in the range of 0.1 to 50 mass %, may be in the range of 1 to 40 mass %, or may be in the range of 2 to 30 mass %.

In step (c), the liquid (S) and the solution (T) are mixed. In the mixing of the liquid (S) and the solution (T), it is preferred to mix them under vigorous stirring while suppressing the addition rate, so as to suppress local reactions. In this regard, the solution (T) may be added to the liquid (S) under stirring, or the liquid (S) may be added to the solution (T) under stirring. The coating liquid (U) with excellent storage stability can be obtained in some cases by maintaining the temperature during the mixing to 30° C. or less (for example, 20° C. or less). The coating liquid (U) with excellent storage stability can be obtained in some cases by further stirring for about 30 minutes continuously from the time of the completion of the mixing.

The coating liquid (U) may contain the polymer (C). The method for allowing the coating liquid (U) to contain the polymer (C) is not particularly limited. For example, the polymer (C) in the form of powder or pellet may be added to the liquid (S), the solution (T), or a mixed solution of the liquid (S) and the solution (T), and then dissolved therein. Alternatively, a solution of the polymer (C) may be added to the liquid (S), the solution (T), or a mixed solution of the liquid (S) and the solution (T), and mixed therewith. Alternatively, the liquid (S), the solution (T), or a mixed solution of the liquid (S) and the solution (T) is added to a solution of the polymer (C), and mixed therewith. The reaction rate between the metal oxide (A) and the phosphorus compound (B) slows down by allowing the solution (T) to contain the polymer (C) when the liquid (S) and the solution (T) are mixed in step (c), as a result of which the coating liquid (U) with excellent aging stability can be obtained in some cases.

A composite structural material that includes the layer (Y) containing the polymer (C) can be easily produced by allowing the coating liquid (U) to contain the polymer (C).

The coating liquid (U) may contain at least one acid compound (D) selected from acetic acid, hydrochloric acid, nitric acid, trifluoroacetic acid, and trichloroacetic acid, as needed. The at least one acid compound (D) may hereinafter be abbreviated simply as "acid compound (D)". The method for allowing the coating liquid (U) to contain the acid compound (D) is not particularly limited. For example, the acid compound (D) as it is may be added to the liquid (S), the solution (T), or a mixed solution of the liquid (S) and the solution (T), and mixed therewith. Alternatively, a solution of the acid compound (D) may be added to the liquid (S), the solution (T), or a mixed solution of the liquid (S) and the solution (T), and mixed therewith. Alternatively, the liquid (S), the solution (T), or a mixed solution of the liquid (S) and the solution (T) may be added to a solution of the acid compound (D), and mixed therewith. The reaction rate between the metal oxide (A) and the phosphorus compound (B) slows down by allowing the solution (T) to contain the acid compound (D) when the liquid (S) and the solution (T) are mixed in step (c), as a result of which the coating liquid (U) with excellent aging stability can be obtained in some cases.

In the coating liquid (U) containing the acid compound (D), the reaction between the metal oxide (A) and the phosphorus compound (B) is suppressed, and thus precipitation and aggregation of the reacted product in the coating liquid (U) can be suppressed. Therefore, the use of the coating liquid (U) containing the acid compound (D) may improve the appearance of the resultant composite structural material in some cases. Meanwhile, removal of the acid compound (D) from the layer (Y), for example, through volatilization of the acid compound (D) in the course of producing the composite structural material is easy, because the boiling point of the acid compound (D) is 200° C. or less.

The content of the acid compound (D) in the coating liquid (U) is preferably in the range of 0.1 to 5.0 mass %, more preferably in the range of 0.5 to 2.0 mass %. In such a range, not only effects due to the addition of the acid compound (D) can be obtained but also removal of the acid compound (D) is easy. In the case where an acid component remains in the liquid (S), the addition amount of the acid compound (D) may be determined in consideration of the residual amount.

The liquid obtained by the mixing in step (c) can be used as it is, as the coating liquid (U). In this case, the solvent contained in the liquid (S) or the solution (T) usually serves as a solvent for the coating liquid (U). The coating liquid (U) may be prepared by treating the liquid obtained by the mixing in step (c). For example, treatment such as addition of an organic solvent, adjustment of the pH, adjustment of the viscosity, and addition of an additive may be performed.

An organic solvent may be added to the liquid obtained by the mixing in step (c) as long as the stability of the coating liquid (U) to be obtained is not impaired. The addition of an organic solvent may facilitate the application of the coating liquid (U) onto the base (X) in step (II) in some cases. As the organic solvent, those that can be uniformly mixed in the coating liquid (U) to be obtained are preferred. Preferred examples of the organic solvent include alcohols such as methanol, ethanol, n-propanol, and isopropanol; ethers such as tetrahydrofuran, dioxane, trioxane, and dimethoxyethane; ketones such as acetone, methyl ethyl ketone, methyl vinyl ketone, and methyl isopropyl ketone; glycols such as ethylene glycol and propylene glycol; glycol derivatives such as methyl cellosolve, ethyl cellosolve, and n-butyl cellosolve; glycerin; acetonitrile; amides such as dimethylformamide and dimethylacetamide; dimethylsulfoxide; and sulfolane.

The solid content concentration of the coating liquid (U) is preferably in the range of 1 to 20 mass %, more preferably in the range of 2 to 15 mass %, further preferably in the range of 3 to 10 mass %, in view of the storage stability of the coating liquid (U) and the coating properties of the coating liquid (U) with respect to the base. The solid content concentration of the coating liquid (U) can be calculated, for example, by adding a specific amount of the coating liquid (U) to a Petri dish, then subjecting the whole Petri dish to a temperature of 100° C. to remove volatile matters such as a solvent, etc., and dividing the mass of the residual solid content by the mass of the coating liquid (U) initially added. In this regard, the solid content concentration is preferably calculated by measuring the mass of the residual solid content at every drying for a certain period of time, and taking, as the mass of the residual solid content, the mass measured at the time when the difference between the masses obtained through two continuous measurements has become negligible.

The pH of the coating liquid (U) is preferably in the range of 0.5 to 6.0, more preferably in the range of 0.5 to 5.0, further preferably in the range of 0.5 to 4.0, in view of the storage stability of the coating liquid (U) and the barrier properties of the composite structural material.

The pH of the coating liquid (U) can be adjusted by a known method. For example, it can be adjusted by adding an acidic compound or a basic compound. Examples of the acidic compound include hydrochloric acid, nitric acid, sulfuric acid, phosphoric acid, acetic acid, butyric acid, and ammonium sulfate. Examples of the basic compound include sodium hydroxide, potassium hydroxide, ammonia, trimethylamine, pyridine, sodium carbonate, and sodium acetate.

The coating liquid (U) changes its state with time, and tends to become a gel composition or cause precipitation eventually. The time required for such a state change depends on the composition of the coating liquid (U). In order to apply the coating liquid (U) steadily to the base (X), it is preferred that the viscosity of the coating liquid (U) be stable over a long period of time. Taking the viscosity at the time of the completion of step (I) as a reference viscosity, the coating liquid (U) is preferably prepared so as to have a viscosity measured with a Brookfield viscometer (a B-type viscosity meter: 60 rpm) of not more than five times the reference viscosity, even after being allowed to stand still at 25° C. for two days. When the viscosity of the coating liquid (U) is in the above-mentioned range, a composite structural material having more excellent barrier properties as well as having excellent storage stability can be obtained in many cases.

As a method for adjusting the viscosity of the coating liquid (U) to the above-mentioned ranges, a method of adjusting the solid content concentration, a method of adjusting the pH, or a method of adding a viscosity modifier, for example, can be employed. Examples of the viscosity modifier include carboxymethylcellulose, starch, bentonite, tragacanth gum, salt of stearic acid, salt of alginic acid, methanol, ethanol, n-propanol, and isopropanol.

The coating liquid (U) may contain substances other than the above-mentioned substances, as long as the effects of the present invention are obtained. For example, the coating liquid (U) may contain: inorganic metal salts such as carbonate, hydrochloride, nitrate, hydrogencarbonate, sulfate, hydrogensulfate, borate, and aluminate; organic acid metal salts such as oxalate, acetate, tartrate, and stearate; metal complexes such as acetylacetonate metal complex (such as aluminum acetylacetonate), cyclopentadienyl metal complex (such as titanocene), and cyano metal complex; a layered clay compound; a crosslinking agent; a polymeric compound other than the polymer (C); a plasticizer; an antioxidant; an ultraviolet absorber; and a flame retardant.

<Step (II)>

In step (II), a precursor layer of the layer (Y) is formed on the base (X) by applying the coating liquid (U) onto the base (X). The coating liquid (U) may be applied directly onto at least one surface of the base (X). Before the coating liquid (U) is applied, the adhesive layer (H) may be formed on the surface of the base (X) by treating the surface of the base (X) with a known primer, or applying a known adhesive onto the surface of the base (X).

The coating liquid (U) may be subjected to degassing and/or defoaming treatment, as needed. Examples of the method for degassing and/or defoaming treatment include vacuum suction, heating, centrifugal, ultrasonic methods, etc. A method using vacuum suction is preferably used.

The method for applying the coating liquid (U) onto the base (X) is not specifically limited, and a known method can be employed. Preferred examples of the method include casting, dipping, roll coating, gravure coating, screen printing, reverse coating, spray coating, kiss coating, die coating, metering rod coating, chamber doctor coating, curtain coating, etc.

In step (II), a precursor layer of the layer (Y) is generally formed by removing the solvent in the coating liquid (U). The method for removing the solvent is not particularly limited, and a known drying method can be used. Specifically, a drying method such as hot-air drying, hot roll contact drying, infrared heating, and microwave heating can be used alone or in combination. The drying temperature is preferably lower than the flow initiation temperature of the base (X) by at least 0 to 15° C. In the case where the coating liquid (U) contains the polymer (C), the drying temperature is preferably lower than the thermal decomposition initiation temperature of the polymer (C) by at least 15 to 20° C. The drying temperature is preferably in the range of 70 to 200° C., more preferably in the range of 80 to 180° C., further preferably in the range of 90 to 160° C. The removal of the solvent may be performed under either normal pressure or reduced pressure. Alternatively, the solvent may be removed by heat treatment in the later-mentioned step (III).

In the case where the layer (Y) is stacked on each of both surfaces of the base (X) in the form of a layer, a first layer (precursor layer of the first layer (Y)) may be formed by applying the coating liquid (U) onto one surface of the base (X) followed by removal of the solvent, and thereafter a second layer (precursor layer of the second layer (Y)) may be formed by applying the coating liquid (U) onto the other surface of the base (X) followed by removal of the solvent. The composition of the coating liquid (U) to be applied to each surface may be the same as or different from the other.

In the case where the layer (Y) is stacked onto each of a plurality of surfaces of the base (X) having a solid shape, a layer (precursor layer of the layer (Y)) may be formed on each surface one by one using the above-mentioned method. Alternatively, a plurality of layers (precursor layers of the layer (Y)) may be formed simultaneously by applying the coating liquid (U) to the plurality of surfaces of the base (X) simultaneously, followed by drying.

<Step (III)>

In step (III), the layer (Y) is formed by treating the precursor layer (precursor layer of the layer (Y)) formed in step (II). Examples of the method for treating the precursor layer include heat treatment and electromagnetic wave irradiation, for example, with ultraviolet rays. The treatment to be performed in step (III) may be a process of causing a reaction between the metal oxide (A) and the phosphorus compound (B). The treatment to be performed in step (III), for example, may be a process of allowing the particles of the metal oxide (A) to be bonded to each other via a phosphorus atom derived from the phosphorus compound (B) by a reaction between the metal oxide (A) and the phosphorus compound (B). Generally, step (III) is a step of heat-treating the precursor layer at a temperature of 110° C. or more. In the infrared absorption spectrum of the precursor layer, a maximum absorbance ($A^{1'}$) in the range of 800 to 1400 cm$^{-1}$ and a maximum absorbance ($A^{2'}$) in the range of 2500 to 4000 cm$^{-1}$ due to stretching vibration of hydroxyl group may satisfy the relationship of Absorbance ($A^{2'}$)/Absorbance ($A^{1'}$)>0.2, in some cases, which however is not particularly restrictive.

In step (III), a reaction in which the particles of the metal oxide (A) are bonded to each other via a phosphorus atom (phosphorus atom derived from the phosphorus compound (B)) proceeds. From another aspect, a reaction in which the reaction product (R) is produced proceeds in step (III). In order to allow such a reaction to proceed sufficiently, the heat treatment temperature is at least 110° C., preferably at least 120° C., more preferably at least 140° C., further preferably at least 170° C. Low heat treatment temperature requires longer time to obtain a sufficient degree of reaction, thus causing a decrease in productivity. A preferred upper limit of the heat treatment temperature varies depending on, for example, the type of the base (X). For example, in the case of using a thermoplastic resin film made of polyamide resin as the base (X), the heat treatment temperature is preferably 190° C. or less. Meanwhile, in the case of using a thermoplastic resin film made of polyester resin as the base (X), the heat treatment temperature is preferably 220° C. or less. The heat treatment can be carried out in the air, a nitrogen atmosphere, an argon atmosphere, etc.

Duration of the heat treatment is preferably in the range of 0.1 second to 1 hour, more preferably in the range of 1 second to 15 minutes, further preferably in the range of 5 to 300 seconds. As one example, the heat treatment is carried out in the range of 110 to 220° C. for 0.1 second to 1 hour. As another example, the heat treatment is carried out in the range of 120 to 200° C. for 5 to 300 seconds (for example, 60 to 300 seconds).

The method of the present invention for producing the composite structural material may include a step of irradiating the precursor layer of the layer (Y) or the layer (Y) with ultraviolet rays. The ultraviolet irradiation may be carried out at any time after step (II) (for example, after the removal of the solvent from the applied coating liquid (U) has been almost completed). The method thereof is not particularly limited, and a known method can be used. The wavelength of the ultraviolet rays for the irradiation is preferably in the range of 170 to 250 nm, more preferably in the range of 170 to 190 nm and/or in the range of 230 to 250 nm. Instead of the ultraviolet irradiation, irradiation with radial rays such as electron rays and gamma rays may be carried out. The ultraviolet irradiation may cause the composite structural material to exhibit a higher level of barrier performance in some cases.

In the case of treating the surface of the base (X) with a known primer or applying a known adhesive onto the surface of the base (X) before the application of the coating liquid (U) in order to dispose the adhesive layer (H) between the base (X) and the layer (Y), an aging process is preferably performed. Specifically, the base (X) coated with the coating liquid (U) is preferably allowed to stand at relatively low temperature for a long period of time, after the application of the coating liquid (U) before the heat treatment step of step (III). The temperature of the aging process is preferably less than 110° C., more preferably 100° C. or less, further preferably 90° C. or less. The temperature of the aging process is preferably at least 10° C., more preferably at least 20° C., further preferably at least 30° C. Duration of the aging process is preferably in the range of 0.5 to 10 days, more preferably in the range of 1 to 7 days, further preferably in the range of 1 to 5 days. The adhesiveness between the base (X) and the layer (Y) is further enhanced by performing this aging process.

The composite structural material obtained after the heat treatment of step (III) can be used as it is as the composite structural material of the present invention. However, as mentioned above, other members (such as other layers) may be further adhered to or formed on the composite structural material, so as to be the composite structural material of the present invention. Such a member can be adhered by a known method.

<Coating Liquid>

The coating liquid of the present invention is the above-mentioned coating liquid (U). That is, the coating liquid of the present invention contains the metal oxide (A), the phosphorus compound (B), and a solvent. As mentioned above, the coating liquid of the present invention may further contain at least one selected from the group consisting of the polymer (C) and the acid compound (D). The layer (Y) can be formed by heat-treating the layer formed from the coating liquid (U) of the present invention at a temperature of 110° C. or more.

EXAMPLES

Hereinafter, the present invention is described further in detail with reference to examples. However, the present invention is not limited by the following examples at all. The measurements and evaluations in the examples and comparative examples were performed by the following methods (1) to (6).

(1) Infrared Absorption Spectrum of Layer (Y) (or Layer (Y'))

The infrared absorption spectrum of the layer (Y) formed in the examples and the infrared absorption spectrum of the layer (Y') formed in the comparative examples were measured by the following method.

First, the infrared absorption spectrum of the layer (Y) (or the layer (Y')) in a composite structural material using a stretched polyethylene terephthalate film (PET) as a base was measured using a Fourier transform infrared spectrophotometer ("Spectrum One", manufactured by Perkin Elmer, Inc.). The infrared absorption spectrum was measured in the range of 700 to 4000 cm$^{-1}$ in the mode of ATR (attenuated total reflection). When the thickness of the layer (Y) (or the layer (Y')) is 1 μm or less, an absorption peak attributed to the base (X) may be detected in the infrared absorption spectrum by the ATR method, which makes it impossible to accurately determine the absorption intensity attributed only to the layer (Y) (or the layer (Y')). In such a case, the peak attributed only to the layer (Y) (or the layer (Y')) was extracted by subtracting the infrared absorption spectrum of the base (X) alone, which had been separately measured. The same measurement was applied to composite structural materials using bases other than PET (such as a stretched nylon film).

On the basis of the infrared absorption spectrum of the layer (Y) (or the layer (Y')) obtained in this way, a maximum absorption wave number ($n^1$) in the range of 800 to 1400 cm$^{-1}$ and a absorbance ($A^1$) at the maximum absorption wave number ($n^1$) were determined. A maximum absorption wave number ($n^2$) due to stretching vibration of hydroxyl group in the range of 2500 to 4000 cm$^{-1}$ and an absorbance ($A^2$) at the maximum absorption wave number ($n^2$) were also determined. The half width of the absorption peak at the maximum absorption wave number ($n^1$) was obtained by determining the wave numbers at two points where the absorbance is half the absorbance ($A^1$) (Absorbance ($A^1$)/2) in the absorption peak and calculating the difference between the two. In the case of the absorption peak at the maximum absorption wave number ($n^1$) overlapping another absorption peak attributed to another component, the half width of the absorption peak at the maximum absorption wave number ($n^1$) was obtained, after separating the absorption peak attributed to each component from the other, using the least-squares method with a Gaussian function, in the same manner as in the above-mentioned case. The half width of the peak, and the value of (Absorbance ($A^2$))/(Absorbance ($A^1$)) were calculated only when the maximum absorption wave number ($n^1$) in the range of 800 to 1400 cm$^{-1}$ was located within the range of 1080 to 1130 cm$^{-1}$. Note that, for the composite structural materials of Comparative Examples 3 and 4 each having a precursor layer of the layer (Y), the value of (Absorbance ($A^{2\prime}$))/(Absorbance ($A^{1\prime}$)), which corresponded to the value of (Absorbance ($A^2$))/(Absorbance ($A^1$)) for the layer (Y) was calculated. However, in the infrared absorption spectrum of the precursor layer of the layer (Y), the absorbance ($A^{1\prime}$) and the absorbance ($A^{2\prime}$) were respectively the maximum absorbance ($A^{1\prime}$) in the range of 800 to 1400 cm$^{-1}$ and the maximum absorbance ($A^{2\prime}$) due to stretching vibration of hydroxyl group in the range of 2500 to 4000 cm$^{-1}$.

(2) Appearance of Composite Structural Material

The appearance of the resultant composite structural materials was evaluated as follows by visual inspection.

S: Uniform appearance, being colorless and transparent, which was exceptionally favorable A: Slightly dull or uneven appearance, which nevertheless was favorable B: One continuous layer could not be obtained because of the reasons such as the repelling of the coating liquid (3) Oxygen Barrier Properties Before Retorting The oxygen transmission rate (OTR) was measured using an oxygen transmission rate tester ("MOCON OX-TRAN 2/20", manufactured by Modern Controls, Inc.). Specifically, the composite structural material was positioned so that the layer (Y) (or the layer (Y')) faced the oxygen supply side while the later-mentioned CPP layer faced the carrier gas side. Then, the oxygen transmission rate (unit: ml/(m$^2$·day·atm)) was measured under the conditions of a temperature of 20° C., a humidity on the oxygen supply side of 85% RH, a humidity on the carrier gas side of 85% RH, an oxygen pressure of 1 atm, and a career gas pressure of 1 atm. As the carrier gas, nitrogen gas containing 2 vol % of hydrogen gas was used.

(4) Oxygen Barrier Properties after Retorting

Two pieces of composite structural material with a size of 12 cm×12 cm were produced. Then the two pieces were stacked together in such a manner that the CPP layers to be mentioned later faced the inside. Thereafter, three sides thereof were heat-sealed to 5 mm from the edges thereof. 80 g of distilled water was poured between the two pieces of the composite structural material that had been heat-sealed and then the remaining fourth side was heat-sealed in the same manner. Thus, a pouch containing distilled water was produced.

Next, the pouch was put into a retort sterilizer (Flavor Ace RCS-60, manufactured by HISAKA WORKS, LTD.) to be subjected to retorting by immersion in hot water of 120° C. and 0.15 MPa for 30 minutes. After retorting, the pouch was taken out from the retort sterilizer, and then a composite structural material with a size of 10 cm×10 cm was sampled.

The oxygen transmission rate (OTR) was measured using an oxygen transmission rate tester ("MOCON OX-TRAN 2/20", manufactured by Modern Controls, Inc.). Specifically, the composite structural material was positioned so that the layer (Y) (or the layer (Y')) faced the oxygen supply side while the later-mentioned CPP layer faced the carrier gas side. Then, the oxygen transmission rate (unit: ml/(m$^2$·day·atm)) was measured under the conditions of a temperature of 20° C., a humidity on the oxygen supply side of 85% RH, a humidity on the carrier gas side of 85% RH, an oxygen pressure of 1 atm, and a career gas pressure of 1 atm. As the carrier gas, nitrogen gas containing 2 vol % of hydrogen gas was used.

(5) Water Vapor Barrier Properties Before Retorting

The moisture transmission rate (Water Vapor Transmission Rate: WVTR) was measured using a water vapor transmission rate tester ("MOCON PERMATRAN 3/33", manufactured by Modern Controls, Inc.). Specifically, the composite structural material was positioned so that the layer (Y) (or the layer (Y')) faced the water vapor supply side while the later-mentioned CPP layer faced the carrier gas side. Then, the moisture transmission rate (unit: g/(m$^2$·day)) was measured under the conditions of a temperature of 40° C., a humidity on the water vapor supply side of 90% RH, and a humidity on the carrier gas side of 0% RH.

(6) Water Vapor Barrier Properties after Retorting

A sample after retorting was obtained in the same manner as mentioned above in the section of "Oxygen barrier properties after retorting". The moisture transmission rate (Water Vapor Transmission Rate: WVTR) of the obtained sample was measured using the water vapor transmission rate tester ("MOCON PERMATRAN 3/33", manufactured by Modern Controls, Inc.). Specifically, the composite structural material was positioned so that the layer (Y) (or the layer (Y')) faced the water vapor supply side while the later-mentioned CPP layer faced the carrier gas side. Then, the moisture transmission rate (unit: g/(m²·day)) was measured under the conditions of a temperature of 40° C., a humidity on the water vapor supply side of 90% RH, and a humidity on the carrier gas side of 0% RH.

Example 1

230 parts by mass of distilled water was heated to 70° C. under stirring. 88 parts by mass of aluminum isopropoxide was added dropwise to the distilled water over 1 hour, and then the liquid temperature was gradually raised to 95° C. so that the generated isopropanol was distilled off. Thus, hydrolysis condensation was performed. Subsequently, 4.0 parts by mass of a 60-mass % nitric acid aqueous solution was added thereto, which was stirred at 95° C. for 3 hours, thereby peptizing aggregated particles of the hydrolysis condensate. The resultant dispersion was concentrated to a solid content concentration of 10 mass % calculated in terms of alumina. Thus, a dispersion (S1) was obtained.

Meanwhile, 42.85 parts by mass of distilled water, 19.00 parts by mass of methanol, and 1.39 parts by mass of trifluoroacetic acid were added to 1.76 parts by mass of a 85-mass % phosphoric acid aqueous solution, which was stirred to be homogeneous. Thus, a solution (T1) was obtained. Subsequently, while the solution (T1) was stirred, 35.00 parts by mass of the dispersion (S1) was added dropwise thereto, which was further stirred for 30 minutes continuously after the completion of the addition. Thus, a coating liquid (U1) was obtained.

Next, a stretched polyethylene terephthalate film ("Lumirror P60" (product name) with a thickness of 12 μm, manufactured by Toray Industries, Inc., which may hereinafter be abbreviated as "PET") was prepared as a base. The base (PET) was coated with the coating liquid (U1) using a bar coater to a thickness of 0.5 μm after drying. This was dried at 100° C. for 5 minutes. Thus, a precursor layer of a layer (Y1) was formed. The obtained layered product was subjected to heat treatment at 180° C. for one minute using a dryer. Thus, a composite structural material (A1) having a structure of Layer (Y1) (0.5 μm)/PET (12 μm) was obtained. The resultant composite structural material (A1) was subjected to measurement or evaluation of the infrared absorption spectrum of the layer (Y1) (layer (Y)) and the appearance of the composite structural material by the above-mentioned method.

Subsequently, an unstretched polypropylene film ("RXC-21" (product name) with a thickness of 50 μm, manufactured by TOHCELLO CO., LTD., which may hereinafter be abbreviated as "CPP") was prepared. This CPP was coated with a two-component adhesive ("A-520" (product name) and "A-50" (product name), manufactured by MITSUI TAKEDA CHEMICALS INC.), followed by drying. Then, this was laminated with the composite structural material (A1). Thus, a composite structural material (B1) having a structure of Layer (Y1)/PET/Adhesive/CPP was obtained. The resultant composite structural material (B1) was subjected to evaluation of the oxygen barrier properties before and after retorting and the water vapor barrier properties before and after retorting by the above-mentioned method.

Example 2

In Example 2, a dispersion (S2) prepared in the same manner as the dispersion (S1) obtained in Example 1 was used.

Meanwhile, 45.05 parts by mass of distilled water, 19.00 parts by mass of methanol, and 1.39 parts by mass of trifluoroacetic acid were added to 2.06 parts by mass of a 85-mass % phosphoric acid aqueous solution, which was stirred to be homogeneous. Thus, a solution (T2) was obtained. Subsequently, while the solution (T2) is stirred, 32.50 parts by mass of the dispersion (S2) was added dropwise thereto, which was further stirred for 30 minutes continuously after the completion of the addition. Thus, a coating liquid (U2) was obtained.

Thus, a composite structural material (A2) having a structure of Layer (Y2) (0.5 μm)/PET (12 μm) was obtained in the same manner as in Example 1, except that the coating liquid (U2) was used instead of the coating liquid (U1). The resultant composite structural material (A2) was subjected to measurement or evaluation of the infrared absorption spectrum of the layer (Y2) (layer (Y)) and the appearance of the composite structural material by the above-mentioned method.

Subsequently, a composite structural material (B2) having a structure of Layer (Y2)/PET/Adhesive/CPP was obtained in the same manner as in Example 1, except that the composite structural material (A2) was used instead of the composite structural material (A1). The resultant composite structural material (B2) was subjected to evaluation of the oxygen barrier properties before and after retorting and the water vapor barrier properties before and after retorting by the above-mentioned method.

Example 3

In Example 3, a dispersion (S3) prepared in the same manner as the dispersion (S1) obtained in Example 1 was used.

Meanwhile, 47.26 parts by mass of distilled water, 19.00 parts by mass of methanol, and 1.39 parts by mass of trifluoroacetic acid were added to 2.35 parts by mass of a 85-mass % phosphoric acid aqueous solution, which was stirred to be homogeneous. Thus, a solution (T3) was obtained. Subsequently, while the solution (T3) was stirred, 30.00 parts by mass of the dispersion (S3) was added dropwise thereto, which was further stirred for 30 minutes continuously after the completion of the addition. Thus, a coating liquid (U3) was obtained.

Thus, a composite structural material (A3) having a structure of Layer (Y3) (0.5 μm)/PET (12 μm) was obtained in the same manner as in Example 1, except that the coating liquid (U3) was used instead of the coating liquid (U1). The resultant composite structural material (A3) was subjected to measurement or evaluation of the infrared absorption spectrum of the layer (Y3) (layer (Y)) and the appearance of the composite structural material by the above-mentioned method.

Subsequently, a composite structural material (B3) having a structure of Layer (Y3)/PET/Adhesive/CPP was obtained in the same manner as in Example 1, except that the composite structural material (A3) was used instead of the composite structural material (A1). The resultant composite structural material (B3) was subjected to evaluation of the oxygen barrier properties before and after retorting and the water vapor barrier properties before and after retorting by the above-mentioned method.

Example 4

In Example 4, a dispersion (S4) prepared in the same manner as the dispersion (S1) obtained in Example 1 was used.

Meanwhile, 51.67 parts by mass of distilled water, 19.00 parts by mass of methanol, and 1.39 parts by mass of trifluoroacetic acid were added to 2.94 parts by mass of a 85-mass % phosphoric acid aqueous solution, which was stirred to be homogeneous. Thus, a solution (T4) was obtained. Subsequently, while the solution (T4) was stirred, 25.00 parts by mass of the dispersion (S4) was added dropwise thereto, which was further stirred for 30 minutes continuously after the completion of the addition. Thus, a coating liquid (U4) was obtained.

A composite structural material (A4) having a structure of Layer (Y4) (0.5 μm)/PET (12 μm) was obtained in the same manner as in Example 1, except that the coating liquid (U4) was used instead of the coating liquid (U1). The resultant composite structural material (A4) was subjected to measurement or evaluation of the infrared absorption spectrum of the layer (Y4) (layer (Y)) and the appearance of the composite structural material by the above-mentioned method.

Subsequently, a composite structural material (B4) having a structure of Layer (Y4)/PET/Adhesive/CPP was obtained in the same manner as in Example 1, except that the composite structural material (A4) was used instead of the composite structural material (A1). The resultant composite structural material (B4) was subjected to evaluation of the oxygen barrier properties before and after retorting and the water vapor barrier properties before and after retorting by the above-mentioned method.

Example 5

In Example 5, a dispersion (S5) prepared in the same manner as the dispersion (S1) obtained in Example 1 was used.

Meanwhile, 56.08 parts by mass of distilled water, 19.00 parts by mass of methanol, and 1.39 parts by mass of trifluoroacetic acid were added to 3.53 parts by mass of a 85-mass % phosphoric acid aqueous solution, which was stirred to be homogeneous. Thus, a solution (T5) was obtained. Subsequently, while the solution (T5) was stirred, 20.00 parts by mass of the dispersion (S5) was added dropwise thereto, which was further stirred for 30 minutes continuously after the completion of the addition. Thus, a coating liquid (U5) was obtained.

A composite structural material (A5) having a structure of Layer (Y5) (0.5 μm)/PET (12 μm) was obtained in the same manner as in Example 1, except that the coating liquid (U5) was used instead of the coating liquid (U1). The resultant composite structural material (A5) was subjected to measurement or evaluation of the infrared absorption spectrum of the layer (Y5) (layer (Y)) and the appearance of the composite structural material by the above-mentioned method.

Subsequently, a composite structural material (B5) having a structure of Layer (Y5)/PET/Adhesive/CPP was obtained in the same manner as in Example 1, except that the composite structural material (A5) was used instead of the composite structural material (A1). The resultant composite structural material (B5) was subjected to evaluation of the oxygen barrier properties before and after retorting and the water vapor barrier properties before and after retorting by the above-mentioned method.

Example 6

In Example 6, a dispersion (S6) prepared in the same manner as the dispersion (S1) obtained in Example 1 was used.

Meanwhile, 58.29 parts by mass of distilled water, 19.00 parts by mass of methanol, and 1.39 parts by mass of trifluoroacetic acid were added to 3.82 parts by mass of a 85-mass % phosphoric acid aqueous solution, which was stirred to be homogeneous. Thus, a solution (T6) was obtained. Subsequently, while the solution (T6) was stirred, 17.50 parts by mass of the dispersion (S6) was added dropwise thereto, which was further stirred for 30 minutes continuously after the completion of the addition. Thus, a coating liquid (U6) was obtained.

A composite structural material (A6) having a structure of Layer (Y6) (0.5 μm)/PET (12 μm) was obtained in the same manner as in Example 1, except that the coating liquid (U6) was used instead of the coating liquid (U1). The resultant composite structural material (A6) was subjected to measurement or evaluation of the infrared absorption spectrum of the layer (Y6) (layer (Y)) and the appearance of the composite structural material by the above-mentioned method.

Subsequently, a composite structural material (B6) having a structure of Layer (Y6)/PET/Adhesive/CPP was obtained in the same manner as in Example 1, except that the composite structural material (A6) was used instead of the composite structural material (A1). The resultant composite structural material (B6) was subjected to evaluation of the oxygen barrier properties before and after retorting and the water vapor barrier properties before and after retorting by the above-mentioned method.

Example 7

In Example 7, a dispersion (S7) prepared in the same manner as the dispersion (S1) obtained in Example 1 was used.

Meanwhile, 60.49 parts by mass of distilled water, 19.00 parts by mass of methanol, and 1.39 parts by mass of trifluoroacetic acid were added to 4.12 parts by mass of a 85-mass % phosphoric acid aqueous solution, which was stirred to be homogeneous. Thus, a solution (T7) was obtained. Subsequently, while the solution (T7) was stirred, 15.00 parts by mass of the dispersion (S7) was added dropwise thereto, which was further stirred for 30 minutes continuously after the completion of the addition. Thus, a coating liquid (U7) was obtained.

A composite structural material (A7) having a structure of Layer (Y7) (0.5 μm)/PET (12 μm) was obtained in the same manner as in Example 1, except that the coating liquid (U7) was used instead of the coating liquid (U1). The resultant composite structural material (A7) was subjected to measurement or evaluation of the infrared absorption spectrum of the layer (Y7) (layer (Y)) and the appearance of the composite structural material by the above-mentioned method.

Subsequently, a composite structural material (B7) having a structure of Layer (Y7)/PET/Adhesive/CPP was obtained in the same manner as in Example 1, except that the composite structural material (A7) was used instead of the composite structural material (A1). The resultant composite structural material (B7) was subjected to evaluation of the oxygen barrier properties before and after retorting and the water vapor barrier properties before and after retorting by the above-mentioned method.

Example 8

In Example 8, a coating liquid (U8) prepared in the same manner as the coating liquid (U5) obtained in Example 5 was used.

A composite structural material (A8) having a structure of Layer (Y8) (0.5 μm)/PET (12 μm) was obtained in the same manner as in Example 1, except that the coating liquid (U8) was used instead of the coating liquid (U1) and the temperature and duration of heat treatment were changed respectively from 180° C. and one minute to 120° C. and five minutes. The resultant composite structural material (A8) was subjected to measurement or evaluation of the infrared absorption spectrum of the layer (Y8) (layer (Y)) and the appearance of the composite structural material by the above-mentioned method.

Subsequently, a composite structural material (B8) having a structure of Layer (Y8)/PET/Adhesive/CPP was obtained in the same manner as in Example 1, except that the composite structural material (A8) was used instead of the composite structural material (A1). The resultant composite structural material (B8) was subjected to evaluation of the oxygen barrier properties before and after retorting and the water vapor barrier properties before and after retorting by the above-mentioned method.

Example 9

In Example 9, a coating liquid (U9) prepared in the same manner as the coating liquid (U5) obtained in Example 5 was used.

A composite structural material (A9) having a structure of Layer (Y9) (0.5 μm)/PET (12 μm) was obtained in the same manner as in Example 1, except that the coating liquid (U9) was used instead of the coating liquid (U1), and the temperature and duration of heat treatment were changed respectively from 180° C. and one minute to 150° C. and one minute. The resultant composite structural material (A9) was subjected to measurement or evaluation of the infrared absorption spectrum of the layer (Y9) (layer (Y)) and the appearance of the composite structural material by the above-mentioned method.

Subsequently, a composite structural material (B9) having a structure of Layer (Y9)/PET/Adhesive/CPP was obtained in the same manner as in Example 1, except that the composite structural material (A9) was used instead of the composite structural material (A1). The resultant composite structural material (B9) was subjected to evaluation of the oxygen barrier properties before and after retorting and the water vapor barrier properties before and after retorting by the above-mentioned method.

Example 10

In Example 10, a coating liquid (U10) prepared in the same manner as the coating liquid (U5) obtained in Example 5 was used.

A composite structural material (A10) having a structure of Layer (Y10) (0.5 μm)/PET (12 μm) was obtained in the same manner as in Example 1, except that the coating liquid (U10) was used instead of the coating liquid (U1), and the temperature and duration of heat treatment were changed respectively from 180° C. and one minute to 200° C. and one minute. The resultant composite structural material (A10) was subjected to measurement or evaluation of the infrared absorption spectrum of the layer (Y10) (layer (Y)) and the appearance of the composite structural material by the above-mentioned method.

Subsequently, a composite structural material (B10) having a structure of Layer (Y10)/PET/Adhesive/CPP was obtained in the same manner as in Example 1, except that the composite structural material (A10) was used instead of the composite structural material (A1). The resultant composite structural material (B10) was subjected to evaluation of the oxygen barrier properties before and after retorting and the water vapor barrier properties before and after retorting by the above-mentioned method.

Example 11

In Example 11, a dispersion (S11) prepared in the same manner as the dispersion (S1) obtained in Example 1 was used.

Meanwhile, 57.07 parts by mass of distilled water, 1.50 parts by mass of a 60-mass % nitric acid aqueous solution, and 19.00 parts by mass of methanol were added to 3.68 parts by mass of a 85-mass % phosphoric acid aqueous solution, which was stirred to be homogeneous. Thus, a solution (T11) was obtained. Subsequently, while the solution (T11) was stirred, 18.75 parts by mass of the dispersion (S11) was added dropwise thereto, which was further stirred for 30 minutes continuously after the completion of the addition. Thus, a coating liquid (U11) was obtained.

A composite structural material (A11) having a structure of Layer (Y11) (0.5 μm)/PET (12 μm) was obtained in the same manner as in Example 1, except that the coating liquid (U11) was used instead of the coating liquid (U1). The resultant composite structural material (A11) was subjected to measurement or evaluation of the infrared absorption spectrum of the layer (Y11) (layer (Y)) and the appearance of the composite structural material by the above-mentioned method.

Subsequently, a composite structural material (B11) having a structure of Layer (Y11)/PET/Adhesive/CPP was obtained in the same manner as in Example 1, except that the composite structural material (A11) was used instead of the composite structural material (A1). The resultant composite structural material (B11) was subjected to evaluation of the oxygen barrier properties before and after retorting and the water vapor barrier properties before and after retorting by the above-mentioned method.

Example 12

In Example 12, a dispersion (S12) prepared in the same manner as the dispersion (S1) obtained in Example 1 was used.

Meanwhile, 57.07 parts by mass of distilled water, 1.50 parts by mass of a 35-mass % hydrochloric acid, and 19.00 parts by mass of methanol were added to 3.68 parts by mass of a 85-mass % phosphoric acid aqueous solution, which was stirred to be homogeneous. Thus, a solution (T12) was obtained. Subsequently, while the solution (T12) was stirred, 18.75 parts by mass of the dispersion (S12) was added dropwise thereto, which was further stirred for 30 minutes continuously after the completion of the addition. Thus, a coating liquid (U12) was obtained.

A composite structural material (A12) having a structure of Layer (Y12) (0.5 μm)/PET (12 μm) was obtained in the same manner as in Example 1, except that the coating liquid (U12) was used instead of the coating liquid (U1). The resultant composite structural material (A12) was subjected to measurement or evaluation of the infrared absorption spectrum of the layer (Y12) (layer (Y)) and the appearance of the composite structural material by the above-mentioned method.

Subsequently, a composite structural material (B12) having a structure of Layer (Y12)/PET/Adhesive/CPP was obtained in the same manner as in Example 1, except that the composite structural material (A12) was used instead of the composite structural material (A1). The resultant composite structural material (B12) was subjected to evaluation of the oxygen barrier properties before and after retorting and the water vapor barrier properties before and after retorting by the above-mentioned method.

Example 13

In Example 13, 57.47 parts by mass of distilled water and 19.00 parts by mass of methanol were added to 20.00 parts by mass of a dispersion prepared in the same manner as the dispersion (S1) obtained in Example 1, which was stirred to be homogeneous. Thus, a solution (S13) was obtained. Further, a 85-mass % phosphoric acid aqueous solution was used as a solution (T13). Subsequently, while the dispersion (S13) was stirred, 3.53 parts by mass of the solution (T13) was added dropwise thereto, which was further stirred for 30 minutes continuously after the completion of the addition. Thus, a coating liquid (U13) was obtained.

A composite structural material (A13) having a structure of Layer (Y13) (0.5 μm)/PET (12 μm) was obtained in the same manner as in Example 1, except that coating liquid (U13) was used instead of the coating liquid (U1). The resultant composite structural material (A13) was subjected to measurement or evaluation of the infrared absorption spectrum of the layer (Y13) (layer (Y)) and the appearance of the composite structural material by the above-mentioned method.

Subsequently, a composite structural material (B13) having a structure of Layer (Y13)/PET/Adhesive/CPP was obtained in the same manner as in Example 1, except that the composite structural material (A13) was used instead of the composite structural material (A1). The resultant composite structural material (B13) was subjected to evaluation of the oxygen barrier properties before and after retorting and the water vapor barrier properties before and after retorting by the above-mentioned method.

Example 14

In Example 14, a dispersion (S14) prepared in the same manner as the dispersion (S1) obtained in Example 1 was used.

Meanwhile, 57.47 parts by mass of distilled water and 19.00 parts by mass of methanol were added to 3.53 parts by mass of a 85-mass % phosphoric acid aqueous solution, which was stirred to be homogeneous. Thus, a solution (T14) was obtained. Subsequently, while the solution (T14) was stirred, 20.00 parts by mass of the dispersion (S14) was added dropwise thereto, which was further stirred for 30 minutes continuously after the completion of the addition. Thus, a coating liquid (U14) was obtained.

A composite structural material (A14) having a structure of Layer (Y14) (0.5 μm)/PET (12 μm) was obtained in the same manner as in Example 1, except that the coating liquid (U14) was used instead of the coating liquid (U1). The resultant composite structural material (A14) was subjected to measurement or evaluation of the infrared absorption spectrum of the layer (Y14) (layer (Y)) and the appearance of the composite structural material by the above-mentioned method.

Subsequently, a composite structural material (B14) having a structure of Layer (Y14)/PET/Adhesive/CPP was obtained in the same manner as in Example 1, except that the composite structural material (A14) was used instead of the composite structural material (A1). The resultant composite structural material (B14) was subjected to evaluation of the oxygen barrier properties before and after retorting and the water vapor barrier properties before and after retorting by the above-mentioned method.

Example 15

In Example 15, a dispersion (S15) prepared in the same manner as the dispersion (S1) obtained in Example 1 was used.

Meanwhile, 53.43 parts by mass of distilled water, 5.00 parts by mass of a 10-mass % starch aqueous solution, 19.00 parts by mass of methanol, and 1.39 parts by mass of trifluoroacetic acid were added to 3.18 parts by mass of a 85-mass % phosphoric acid aqueous solution, which was stirred to be homogeneous. Thus, a solution (T15) was obtained. Subsequently, while the solution (T15) was stirred, 18.00 parts by mass of the dispersion (S15) was added dropwise thereto, which was further stirred for 30 minutes continuously after the completion of the addition. Thus, a coating liquid (U15) was obtained.

A composite structural material (A15) having a structure of Layer (Y15) (0.5 μm)/PET (12 μm) was obtained in the same manner as in Example 1, except that the coating liquid (U15) was used instead of the coating liquid (U1). The resultant composite structural material (A15) was subjected to measurement or evaluation of the infrared absorption spectrum of the layer (Y15) (layer (Y)) and the appearance of the composite structural material by the above-mentioned method.

Subsequently, a composite structural material (B15) having a structure of Layer (Y15)/PET/Adhesive/CPP was obtained in the same manner as in Example 1, except that the composite structural material (A15) was used instead of the composite structural material (A1). The resultant composite structural material (B15) was subjected to evaluation of the oxygen barrier properties before and after retorting and the water vapor barrier properties before and after retorting by the above-mentioned method.

Example 16

In Example 16, a dispersion (S16) prepared in the same manner as the dispersion (S1) obtained in Example 1 was used.

Meanwhile, 53.43 parts by mass of distilled water, 5.00 parts by mass of a 10-mass % polyvinyl alcohol aqueous solution, 19.00 parts by mass of methanol, and 1.39 parts by mass of trifluoroacetic acid were added to 3.18 parts by mass of a 85-mass % phosphoric acid aqueous solution, which was stirred to be homogeneous. Thus, a solution (T16) was obtained. Subsequently, while the solution (T16) was stirred, 18.00 parts by mass of the dispersion (S16) was added dropwise thereto, which was further stirred for 30 minutes continuously after the completion of the addition. Thus, a coating liquid (U16) was obtained.

A composite structural material (A16) having a structure of Layer (Y16) (0.5 μm)/PET (12 μm) was obtained in the same manner as in Example 1, except that the coating liquid (U16) was used instead of the coating liquid (U1). The resultant composite structural material (A16) was subjected to measurement or evaluation of the infrared absorption spectrum of the layer (Y16) (layer (Y)) and the appearance of the composite structural material by the above-mentioned method.

Subsequently, a composite structural material (B16) having a structure of Layer (Y16)/PET/Adhesive/CPP was obtained in the same manner as in Example 1, except that the composite structural material (A16) was used instead of the composite structural material (A1). The resultant composite structural material (B16) was subjected to evaluation of the oxygen barrier properties before and after retorting and the water vapor barrier properties before and after retorting by the above-mentioned method.

Example 17

In Example 17, a dispersion (S17) prepared in the same manner as the dispersion (S1) obtained in Example 1 was used.

Meanwhile, 53.43 parts by mass of distilled water, 5.00 parts by mass of a 10-mass % polyacrylic acid aqueous solution, 19.00 parts by mass of methanol, and 1.39 parts by mass of trifluoroacetic acid were added to 3.18 parts by mass of a 85-mass % phosphoric acid aqueous solution, which was stirred to be homogeneous. Thus, a solution (T17) was obtained. Subsequently, while the solution (T17) was stirred, 18.00 parts by mass of the dispersion (S17) was added dropwise thereto, which was further stirred for 30 minutes continuously after the completion of the addition. Thus, a coating liquid (U17) was obtained.

A composite structural material (A17) having a structure of Layer (Y17) (0.5 μm)/PET (12 μm) was obtained in the same manner as in Example 1, except that the coating liquid (U17) was used instead of the coating liquid (U1). The resultant composite structural material (A17) was subjected to measurement or evaluation of the infrared absorption spectrum of the layer (Y17) (layer (Y)) and the appearance of the composite structural material by the above-mentioned method.

Subsequently, a composite structural material (B17) having a structure of Layer (Y17)/PET/Adhesive/CPP was obtained in the same manner as in Example 1, except that the composite structural material (A17) was used instead of the composite structural material (A1). The resultant composite structural material (B17) was subjected to evaluation of the oxygen barrier properties before and after retorting and the water vapor barrier properties before and after retorting by the above-mentioned method.

Example 18

In Example 18, a dispersion (S18) prepared in the same manner as the dispersion (S1) obtained in Example 1 was used.

Meanwhile, 55.51 parts by mass of distilled water, 0.61 part by mass of a 5-mass % nitrilotris (methylenephosphonic acid) aqueous solution, 19.00 parts by mass of methanol, and 1.39 parts by mass of trifluoroacetic acid were added to 3.49 parts by mass of a 85-mass % phosphoric acid aqueous solution, which was stirred to be homogeneous. Thus, a solution (T18) was obtained. Subsequently, while the solution (T18) was stirred, 20.00 parts by mass of the dispersion (S18) was added dropwise thereto, which was further stirred for 30 minutes continuously after the completion of the addition. Thus, a coating liquid (U18) was obtained.

A composite structural material (A18) having a structure of Layer (Y18) (0.5 μm)/PET (12 μm) was obtained in the same manner as in Example 1, except that the coating liquid (U18) was used instead of the coating liquid (U1). The resultant composite structural material (A18) was subjected to measurement or evaluation of the infrared absorption spectrum of the layer (Y18) (layer (Y)) and the appearance of the composite structural material by the above-mentioned method.

Subsequently, a composite structural material (B18) having a structure of Layer (Y18)/PET/Adhesive/CPP was obtained in the same manner as in Example 1, except that the composite structural material (A18) was used instead of the composite structural material (A1). The resultant composite structural material (B18) was subjected to evaluation of the oxygen barrier properties before and after retorting and the water vapor barrier properties before and after retorting by the above-mentioned method.

Example 19

In Example 19, a dispersion (S19) prepared in the same manner as the dispersion (S1) obtained in Example 1 was used.

Meanwhile, 55.50 parts by mass of distilled water, 0.67 part by mass of a 5-mass % N,N,N',N'-ethylenediaminetetrakis (methylenephosphonic acid) aqueous solution, 19.01 parts by mass of methanol, and 1.39 parts by mass of trifluoroacetic acid were added to 3.49 parts by mass of a 85-mass % phosphoric acid aqueous solution, which was stirred to be homogeneous. Thus, a solution (T19) was obtained. Subsequently, while the solution (T19) was stirred, 20.00 parts by mass of the dispersion (S19) was added dropwise thereto, which was further stirred for 30 minutes continuously after the completion of the addition. Thus, a coating liquid (U19) was obtained.

A composite structural material (A19) having a structure of Layer (Y19) (0.5 μm)/PET (12 μm) was obtained in the same manner as in Example 1, except that the coating liquid (U19) was used instead of the coating liquid (U1). The resultant composite structural material (A19) was subjected to measurement or evaluation of the infrared absorption spectrum of the layer (Y19) (layer (Y)) and the appearance of the composite structural material by the above-mentioned method.

Subsequently, a composite structural material (B19) having a structure of Layer (Y19)/PET/Adhesive/CPP was obtained in the same manner as in Example 1, except that the composite structural material (A19) was used instead of the composite structural material (A1). The resultant composite structural material (B19) was subjected to evaluation of the oxygen barrier properties before and after retorting and the water vapor barrier properties before and after retorting by the above-mentioned method.

Example 20

In Example 20, a dispersion (S20) prepared in the same manner as the dispersion (S1) obtained in Example 1 was used.

Meanwhile, 53.89 parts by mass of distilled water, 19.00 parts by mass of methanol, and 1.39 parts by mass of trifluoroacetic acid were added to 5.72 parts by mass of a 75-mass % trimethyl phosphate aqueous solution, which was stirred to be homogeneous. Thus, a solution (T20) was obtained. Subsequently, while the solution (T20) was stirred, 20.00 parts by mass of the dispersion (S20) was added dropwise thereto, which was further stirred for 30 minutes continuously after the completion of the addition. Thus, a coating liquid (U20) was obtained.

A composite structural material (A20) having a structure of Layer (Y20) (0.5 μm)/PET (12 μm) was obtained in the same manner as in Example 1, except that the coating liquid (U20) was used instead of the coating liquid (U1). The resultant composite structural material (A20) was subjected to measurement or evaluation of the infrared absorption spectrum of the layer (Y20) (layer (Y)) and the appearance of the composite structural material by the above-mentioned method.

Subsequently, a composite structural material (B20) having a structure of Layer (Y20)/PET/Adhesive/CPP was obtained in the same manner as in Example 1, except that the composite structural material (A20) was used instead of the composite structural material (A1). The resultant composite structural material (B20) was subjected to evaluation of the oxygen barrier properties before and after retorting and the water vapor barrier properties before and after retorting by the above-mentioned method.

Example 21

In Example 21, a dispersion (S21) prepared in the same manner as the dispersion (S1) obtained in Example 1 was used.

Meanwhile, 33.69 parts by mass of distilled water, 19.00 parts by mass of methanol, and 1.39 parts by mass of trifluoroacetic acid were added to 20.92 parts by mass of a 10-mass % phosphonic acid aqueous solution, which was stirred to be homogeneous. Thus, a solution (T21) was obtained. Subsequently, while the solution (T21) was stirred, 25.00 parts by mass of the dispersion (S21) was added dropwise thereto, which was further stirred for 30 minutes continuously after the completion of the addition. Thus, a coating liquid (U21) was obtained.

A composite structural material (A21) having a structure of Layer (Y21) (0.5 µm)/PET (12 µm) was obtained in the same manner as in Example 1, except that the coating liquid (U21) was used instead of the coating liquid (U1). The resultant composite structural material (A21) was subjected to measurement or evaluation of the infrared absorption spectrum of the layer (Y21) (layer (Y)) and the appearance of the composite structural material by the above-mentioned method.

Subsequently, a composite structural material (B21) having a structure of Layer (Y21)/PET/Adhesive/CPP was obtained in the same manner as in Example 1, except that the composite structural material (A21) was used instead of the composite structural material (A1). The resultant composite structural material (B21) was subjected to evaluation of the oxygen barrier properties before and after retorting and the water vapor barrier properties before and after retorting by the above-mentioned method.

Example 22

In Example 22, a dispersion (S22) prepared in the same manner as the dispersion (S1) obtained in Example 1 was used.

Meanwhile, 48.07 parts by mass of distilled water, 4.18 parts by mass of a 10-mass % phosphonic acid aqueous solution, 19.00 parts by mass of methanol, and 1.39 parts by mass of trifluoroacetic acid were added to 2.35 parts by mass of a 85-mass % phosphoric acid aqueous solution, which was stirred to be homogeneous. Thus, a solution (T22) was obtained. Subsequently, while the solution (T22) was stirred, 25.00 parts by mass of the dispersion (S22) was added dropwise thereto, which was further stirred for 30 minutes continuously after the completion of the addition. Thus, a coating liquid (U22) was obtained.

A composite structural material (A22) having a structure of Layer (Y22) (0.5 µm)/PET (12 µm) was obtained in the same manner as in Example 1, except that the coating liquid (U22) was used instead of the coating liquid (U1). The resultant composite structural material (A22) was subjected to measurement or evaluation of the infrared absorption spectrum of the layer (Y22) (layer (Y)) and the appearance of the composite structural material by the above-mentioned method.

Subsequently, a composite structural material (B22) having a structure of Layer (Y22)/PET/Adhesive/CPP was obtained in the same manner as in Example 1, except that the composite structural material (A22) was used instead of the composite structural material (A1). The resultant composite structural material (B22) was subjected to evaluation of the oxygen barrier properties before and after retorting and the water vapor barrier properties before and after retorting by the above-mentioned method.

Example 23

In Example 23, a coating liquid (U23) prepared in the same manner as the coating liquid (U11) obtained in Example 11 was used.

A composite structural material (A23) having a structure of Layer (Y23) (0.5 µm)/PET (12 µm) was obtained in the same manner as in Example 1, except that the coating liquid (U23) was used instead of the coating liquid (U1). The resultant composite structural material (A23) was subjected to measurement or evaluation of the infrared absorption spectrum of the layer (Y23) (layer (Y)) and the appearance of the composite structural material by the above-mentioned method.

Subsequently, a composite structural material (B23) having a structure of PET/Layer (Y23)/Adhesive/CPP was obtained in the same manner as in Example 1, except that the composite structural material (A23) was used instead of the composite structural material (A1) and CPP was laminated on the layer (Y) side. The resultant composite structural material (B23) was subjected to evaluation of the oxygen barrier properties before and after retorting and the water vapor barrier properties before and after retorting by the above-mentioned method.

Example 24

In Example 24, a coating liquid (U24) prepared in the same manner as the coating liquid (U11) obtained in Example 11 was used.

A composite structural material (A24) having a structure of Layer (Y24) (0.5 µm)/PET (12 µm)/Layer (Y24) (0.5 µm) was obtained in the same manner as in Example 1, except that the coating liquid (U24) was used instead of the coating liquid (U1) and the method for forming the layer (Y) was different. In Example 24, the layer (Y24) was formed on each of both sides of the base. Specifically, one surface of the base was first coated with the coating liquid (U24), followed by drying at 100° C. for 5 minutes, and thereafter the other surface of the base was coated with the coating liquid (U24), followed by drying at 100° C. for 5 minutes. Thus, a precursor layer of the layer (Y24) was formed on each of both sides of the base. Thereafter, heat treatment was performed at 180° C. for one minute using a dryer, thereby allowing the layer (Y24) with a thickness of 0.5 µm to be formed on each of both sides of the base.

The resultant composite structural material (A24) was subjected to measurement or evaluation of the infrared absorption spectrum of the layer (Y24) (layer (Y)) on one side and the appearance of the composite structural material by the above-mentioned method.

Subsequently, a composite structural material (B24) having a structure of Layer (Y24)/PET/Layer (Y24)/Adhesive/CPP was obtained in the same manner as in Example 1, except that the composite structural material (A24) was used instead of the composite structural material (A1). The resultant composite structural material (B24) was subjected to evaluation of the oxygen barrier properties before and after retorting and the water vapor barrier properties before and after retorting by the above-mentioned method.

Example 25

In Example 25, a coating liquid (U25) prepared in the same manner as the coating liquid (U11) obtained in Example 11 was used.

A composite structural material (A25) having a structure of Layer (Y25) (0.5 μm)/ONY (15 μm) was obtained in the same manner as in Example 1, except that the coating liquid (U25) was used instead of the coating liquid (U1) and a stretched nylon film was used as the base instead of PET. As the stretched nylon film, a stretched nylon film manufactured by Unitika Ltd. ("Emblem ON-BC" (product name), with a thickness of 15 μm, which may hereinafter be abbreviated as "ONY") was used. The resultant composite structural material (A25) was subjected to measurement or evaluation of the infrared absorption spectrum of the layer (Y25) (layer (Y)) and the appearance of the composite structural material by the above-mentioned method.

Subsequently, a composite structural material (B25) having a structure of Layer (Y25)/ONY/Adhesive/CPP was obtained in the same manner as in Example 1, except that the composite structural material (A25) was used instead of the composite structural material (A1). The resultant composite structural material (B25) was subjected to evaluation of the oxygen barrier properties before and after retorting and the water vapor barrier properties before and after retorting by the above-mentioned method.

Example 26

In Example 26, a coating liquid (U26) prepared in the same manner as the coating liquid (U11) obtained in Example 11 was used.

A composite structural material (A26) having a structure of Layer (Y26) (0.5 μm)/ONY (15 μm)/Layer (Y26) (0.5 μm) was obtained in the same manner as in Example 25, except that the coating liquid (U26) was used instead of the coating liquid (U25) and the method for forming the layer (Y) was different. In Example 26, the layer (Y26) was formed on each of both sides of the base. Specifically, one surface of the base was first coated with the coating liquid (U26), followed by drying at 100° C. for 5 minutes, and thereafter the other surface of the base was coated with the coating liquid (U26), followed by drying at 100° C. for 5 minutes. Thus, a precursor layer of the layer (Y26) was formed on each of both sides of the base. Thereafter, heat treatment was performed at 180° C. for one minute using a dryer, thereby allowing the layer (Y26) with a thickness of 0.5 μm to be formed on each of both sides of the base.

The resultant composite structural material (A26) was subjected to measurement or evaluation of the infrared absorption spectrum of the layer (Y26) (layer (Y)) on one side and the appearance of the composite structural material by the above-mentioned method.

Subsequently, a composite structural material (B26) having a structure of Layer (Y26)/ONY/Layer (Y26)/Adhesive/CPP was obtained in the same manner as in Example 1, except that the composite structural material (A26) was used instead of the composite structural material (A1). The resultant composite structural material (B26) was subjected to evaluation of the oxygen barrier properties before and after retorting and the water vapor barrier properties before and after retorting by the above-mentioned method.

Example 27

In Example 27, a coating liquid (U27) prepared in the same manner as the coating liquid (U11) obtained in Example 11 was used.

A composite structural material (A27) having a structure of Layer (Y27) (0.5 μm)/Silica deposited PET (12 μm) was obtained in the same manner as in Example 1, except that the coating liquid (U27) was used instead of the coating liquid (U1), and a silica deposited PET film (thickness 12 μm) was used as the base instead of PET. The resultant composite structural material (A27) was subjected to measurement or evaluation of the infrared absorption spectrum of the layer (Y27) (layer (Y)) and the appearance of the composite structural material by the above-mentioned method.

Subsequently, a composite structural material (B27) having a structure of Silica deposited PET/Layer (Y27)/Adhesive/CPP was obtained in the same manner as in Example 23, except that the composite structural material (A27) was used instead of the composite structural material (A23). The resultant composite structural material (B27) was subjected to evaluation of the oxygen barrier properties before and after retorting and the water vapor barrier properties before and after retorting by the above-mentioned method.

Example 28

In Example 28, a coating liquid (U28) prepared in the same manner as the coating liquid (U11) obtained in Example 11 was used.

A composite structural material (A28) having a structure of Layer (Y28) (0.5 μm)/Alumina deposited PET (12 μm) was obtained in the same manner as in Example 1, except that the coating liquid (U28) was used instead of the coating liquid (U1), and an alumina deposited PET film (thickness 12 μm) was used as the base instead of PET. The resultant composite structural material (A28) was subjected to measurement or evaluation of the infrared absorption spectrum of the layer (Y28) (layer (Y)) and the appearance of the composite structural material by the above-mentioned method.

Subsequently, a composite structural material (B28) having a structure of Alumina deposited PET/Layer (Y28)/Adhesive/CPP was obtained in the same manner as in Example 23, except that the composite structural material (A28) was used instead of the composite structural material (A23). The resultant composite structural material (B28) was subjected to evaluation of the oxygen barrier properties before and after retorting and the water vapor barrier properties before and after retorting by the above-mentioned method.

Example 29

Using a pressure-resistant container, 230 parts by mass of distilled water was heated to 75° C. under stirring. 88 parts by mass of aluminum isopropoxide was added dropwise to the distilled water over 1 hour, and then the liquid temperature was gradually raised to 95° C. so that the generated isopropanol was distilled off. Thus, hydrolysis condensation was performed. Subsequently, 2.6 parts by mass of acetic acid was added thereto, which was peptized by stirring at 140° C. for 4 hours. The resultant dispersion was concentrated to a solid content concentration of 10 mass % calculated in terms of alumina. Thus, a dispersion (S29) was obtained.

Meanwhile, 51.67 parts by mass of distilled water, 19.00 parts by mass of methanol, and 1.39 parts by mass of trifluoroacetic acid were added to 2.94 parts by mass of a 85-mass % phosphoric acid aqueous solution, which was stirred to be homogeneous. Thus, a solution (T29) was obtained. Subsequently, while the solution (T29) was stirred, 25.00 parts by mass of the dispersion (S29) was added dropwise thereto, which was further stirred for 30 minutes continuously after the completion of the addition. Thus, a coating liquid (U29) was obtained.

A composite structural material (A29) having a structure of Layer (Y29) (0.5 μm)/PET (12 μm) was obtained in the same manner as in Example 1, except that the coating liquid (U29) was used instead of the coating liquid (U1). The resultant composite structural material (A29) was subjected to measurement or evaluation of the infrared absorption spectrum of the layer (Y29) (layer (Y)) and the appearance of the composite structural material by the above-mentioned method.

Subsequently, a composite structural material (B29) having a structure of Layer (Y29)/PET/Adhesive/CPP was obtained in the same manner as in Example 1, except that the composite structural material (A29) was used instead of the composite structural material (A1). The resultant composite structural material (B29) was subjected to evaluation of the oxygen barrier properties before and after retorting and the water vapor barrier properties before and after retorting by the above-mentioned method.

Example 30

In Example 30, a dispersion (S30) prepared in the same manner as the dispersion (S29) obtained in Example 29 was used.

Meanwhile, 51.56 parts by mass of distilled water, 1.50 parts by mass of a 60-mass % nitric acid aqueous solution, and 19.00 parts by mass of methanol were added to 2.94 parts by mass of a 85-mass % phosphoric acid aqueous solution, which was stirred to be homogeneous. Thus, a solution (T30) was obtained. Subsequently, while the solution (T30) was stirred, 25.00 parts by mass of the dispersion (S30) was added dropwise thereto, which was further stirred for 30 minutes continuously after the completion of the addition. Thus, a coating liquid (U30) was obtained.

A composite structural material (A30) having a structure of Layer (Y30) (0.5 μm)/PET (12 μm) was obtained in the same manner as in Example 1, except that the coating liquid (U30) was used instead of the coating liquid (U1). The resultant composite structural material (A30) was subjected to measurement or evaluation of the infrared absorption spectrum of the layer (Y30) (layer (Y)) and the appearance of the composite structural material by the above-mentioned method.

Subsequently, a composite structural material (B30) having a structure of Layer (Y30)/PET/Adhesive/CPP was obtained in the same manner as in Example 1, except that the composite structural material (A30) was used instead of the composite structural material (A1). The resultant composite structural material (B30) was subjected to evaluation of the oxygen barrier properties before and after retorting and the water vapor barrier properties before and after retorting by the above-mentioned method.

Example 31

0.28 part by mass of a 60-mass % nitric acid aqueous solution was added to 90 parts by mass of distilled water, which was heated to 75° C. under stirring. 20 parts by mass of aluminum isopropoxide was added dropwise to the obtained aqueous solution over 1 hour, and then the liquid temperature was gradually raised to 95° C. so that the generated isopropanol was distilled off. Thus, hydrolysis condensation was performed. Subsequently, 2.2 parts by mass of a 60-mass % nitric acid aqueous solution was added thereto, which was peptized by stirring at 95° C. for 1 hour. The resultant dispersion was diluted to a solid content concentration of 10 mass % calculated in terms of alumina. Thus, a dispersion (S31) was obtained.

Meanwhile, 57.07 parts by mass of distilled water, 1.50 parts by mass of a 60-mass % nitric acid aqueous solution, and 19.00 parts by mass of methanol were added to 3.68 parts by mass of a 85-mass % phosphoric acid aqueous solution, which was stirred to be homogeneous. Thus, a solution (T31) was obtained. Subsequently, while the solution (T31) was stirred, 18.75 parts by mass of the dispersion (S31) was added dropwise thereto, which was further stirred for 30 minutes continuously after the completion of the addition. Thus, a coating liquid (U31) was obtained.

A composite structural material (A31) having a structure of Layer (Y31) (0.5 μm)/PET (12 μm) was obtained in the same manner as in Example 1, except that the coating liquid (U31) was used instead of the coating liquid (U1). The resultant composite structural material (A31) was subjected to measurement or evaluation of the infrared absorption spectrum of the layer (Y31) (layer (Y)) and the appearance of the composite structural material by the above-mentioned method.

Subsequently, a composite structural material (B31) having a structure of Layer (Y31)/PET/Adhesive/CPP was obtained in the same manner as in Example 1, except that the composite structural material (A31) was used instead of the composite structural material (A1). The resultant composite structural material (B31) was subjected to evaluation of the oxygen barrier properties before and after retorting and the water vapor barrier properties before and after retorting by the above-mentioned method.

Example 32

In Example 32, a dispersion (S32) prepared in the same manner as the dispersion (S1) obtained in Example 1 was used.

Meanwhile, 45.75 parts by mass of distilled water, 10.34 parts by mass of aluminum nitrate 9-hydrate, 19.00 parts by mass of methanol, and 1.39 parts by mass of trifluoroacetic acid were added to 3.53 parts by mass of a 85-mass % phosphoric acid aqueous solution, which was stirred to be homogeneous. Thus, a solution (T32) was obtained. Here, the ratio of (The number of moles of metal atom)/(The number of moles of phosphorus atom) in the solution (T32) was 0.9. Subsequently, while the solution (T32) was stirred, 20.00 parts by mass of the dispersion (S32) was added dropwise thereto, which was further stirred for 30 minutes continuously after the completion of the addition. Thus, a coating liquid (U32) was obtained.

A composite structural material (A32) having a structure of Layer (Y32) (0.5 μm)/PET (12 μm) was obtained in the same manner as in Example 1, except that the coating liquid (U32) was used instead of the coating liquid (U1). The resultant composite structural material (A32) was subjected to measurement or evaluation of the infrared absorption spectrum of the layer (Y32) (layer (Y)) and the appearance of the composite structural material by the above-mentioned method.

Subsequently, a composite structural material (B32) having a structure of Layer (Y32)/PET/Adhesive/CPP was obtained in the same manner as in Example 1, except that the composite structural material (A32) was used instead of the composite structural material (A1). The resultant composite structural material (B32) was subjected to evaluation of the oxygen barrier properties before and after retorting and the water vapor barrier properties before and after retorting by the above-mentioned method.

Comparative Example 1

In Comparative in Example 1, a dispersion (SC1) prepared in the same manner as the dispersion (S1) obtained in Example 1 was used.

Meanwhile, 29.61 parts by mass of distilled water, 19.00 parts by mass of methanol, and 1.39 parts by mass of trifluoroacetic acid were added, which was stirred to be homogeneous. Thus, a solution (TC1) was obtained. Subsequently, while the solution (TC1) was stirred, 50.00 parts by mass of the dispersion (SC1) was added dropwise thereto, which was further stirred for 30 minutes continuously after the completion of the addition. Thus, a coating liquid (UC1) was obtained.

A composite structural material (AC1) having a structure of Layer (YC1) (0.5 μm)/PET (12 μm) was obtained in the same manner as in Example 1, except that the coating liquid (UC1) was used instead of the coating liquid (U1). The resultant composite structural material (AC1) was subjected to measurement or evaluation of the infrared absorption spectrum of the layer (YC1) (layer (Y')) and the appearance of the composite structural material by the above-mentioned method.

Subsequently, a composite structural material (BC1) having a structure of Layer (YC1)/PET/Adhesive/CPP was obtained in the same manner as in Example 1, except that the composite structural material (AC1) was used instead of the composite structural material (A1). The resultant composite structural material (BC1) was subjected to evaluation of the oxygen barrier properties before and after retorting and the water vapor barrier properties before and after retorting by the above-mentioned method.

Comparative Example 2

73.73 parts by mass of distilled water, 19.00 parts by mass of methanol, and 1.39 parts by mass of trifluoroacetic acid were added to 5.88 parts by mass of a 85-mass % phosphoric acid aqueous solution, which was stirred to be homogeneous. Thus, a coating liquid (UC2) was obtained.

Subsequently, the coating liquid (UC2) was applied onto PET using a bar coater to a thickness of 0.5 μm after drying. However, the coating liquid (UC2) was repelled due to poor wettability of the coating liquid (UC2), and thus it was impossible to obtain a continuous layer.

Comparative Example 3

In Comparative Example 3, a coating liquid (UC3) prepared in the same manner as the coating liquid (U5) obtained in Example 5 was used.

A composite structural material (AC3) having a structure of Layer (YC3) (0.5 μm)/PET (12 μm) was obtained in the same manner as in Example 1, except that the coating liquid (UC3) was used instead of the coating liquid (U1) and heat treatment was not performed. The resultant composite structural material (AC3) was subjected to measurement or evaluation of the infrared absorption spectrum of the layer (YC3) (layer (Y')) and the appearance of the composite structural material by the above-mentioned method.

Subsequently, a composite structural material (BC3) having a structure of Layer (YC3)/PET/Adhesive/CPP was obtained in the same manner as in Example 1, except that the composite structural material (AC3) was used instead of the composite structural material (A1). The resultant composite structural material (BC3) was subjected to evaluation of the oxygen barrier properties before and after retorting and the water vapor barrier properties before and after retorting by the above-mentioned method.

Comparative Example 4

In Comparative Example 4, a coating liquid (UC4) prepared in the same manner as the coating liquid (U5) obtained in Example 5 was used.

A composite structural material (AC4) having a structure of Layer (YC4) (0.5 μm)/PET (12 μm) was obtained in the same manner as in Example 1, except that the coating liquid (UC4) was used instead of the coating liquid (U1), and the temperature and duration of heat treatment were changed respectively from 180° C. and one minute to 80° C. and five minutes. The resultant composite structural material (AC4) was subjected to measurement or evaluation of the infrared absorption spectrum of the layer (YC4) (layer (Y')) and the appearance of the composite structural material by the above-mentioned method.

Subsequently, a composite structural material (BC4) having a structure of Layer (YC4)/PET/Adhesive/CPP was obtained in the same manner as in Example 1, except that the composite structural material (AC4) was used instead of the composite structural material (A1). The resultant composite structural material (BC4) was subjected to evaluation of the oxygen barrier properties before and after retorting and the water vapor barrier properties before and after retorting by the above-mentioned method.

Comparative Example 5

48.51 parts by mass of distilled water was added to 51.49 parts by mass of aluminum nitrate 9-hydrate, which was dissolved. Thus, a solution (SC5) was obtained. In the solution (SC5), aluminum atoms are present as aluminum ions, and do not form alumina particles.

Meanwhile, 47.51 parts by mass of distilled water, 19.00 parts by mass of methanol, and 1.39 parts by mass of trifluoroacetic acid were added to 3.53 parts by mass of a 85-mass % phosphoric acid aqueous solution, which was stirred to be homogeneous. Thus, a solution (TC5) was obtained. Subsequently, while the solution (TC5) was stirred, 28.57 parts by mass of the solution (SC5) was added dropwise thereto, which was further stirred for 30 minutes continuously after the completion of the addition. Thus, a coating liquid (UC5) was obtained.

Subsequently, the coating liquid (UC5) was applied onto PET using a bar coater to a thickness of 0.5 μm after drying. However, the coating liquid (UC5) was repelled due to poor wettability of the coating liquid (UC5), and thus it was impossible to obtain a continuous layer.

Comparative Example 6

2.10 parts by mass of isopropanol was added to 9.66 parts by mass of aluminum tri-s-butoxide. Thus, a solution (SC6) was obtained. In the solution (SC6), alumina particles were not formed.

Meanwhile, 18.92 parts by mass of distilled water, 9.50 parts by mass of methanol, and 1.39 parts by mass of trifluoroacetic acid were added to 3.53 parts by mass of a 85-mass % phosphoric acid aqueous solution, which was stirred to be homogeneous. Thus, a solution (TC6) was obtained. Subsequently, 11.76 parts by mass of the solution (SC6), 4.47 parts by mass of trifluoroacetic acid, 10.51 parts by mass of methanol, 39.92 parts by mass of distilled water, and 33.34 parts by mass of the solution (TC6) were mixed, which was further stirred for 30 minutes continuously after the mixing. Thus, a coating liquid (UC6) was obtained.

A composite structural material (AC6) having a structure of Layer (YC6) (0.5 μm)/PET (12 μm) was obtained in the same manner as in Example 1, except that the coating liquid (UC6) was used instead of the coating liquid (U1). The resultant composite structural material (AC6) was subjected to measurement or evaluation of the infrared absorption spectrum of the layer (YC6) (layer (Y')) and the appearance of the composite structural material by the above-mentioned method.

Subsequently, a composite structural material (BC6) having a structure of Layer (YC6)/PET/Adhesive/CPP was obtained in the same manner as in Example 1, except that the composite structural material (AC6) was used instead of the composite structural material (A1). The resultant composite structural material (BC6) was subjected to evaluation of the oxygen barrier properties before and after retorting and the water vapor barrier properties before and after retorting by the above-mentioned method.

Comparative Example 7

In Comparative Example 7, a dispersion (SC7) prepared in the same manner as the dispersion (S1) obtained in Example 1 was used.

Meanwhile, 43.45 parts by mass of distilled water, 12.63 parts by mass of aluminum nitrate 9-hydrate, 19.00 parts by mass of methanol, and 1.39 parts by mass of trifluoroacetic acid were added to 3.53 parts by mass of a 85-mass % phosphoric acid aqueous solution, which was stirred to be homogeneous. Thus, a solution (TC7) was obtained. Here, the ratio of (The number of moles of metal atom)/(The number of moles of phosphorus atom) in the solution (TC7) was 1.1. Subsequently, while the solution (TC7) was stirred, 20.00 parts by mass of the dispersion (SC7) was added dropwise thereto, which was further stirred for 30 minutes continuously after the completion of the addition. Thus, a coating liquid (UC7) was obtained.

A composite structural material (AC7) having a structure of Layer (YC7) (0.5 μm)/PET (12 μm) was obtained in the same manner as in Example 1, except that the coating liquid (UC7) was used instead of the coating liquid (U1). The resultant composite structural material (AC7) was subjected to measurement or evaluation of the infrared absorption spectrum of the layer (YC7) (layer (Y)) and the appearance of the composite structural material by the above-mentioned method.

Subsequently, a composite structural material (BC7) having a structure of Layer (YC7)/PET/Adhesive/CPP was obtained in the same manner as in Example 1, except that the composite structural material (AC7) was used instead of the composite structural material (A1). The resultant composite structural material (BC7) was subjected to evaluation of the oxygen barrier properties before and after retorting and the water vapor barrier properties before and after retorting by the above-mentioned method.

Table 1 shows production conditions for the aforementioned examples and comparative examples. Table 2 and Table 3 show the results of measurement and evaluation.

TABLE 1

| | | Liquid (S) | | Solution (T) | | | | Heat treatment | |
| | Base (X) | Compound (L) | Used acid | Phosphorus compound (B) | Polymer (C) | Acid compound (D) | $N_M/N_P$ | Temperature (°C.) | Time (min) |
|---|---|---|---|---|---|---|---|---|---|
| EX. 1 | PET | Al(O—iPr)$_3$ | Nitric acid | Phosphoric acid | — | TFA | 4.48 | 180 | 1 |
| EX. 2 | PET | Al(O—iPr)$_3$ | Nitric acid | Phosphoric acid | — | TFA | 3.57 | 180 | 1 |
| EX. 3 | PET | Al(O—iPr)$_3$ | Nitric acid | Phosphoric acid | — | TFA | 2.89 | 180 | 1 |
| EX. 4 | PET | Al(O—iPr)$_3$ | Nitric acid | Phosphoric acid | — | TFA | 1.92 | 180 | 1 |
| EX. 5 | PET | Al(O—iPr)$_3$ | Nitric acid | Phosphoric acid | — | TFA | 1.28 | 180 | 1 |
| EX. 6 | PET | Al(O—iPr)$_3$ | Nitric acid | Phosphoric acid | — | TFA | 1.04 | 180 | 1 |
| EX. 7 | PET | Al(O—iPr)$_3$ | Nitric acid | Phosphoric acid | — | TFA | 0.82 | 180 | 1 |
| EX. 8 | PET | Al(O—iPr)$_3$ | Nitric acid | Phosphoric acid | — | TFA | 1.28 | 120 | 5 |
| EX. 9 | PET | Al(O—iPr)$_3$ | Nitric acid | Phosphoric acid | — | TFA | 1.28 | 150 | 1 |
| EX. 10 | PET | Al(O—iPr)$_3$ | Nitric acid | Phosphoric acid | — | TFA | 1.28 | 200 | 1 |
| EX. 11 | PET | Al(O—iPr)$_3$ | Nitric acid | Phosphoric acid | — | Nitric acid | 1.15 | 180 | 1 |
| EX. 12 | PET | Al(O—iPr)$_3$ | Nitric acid | Phosphoric acid | — | Hydrochloric acid | 1.15 | 180 | 1 |
| EX. 13 | PET | Al(O—iPr)$_3$ | Nitric acid | Phosphoric acid | — | — | 1.28 | 180 | 1 |
| EX. 14 | PET | Al(O—iPr)$_3$ | Nitric acid | Phosphoric acid | — | — | 1.28 | 180 | 1 |
| EX. 15 | PET | Al(O—iPr)$_3$ | Nitric acid | Phosphoric acid | Starch | TFA | 1.28 | 180 | 1 |
| EX. 16 | PET | Al(O—iPr)$_3$ | Nitric acid | Phosphoric acid | PVA | TFA | 1.28 | 180 | 1 |
| EX. 17 | PET | Al(O—iPr)$_3$ | Nitric acid | Phosphoric acid | PAA | TFA | 1.28 | 180 | 1 |

TABLE 1-continued

| | | Liquid (S) | | Solution (T) | | | Heat treatment | |
| | Base (X) | Compound (L) | Used acid | Phosphorus compound (B) | Polymer (C) | Acid compound (D) | $N_M/N_P$ | Temperature (°C.) | Time (min) |
|---|---|---|---|---|---|---|---|---|---|
| EX. 18 | PET | Al(O—iPr)$_3$ | Nitric acid | (Combination use-1) | — | TFA | 1.28 | 180 | 1 |
| EX. 19 | PET | Al(O—iPr)$_3$ | Nitric acid | (Combination use-2) | — | TFA | 1.28 | 180 | 1 |
| EX. 20 | PET | Al(O—iPr)$_3$ | Nitric acid | Trimethyl phosphate | — | TFA | 1.28 | 180 | 1 |
| EX. 21 | PET | Al(O—iPr)$_3$ | Nitric acid | phosphonic acid | — | TFA | 1.92 | 180 | 1 |
| EX. 22 | PET | Al(O—iPr)$_3$ | Nitric acid | (Combination use-3) | — | TFA | 1.92 | 180 | 1 |
| EX. 23 | PET | Al(O—iPr)$_3$ | Nitric acid | Phosphoric acid | — | Nitric acid | 1.15 | 180 | 1 |
| EX. 24 | PET | Al(O—iPr)$_3$ | Nitric acid | Phosphoric acid | — | Nitric acid | 1.15 | 180 | 1 |
| EX. 25 | ONY | Al(O—iPr)$_3$ | Nitric acid | Phosphoric acid | — | Nitric acid | 1.15 | 180 | 1 |
| EX. 26 | ONY | Al(O—iPr)$_3$ | Nitric acid | Phosphoric acid | — | Nitric acid | 1.15 | 180 | 1 |
| EX. 27 | (Deposited PET-1) | Al(O—iPr)$_3$ | Nitric acid | Phosphoric acid | — | Nitric acid | 1.15 | 180 | 1 |
| EX. 28 | (Deposited PET-2) | Al(O—iPr)$_3$ | Nitric acid | Phosphoric acid | — | Nitric acid | 1.15 | 180 | 1 |
| EX. 29 | PET | Al(O—iPr)$_3$ | Acetic acid | Phosphoric acid | — | TFA | 1.92 | 180 | 1 |
| EX. 30 | PET | Al(O—iPr)$_3$ | Acetic acid | Phosphoric acid | — | Nitric acid | 1.92 | 180 | 1 |
| EX. 31 | PET | Al(O—iPr)$_3$ | Nitric acid | Phosphoric acid | — | Nitric acid | 1.15 | 180 | 1 |
| EX. 32 | PET | Al(O—iPr)$_3$ | Nitric acid | Phosphoric acid (*1) | — | TFA | 1.28 | 180 | 1 |
| C. EX. 1 | PET | Al(O—iPr)$_3$ | Nitric acid | — | — | TFA | — | 180 | 1 |
| C. EX. 2 | PET | — | — | Phosphoric acid | — | TFA | 0.00 | — | — |
| C. EX. 3 | PET | Al(O—iPr)$_3$ | Nitric acid | Phosphoric acid | — | TFA | 1.28 | — | — |
| C. EX. 4 | PET | Al(O—iPr)$_3$ | Nitric acid | Phosphoric acid | — | TFA | 1.28 | 80 | 5 |
| C. EX. 5 | PET | Al(NO$_3$)$_3$ | — | Phosphoric acid | — | TFA | 1.28 | — | — |
| C. EX. 6 | PET | Al(O—sBu)$_3$ | — | Phosphoric acid | — | TFA | 1.28 | 180 | 1 |
| C. EX. 7 | PET | Al(O—iPr)$_3$ | Nitric acid | Phosphoric acid (*2) | — | TFA | 1.28 | 180 | 1 |

[Abbreviation in the table]
PVA: Polyvinyl alcohol
PAA: Polyacrylic acid
TFA: Trifluoroacetic acid
$N_M/N_P$: Ratio of the number of moles ($N_M$) of metal atom in the metal oxide (A) and the number of moles ($N_P$) of phosphorus atom derived from the phosphorus compound (B)
(Deposited PET-1): Silica deposited PET film
(Deposited PET-2): Alumina deposited PET film
(Combination use-1): Combination use of phosphoric acid and nitrilotris (methylenephosphonic acid)
(Combination use-2): Combination use of phosphoric acid and N,N,N',N'-ethylenediaminetetrakis (methylenephosphonic acid)
(Combination use-3): Combination use of phosphoric acid and phosphonic acid
(*1): The ratio of (The number of moles of metal atom)/(The number of moles of phosphorus atom) in the solution (T) containing phosphoric acid was 0.9.
(*2): P The ratio of (The number of moles of metal atom)/(The number of moles of phosphorus atom) in the solution (T) containing phosphoric acid was 1.1.

TABLE 2

| | Layer structure of composite structural material(*1) | Infrared absorption spectrum | | | |
|---|---|---|---|---|---|
| | | $n^1$ (cm$^{-1}$) | Half width (cm$^{-1}$) | $A^2/A^1$ | Appearance |
| EX. 1 | Layer (Y)/PET | 1122 | 140 | 0.29 | S |
| EX. 2 | Layer (Y)/PET | 1116 | 115 | 0.22 | S |
| EX. 3 | Layer (Y)/PET | 1109 | 70 | 0.16 | S |
| EX. 4 | Layer (Y)/PET | 1102 | 43 | <0.1 | S |
| EX. 5 | Layer (Y)/PET | 1107 | 38 | <0.1 | S |
| EX. 6 | Layer (Y)/PET | 1111 | 35 | <0.1 | S |
| EX. 7 | Layer (Y)/PET | 1113 | 30 | <0.1 | S |
| EX. 8 | Layer (Y)/PET | 1110 | 60 | <0.1 | S |
| EX. 9 | Layer (Y)/PET | 1108 | 44 | <0.1 | S |
| EX. 10 | Layer (Y)/PET | 1107 | 35 | <0.1 | S |
| EX. 11 | Layer (Y)/PET | 1109 | 37 | <0.1 | S |
| EX. 12 | Layer (Y)/PET | 1109 | 38 | <0.1 | S |
| EX. 13 | Layer (Y)/PET | 1110 | 37 | <0.1 | S |
| EX. 14 | Layer (Y)/PET | 1109 | 38 | <0.1 | A |
| EX. 15 | Layer (Y)/PET | 1119 | 51 | <0.1 | S |
| EX. 16 | Layer (Y)/PET | 1118 | 59 | <0.1 | S |
| EX. 17 | Layer (Y)/PET | 1118 | 55 | <0.1 | S |
| EX. 18 | Layer (Y)/PET | 1097 | 59 | <0.1 | S |

TABLE 2-continued

| | Layer structure of composite structural material(*1) | n¹ (cm⁻¹) | Half width (cm⁻¹) | A²/A¹ | Appearance |
|---|---|---|---|---|---|
| EX. 19 | Layer (Y)/PET | 1096 | 60 | <0.1 | S |
| EX. 20 | Layer (Y)/PET | 1107 | 40 | <0.1 | S |
| EX. 21 | Layer (Y)/PET | 1112 | 73 | <0.1 | S |
| EX. 22 | Layer (Y)/PET | 1109 | 52 | <0.1 | S |
| EX. 23 | Layer (Y)/PET | 1107 | 38 | <0.1 | S |
| EX. 24 | Layer (Y)/PET/Layer (Y) | 1107 | 38 | <0.1 | S |
| EX. 25 | Layer (Y)/ONY | 1108 | 40 | <0.1 | S |
| EX. 26 | Layer (Y)/ONY/Layer (Y) | 1108 | 40 | <0.1 | S |
| EX. 27 | Layer (Y)/Deposited PET-1 | 1109 | 37 | <0.1 | S |
| EX. 28 | Layer (Y)/Deposited PET-2 | 1109 | 37 | <0.1 | S |
| EX. 29 | Layer (Y)/PET | 1092 | 40 | <0.1 | S |
| EX. 30 | Layer (Y)/PET | 1099 | 37 | <0.1 | S |
| EX. 31 | Layer (Y)/PET | 1110 | 36 | <0.1 | S |
| EX. 32 | Layer (Y)/PET | 1082 | 228 | 0.33 | A |
| C. EX. 1 | Layer (Y')/PET | 1065 | — | — | S |
| C. EX. 2 | — | — | — | — | B |
| C. EX. 3 | Layer (Y')/PET | 1067 | — | 0.33(*2) | S |
| C. EX. 4 | Layer (Y')/PET | 1068 | — | 0.29(*2) | S |
| C. EX. 5 | — | — | — | — | B |
| C. EX. 6 | Layer (Y')/PET | 1145 | — | — | A |
| C. EX. 7 | Layer (Y')/PET | 1076 | — | — | A |

[Abbreviation in the table]
n¹: Maximum absorption wave number (n¹)
A²/A¹: Absorbance (A²)/Absorbance (A¹)
(*1)Composite structural material after being subjected to measurement of infrared absorption spectrum and evaluation of appearance
(*2)Absorbance (A2')/Absorbance (A1') attributed to the infrared absorption spectrum of the precursor layer of the layer (Y)
Deposited PET-1: Silica deposited PET film
Deposited PET-2: Alumina deposited PET film

TABLE 3

| | Layer structure of composite structural material(*2) | Oxygen transmission rate ml/(m² · day · atm) | | Moisture transmission rate g/(m² · day) | |
|---|---|---|---|---|---|
| | | Before retorting | After retorting | Before retorting | After retorting |
| EX. 1 | Layer (Y)/PET // CPP | 0.96 | 1.56 | 2.7 | 6.0 |
| EX. 2 | Layer (Y)/PET // CPP | 0.51 | 0.99 | 1.8 | 3.8 |
| EX. 3 | Layer (Y)/PET // CPP | 0.25 | 0.29 | 0.5 | 1.0 |
| EX. 4 | Layer (Y)/PET // CPP | 0.22 | 0.28 | 0.3 | 0.4 |
| EX. 5 | Layer (Y)/PET // CPP | 0.20 | 0.21 | 0.2 | 0.2 |
| EX. 6 | Layer (Y)/PET // CPP | 0.43 | 0.54 | 0.6 | 1.3 |
| EX. 7 | Layer (Y)/PET // CPP | 0.77 | 1.06 | 1.4 | 3.1 |
| EX. 8 | Layer (Y)/PET // CPP | 0.58 | 0.97 | 0.5 | 0.9 |
| EX. 9 | Layer (Y)/PET // CPP | 0.34 | 0.45 | 0.3 | 0.3 |
| EX. 10 | Layer (Y)/PET // CPP | 0.19 | 0.19 | 0.2 | 0.2 |
| EX. 11 | Layer (Y)/PET // CPP | 0.20 | 0.20 | 0.2 | 0.2 |
| EX. 12 | Layer (Y)/PET // CPP | 0.20 | 0.21 | 0.2 | 0.2 |
| EX. 13 | Layer (Y)/PET // CPP | 0.25 | 0.28 | 0.2 | 0.3 |
| EX. 14 | Layer (Y)/PET // CPP | 0.32 | 0.40 | 0.2 | 0.3 |
| EX. 15 | Layer (Y)/PET // CPP | 0.22 | 0.24 | 0.2 | 0.3 |
| EX. 16 | Layer (Y)/PET // CPP | 0.21 | 0.22 | 0.2 | 0.3 |
| EX. 17 | Layer (Y)/PET // CPP | 0.23 | 0.25 | 0.2 | 0.3 |
| EX. 18 | Layer (Y)/PET // CPP | 0.23 | 0.24 | 0.2 | 0.2 |
| EX. 19 | Layer (Y)/PET // CPP | 0.22 | 0.24 | 0.2 | 0.3 |
| EX. 20 | Layer (Y)/PET // CPP | 0.21 | 0.23 | 0.2 | 0.2 |
| EX. 21 | Layer (Y)/PET // CPP | 0.46 | 0.70 | 0.7 | 1.1 |
| EX. 22 | Layer (Y)/PET // CPP | 0.32 | 0.41 | 0.3 | 0.5 |
| EX. 23 | PET/Layer (Y) // CPP | 0.20 | 0.21 | 0.2 | 0.2 |
| EX. 24 | Layer (Y)/PET/Layer (Y) // CPP | 0.07 | 0.08 | <0.1 | <0.1 |
| EX. 25 | Layer (Y)/ONY // CPP | 0.25 | 0.29 | 0.4 | 0.7 |
| EX. 26 | Layer (Y)/ONY/Layer (Y) // CPP | 0.10 | 0.16 | 0.2 | 0.3 |
| EX. 27 | Deposited PET/Layer (Y) // CPP | 0.08 | 0.08 | <0.1 | <0.1 |
| EX. 28 | Deposited PET/Layer (Y) // CPP | 0.08 | 0.09 | <0.1 | <0.1 |
| EX. 29 | Layer (Y)/PET // CPP | 0.22 | 0.40 | 0.3 | 0.5 |
| EX. 30 | Layer (Y)/PET // CPP | 0.21 | 0.37 | 0.3 | 0.5 |
| EX. 31 | Layer (Y)/PET // CPP | 0.20 | 0.21 | 0.2 | 0.2 |
| EX. 32 | Layer (Y)/PET // CPP | 5.51 | 8.97 | 3.5 | 6.5 |
| C. EX. 1 | Layer (Y')/PET // CPP | >50 | >50 | >7 | >7 |
| C. EX. 2 | — | — | — | — | — |
| C. EX. 3 | Layer (Y')/PET // CPP | >50 | >50 | >7 | >7 |
| C. EX. 4 | Layer (Y')/PET // CPP | >50 | >50 | >7 | >7 |
| C. EX. 5 | — | — | — | — | — |
| C. EX. 6 | Layer (Y')/PET // CPP | >50 | >50 | >7 | >7 |
| C. EX. 7 | Layer (Y')/PET // CPP | 27.45 | >50 | 5.6 | >7 |

(*2)Composite structural material after being subjected to measurements of oxygen transmission rate and moisture transmission rate
"//" in the table means an adhesive layer.

In Tables 1 to 3, the symbol "-" means "not used", "incalculable", "not performed", "immeasurable", or the like.

As obvious from Table 3, the composite structural materials of the examples showed excellent oxygen barrier properties and water vapor barrier properties not only before retorting but also after retorting. The composite structural materials of the examples also showed good appearance. The composite structural materials of Examples 3 to 6 showed higher oxygen barrier properties and water vapor barrier properties, compared to the composite structural materials of Examples 1, 2, and 7. The composite structural materials of the examples had the maximum absorption wave number ($n^1$) within the range of 1082 to 1122 $cm^{-1}$.

Example 33

In Example 33, a vertical form fill seal pouch was produced using the composite structural material of the present invention. First, a composite structural material (A11) was produced in the same manner as in Example 11. Next, the composite structural material (A11) coated with a two-component adhesive (A-520 (product name) and A-50 (product name), manufactured by MITSUI TAKEDA CHEMICALS INC.), followed by drying, was prepared. This was laminated with a stretched nylon film (the above-mentioned ONY). Thus, a layered product was obtained. Subsequently, the layered product in which the stretched nylon film was coated with a two-component adhesive agent (A-520 (product name) and A-50 (product name), manufactured by MITSUI TAKEDA CHEMICALS INC.), followed by drying, was prepared. Then, it was laminated with an unstretched polypropylene film (with a thickness of 70 μm, RXC-21 (product name), manufactured by TOHCELLO CO., LTD., which may hereinafter be abbreviated as "CPP70"). Thus, a composite structural material (C33) having a structure of PET/Layer (Y11)/Adhesive/ONY/Adhesive/CPP70 was obtained.

Next, the composite structural material (C33) was cut into a width of 400 mm, and fed into a vertical pouch form fill packaging machine (manufactured by ORIHIRO Co., Ltd.), so that a vertical form fill seal pouch (width: 160 mm, length: 470 mm) of fin seal type was produced. Next, 2 kg of water was charged into the vertical form fill seal pouch composed of the composite structural material (C33) using the pouch form fill packaging machine. The composite structural material (C33) showed good workability in the pouch form fill packaging machine, and no defects such as wrinkles and streaks were observed in the appearance of the obtained vertical form fill seal pouch.

Example 34

In Example 34, a vacuum packaging pouch was produced using the composite structural material of the present invention. First, a composite structural material (A11) was produced in the same manner as in Example 11. Next, a stretched nylon film (the above-mentioned ONY) coated with a two-component adhesive (A-520 (product name) and A-50 (product name), manufactured by MITSUI TAKEDA CHEMICALS INC.), followed by drying, was prepared. This was laminated with the composite structural material (A11). Next, the thus laminated composite structural material (A11) coated with a two-component adhesive (A-520 (product name) and A-50 (product name), manufactured by MITSUI TAKEDA CHEMICALS INC.), followed by drying, was prepared. This was laminated with an unstretched polypropylene film (the above-mentioned CPP70). Thus, a composite structural material (C34) having a structure of ONY/Adhesive/Layer (Y11)/PET/Adhesive/CPP70 was obtained.

Next, the composite structural material (C34) was cut out into two layered products in a rectangular shape of 22 cm×30 cm. Then, the two pieces of the composite structural material (C34) were stacked together so that each CPP70 served as the inner portion, and then three sides of the rectangle were heat-sealed to form a pouch. The pouch was filled with balls made of wood (diameter: 30 mm) as a model of solid foods in the state where the balls were in contact with each other and arranged in a single layer. Thereafter, the inside of the pouch was degassed to remove the air, followed by heat-sealing the last side. Thus, a vacuum packaging pouch was produced. In the obtained vacuum packaging medium, the composite structural material (C34) was closely in contact with the balls along their bumps.

Example 35

In Example 35, a pouch with a spout was produced using the composite structural material of the present invention. First, a composite structural material (C35) having a structure of PET/Layer (Y11)/Adhesive/ONY/Adhesive/CPP70 was obtained in the same manner as in Example 33. Next, two pieces of the composite structural material (C35) were cut out therefrom into a specific shape. Then, the two pieces of the composite structural material (C35) were stacked together so that each CPP70 served as the inner portion, and then the peripheral edges were heat-sealed. Further, a spout made of polypropylene was attached thereto by heat sealing. Thus, a flat pouch with a spout was produced without problems.

Example 36

In Example 36, a laminated tube container was produced using the composite structural material of the present invention. First, a composite structural material (A11) was produced in the same manner as in Example 11. Next, two unstretched polypropylene films (RXC-21 (product name), with a thickness of 100 μm, manufactured by TOHCELLO CO., LTD., which may hereinafter be abbreviated as "CPP100") each coated with a two-component adhesive (A-520 (product name) and A-50 (product name), manufactured by MITSUI TAKEDA CHEMICALS INC.), followed by drying, were prepared. These were laminated with the composite structural material (A11). Thus, a composite structural material (C36) having a structure of CPP100/Adhesive/Layer (Y11)/PET/Adhesive/CPP100 was obtained.

Next, the composite structural material (C36) was cut out into a specific shape, which thereafter was put into a tubular form and the overlapped portion was heat sealed. Thereby, a tubular body was produced. Next, the tubular body was mounted on a mandrel for forming tube containers, and a shoulder in the form of a circular truncated cone and a tip that was continuous from the shoulder were produced at one end of the tubular body. The shoulder and the tip were formed by compression molding of polypropylene resin. Then, a cap made of polypropylene resin was placed on the above-mentioned tip. Next, the other end, which was open, of the tubular body was heat-sealed. Thus, a laminated tube container was produced without problems.

Example 37

In Example 37, an infusion bag was produced using the composite structural material of the present invention. First, a composite structural material (C37) having a structure of PET/Layer (Y11)/Adhesive/ONY/Adhesive/CPP70 was obtained in the same manner as in Example 33. Next, two pieces of the composite structural material (C37) were cut out therefrom into a specific shape. Then, the two pieces of the composite structural material (C37) were stacked together so that each CPP70 served as the inner portion, and then the peripheral edges were heat-sealed. Further, a spout made of polypropylene was attached thereto by heat sealing. Thus, an infusion bag was produced without problems.

Example 38

In Example 38, a lidding film was produced using the composite structural material of the present invention. First, a composite structural material (C38) having a structure of PET/Layer (Y11)/Adhesive/ONY/Adhesive/CPP70 was obtained in the same manner as in Example 33. Next, the composite structural material (C38) was cut out into a circular shape with a diameter of 88 mm as a lidding film. A cylindrical container having a diameter of 78 mm, a flange width of 6.5 mm, and a height of 30 mm, and having a three-layer structure of Polyolefin layer/Steel layer/Polyolefin layer (Hi-Retroflex HR78-84, manufactured by TOYO SEIKAN KAISHA, LTD.) was prepared. This container was almost fully filled with water, and the lidding film made of the composite structural material (C38) was heat-sealed to the flange. Thus, a covered container using the lidding film was produced without problems.

Example 39

In Example 39, a paper container was produced using the composite structural material of the present invention. First, a composite structural material (A11) was produced in the same manner as in Example 11. Next, an adhesive was applied onto both surfaces of a 400 g/m² paperboard. Thereafter, a PP layer (with a thickness of 20 μm) was formed on each of both surfaces of the paperboard by extrusion lamination of polypropylene resin (which may be abbreviated as "PP") on both surfaces. Thereafter, an adhesive was applied onto one surface of the PP layer, which was then laminated with the composite structural material (A11). Further, an adhesive was applied onto the surface of the composite structural material (A11), which was then bonded with an unstretched polypropylene film (the above-mentioned CPP70). Thus, a composite structural material (C39) having a structure of PP/Paperboard/PP/Adhesive/Layer (Y11)/PET/Adhesive/CPP70 was produced. In producing the composite structural material (C39), a primer was used, as needed. Using the thus obtained composite structural material (C39), a paper container in the form of a brick was produced without problems.

Example 40

In Example 40, a vacuum insulator was produced using the composite structural material of the present invention. First, a composite structural material (C40) having a structure of ONY/Adhesive/Layer (Y11)/PET/Adhesive/CPP70 was obtained in the same manner as in Example 34. Next, two pieces of the composite structural material (C40) were cut out therefrom into a specific shape. Then, the two pieces of the composite structural material (C40) were stacked together so that each CPP70 served as the inner portion, and then three sides of the rectangle were heat-sealed to form a pouch. Next, a heat-insulating core material was charged through the opening portion of the pouch, and then the pouch was closed by sealing using a vacuum packaging machine (VAC-STAR 2500, manufactured by Frimark GmbH) at a temperature of 20° C. and an internal pressure of 10 Pa. Thus, a vacuum heat insulator was produced without problems. It should be noted that silica fine powder dried for 4 hours in an atmosphere of 120° C. was used as the heat-insulating core material.

INDUSTRIAL APPLICABILITY

The composite structural material of the present invention is excellent both in gas barrier properties and water vapor barrier properties, and can maintain both barrier properties at high levels even after retorting. The composite structural material of the present invention also has excellent appearance. Therefore, the composite structural material of the present invention can be used suitably as food packaging materials, chemicals, medical devices, industrial materials, clothes, etc. Above all, the composite structural material of the present invention can be used particularly preferably for forming food-packaging materials (particularly a packaging material for retort foods) that are required to have barrier properties against both oxygen and water vapor.

Meanwhile, examples of applications other than the packaging materials include electronic device-related films such as a substrate film for LCDs, a substrate film for organic EL devices, a substrate film for electronic paper, a sealing film for electronic devices, a film for PDPs, a film for LEDs, a film for IC tags, a backsheet for solar cells, and a protective film for solar cells, a member for optical communications, a flexible film for electronic equipment, a barrier membrane for fuel cells, a sealing film for fuel cells, and a substrate film for various functional films.

The invention claimed is:

1. A composite structural material, comprising:
    a base (X); and
    a layer (Y) stacked on the base (X),
    wherein the layer (Y) comprises a reaction product (R) obtained by a process comprising reacting a metal oxide (A) and a phosphorus compound (B),
    the phosphorus compound (B) is at least one selected from the group consisting of phosphoric acid, polyphosphoric acid, phosphorous acid, phosphonic acid represented by a formula $HP(=O)(OH)_2$, and a salt, a halide and a dehydrate thereof, and trimethyl phosphate, and
    in an infrared absorption spectrum of the layer (Y) in the range of 800 to 1400 $cm^{-1}$, a wave number ($n^1$) at which the infrared absorption reaches maximum is in the range of 1080 to 1130 $cm^{-1}$.

2. The composite structural material of claim 1, wherein
    in an infrared absorption spectrum of the layer (Y) in the range of 800 to 1400 $cm^{-1}$, an infrared absorption peak attributed to a bond expressed by M—O—P in which a metal atom (M) constituting the metal oxide (A) and a phosphorus atom (P) derived from the compound (B) are bonded via an oxygen atom (O) is the highest among all infrared absorption peaks attributed to a bond constituting the metal oxide (A), a bond constituting the phosphorus compound (B), and a bond formed by a reaction of the metal oxide (A) and the phosphorus compound (B) individually and/or with each other, and
    wherein a wave number ($n^1$) at which the infrared absorption peak reaches maximum is in the range of 1080 to 1130 $cm^{-1}$.

3. The composite structural material of claim 1, wherein the phosphorus compound (B) comprises a plurality of sites, which react with the metal oxide (A).

4. The composite structural material of claim 1, wherein an absorbance ($A^1$) at the wave number ($n^1$) and an absorbance ($A^2$) at a wave number ($n^2$) satisfy a relationship of $(A^2)/(A^1) \leq 0.2$ in the infrared absorption spectrum of the layer (Y), and wherein the wave number ($n^2$) is a wave number at which an infrared absorption due to a stretching vibration of hydroxyl group reaches maximum in the infrared absorption spectrum of the layer (Y) in the range of 2500 to 4000 $cm^{-1}$.

5. The composite structural material of claim 1, wherein a half width of the absorption peak at the wave number ($n^1$) is 200 $cm^{-1}$ or less.

6. The composite structural material according to claim 1, wherein the layer (Y) has a structure in which particles of the metal oxide (A) are bonded to each other via a phosphorus atom derived from the phosphorus compound (B), and wherein a number of moles of metal atom that bonds the particles to each other and that is not derived from the metal oxide (A) is in the range of 0 to 1 times a number of moles of phosphorus atom bonding the particles to each other.

7. The composite structural material of claim 1, wherein the metal oxide (A) is a hydrolyzed condensate of a compound (L) comprising the metal atom (M) to which a hydrolyzable characteristic group is bonded.

8. The composite structural material of claim 7, wherein the compound (L) comprises a compound ($L^1$) of formula (I):

wherein:

$M^1$ is Al, Ti, or Zr;

$X^1$ is F, Cl, Br, I, $R^2O-$, $R^3C(=O)O-$, $(R^4C(=O))_2CH-$, or $NO_3$;

$R^1$, $R^2$, $R^3$, and $R^4$ each are independently an alkyl group, an aralkyl group, an aryl group, or an alkenyl group;

in the case where a plurality of any of $X^1$, $R^1$, $R^2$, $R^3$, and $R^4$ are present in the formula (I), the plurality of $X^1$, $R^1$, $R^2$, $R^3$, and $R^4$ may be the same as or different from each other respectively;

n is equal to a valence of $M^1$; and m is an integer of 1 to n.

9. The composite structural material of claim 1, wherein the phosphorus compound (B) is at least one selected from the group consisting of phosphoric acid, polyphosphoric acid, phosphorous acid, phosphonic acid represented by a formula $HP(=O)(OH)_2$, and a salt, a halide, and a dehydrate thereof.

10. The composite structural material of claim 1, wherein, in the layer (Y), the number of moles ($N_M$) of the metal atom constituting the metal oxide (A) and the number of moles ($N_p$) of the phosphorus atom from the phosphorus compound (B) satisfy a relationship of:

$0.8 \leq (N_M)/(N_p) \leq 4.5$.

11. The composite structural material according to claim 1, wherein the layer (Y) further comprises a polymer (C) comprising at least one functional group (f) selected from the group consisting of a hydroxyl group, a carboxyl group, a carboxylic anhydride group, and a salt of a carboxyl group.

12. The composite structural material of claim 11, wherein the polymer (C) is at least one selected from the group consisting of polyvinyl alcohol, ethylene-vinyl alcohol copolymer, polysaccharides, polyacrylic acid, a salt of polyacrylic acid, polymethacrylic acid, and a salt of polymethacrylic acid.

13. The composite structural material of claim 1, wherein the base (X) is a layer base.

14. The composite structural material of claim 13, wherein the base (X) comprises at least one layer selected from the group consisting of a thermoplastic resin film layer, a paper layer, and an inorganic deposited layer.

15. The composite structural material of claim 1, having a moisture transmission rate under conditions of 40° C. and 90/0% RH of not more than 5 g/($m^2 \cdot$day).

16. The composite structural material of claim 1, having an oxygen transmission rate under conditions of 20° C. and 85% RH of not more than 1 ml/($m^2 \cdot$day$\cdot$atm).

17. The composite structural material of claim 1, wherein the moisture transmission rate under conditions of 40° C. and 90/0% RH after immersion in hot water of 120° C. for 30 minutes is not more than twice the moisture transmission rate under conditions of 40° C. and 90/0% RH before the immersion.

18. The composite structural material of claim 1, wherein the oxygen transmission rate under conditions of 20° C. and 85% RH after immersion in hot water of 120° C. for 30 minutes is not more than twice the oxygen transmission rate under conditions of 20° C. and 85% RH before the immersion.

19. A packaging material comprising the composite structural material of claim 1.

20. The packaging material of claim 19, being a packaging material for retort foods.

21. A formed product formed with the packaging material of claim 19.

22. The formed product of claim 21, being a vertical form fill seal pouch, a vacuum packaging pouch, a pouch with a spout, a laminated tube container, an infusion bag, a lidding film, a paper container, or a vacuum insulator.

* * * * *

UNITED STATES PATENT AND TRADEMARK OFFICE
CERTIFICATE OF CORRECTION

PATENT NO. : 9,260,622 B2  
APPLICATION NO. : 13/638715  
DATED : February 16, 2016  
INVENTOR(S) : Kentaro Yoshida et al.

Page 1 of 1

It is certified that error appears in the above-identified patent and that said Letters Patent is hereby corrected as shown below:

On the title page, Item (54), and in the specification, column 1, lines 1-6, Title of the Invention should read -- COMPOSITE STRUCTURAL MATERIAL, FORMED PRODUCT AND PACKAGING MATERIAL USING THE SAME, METHOD FOR PRODUCING THE COMPOSITE STRUCTURAL MATERIAL, AND COATING LIQUID --

Signed and Sealed this  
Twenty-fourth Day of May, 2016

Michelle K. Lee  
*Director of the United States Patent and Trademark Office*